United States Patent
Zhukhovitskiy et al.

(10) Patent No.: US 12,503,550 B2
(45) Date of Patent: Dec. 23, 2025

(54) SIGMATROPIC REARRANGEMENTS OF POLYMER BACKBONES

(71) Applicant: THE UNIVERSITY OF NORTH CAROLINA AT CHAPEL HILL, Chapel Hill, NC (US)

(72) Inventors: Aleksandr V Zhukhovitskiy, Chapel Hill, NC (US); Rachael A. J. Ditzler, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 18/703,878

(22) PCT Filed: Nov. 7, 2022

(86) PCT No.: PCT/US2022/049090
§ 371 (c)(1),
(2) Date: Apr. 23, 2024

(87) PCT Pub. No.: WO2023/086289
PCT Pub. Date: May 19, 2023

(65) Prior Publication Data
US 2025/0002644 A1  Jan. 2, 2025

Related U.S. Application Data

(60) Provisional application No. 63/278,283, filed on Nov. 11, 2021.

(51) Int. Cl.
*C08F 8/48* (2006.01)
*C08G 61/08* (2006.01)
*C08G 63/08* (2006.01)
*C08G 63/78* (2006.01)
*C08G 63/91* (2006.01)

(52) U.S. Cl.
CPC .............. *C08G 63/912* (2013.01); *C08F 8/48* (2013.01); *C08G 61/08* (2013.01); *C08G 63/08* (2013.01); *C08G 63/78* (2013.01); *C08G 2261/122* (2013.01); *C08G 2261/1422* (2013.01); *C08G 2261/3327* (2013.01); *C08G 2261/418* (2013.01); *C08G 2261/70* (2013.01)

(58) Field of Classification Search
CPC ....... C08G 63/00; C08G 63/91; C08G 63/912
See application file for complete search history.

(56) References Cited

FOREIGN PATENT DOCUMENTS

CN   110591094 A   12/2019

OTHER PUBLICATIONS

Yang, Macromolecules, 2001, 34, 6545-6547 (Year: 2001).*
Yoshida, Colloid Polym Sci (2009) 287:789-793 (Year: 2009).*
Bellus, Chemical Reviews, vol. 67, No. 6, 1967, p. 599-609 (Year: 1967).*
Du, S. et al., "A facile synthetic route to poly (p-phenylene terephthalamide) with dual functional groups", Chemical communications, 2014, vol. 50, pp. 9929-9931, p. 9929; scheme 1.
Tena, A. et al., "Claisen thermally rearranged (CTR) polymers", Science advances, 2016, vol. 2, Article No. e1501859, internal pp. 1-9, figures 1-3.
Ratushnyy, M. et al., "Polymer skeletal editing via anionic brook rearrangements", Journal of the american chemical society, Oct. 22, 2021, vol. 143, pp. 17931-17936, abstract; figure 1.
Ditzler, R. A. J. et al., "Sigmatropic rearrangements of polymer backbones: vinyl polymers from polyesters in one step", Journal of the american chemical society, Nov. 22, 2021, vol. 143, pp. 20326-20331, abstract; figures 1, 2.

* cited by examiner

*Primary Examiner* — Robert C Boyle
(74) *Attorney, Agent, or Firm* — Katten Muchin Rosenman LLP

(57) ABSTRACT

The present disclosure relates to polymers, methods for polymer synthesis, and methods of modifying the backbone of said polymers. Modification of the polymer backbone via a sigmatropic rearrangement allows facile entry into new, highly ordered polymers.

13 Claims, 24 Drawing Sheets

*2004, Nozaki: Baeyer-Villiger oxidation*

*2007–present, Moore, Craig, and others: Force-induced*

*2020, Brantley: Skattebøl rearrangement*

SIGMATROPIC REARRANGEMENTS OF POLYMER BACKBONES

TECHNICAL FIELD

The present disclosure relates to polymer synthesis, and more particularly to polymer synthesis through sigmatropic rearrangement of polymer backbones.

BACKGROUND

Polymers have and will continue to help to solve society's rapidly developing needs and show enormous potential for the development of new technologies. As such, the future of polymer chemistry will be influenced by the elaboration of new functional polymers.

At its core, polymer chemistry rests on four pillars: synthesis, characterization, degradation, and modification. Innovations in the former two "pillars" have fueled technological progress since Staudinger's macromolecular hypothesis, propelling us into the Plastics Age. More recently, deleterious accumulation of plastics and public pressure to curtail the plastic pollution of natural habitats have resulted in growing attention to the development of polymer degradation methods. Meanwhile, the fourth pillar, polymer modification, has seen far less progress and is ripe for innovation, particularly in the growing demand for stimulus-responsive materials.

One form of polymer modification is post-polymerization modification (PPM). PPM is a strategy to access a wide variety of material properties from a single scaffold.[1] Indeed, nature itself takes advantage of PPM, such as in the form of post-translational modification of proteins,[2] DNA methylation,[3] and polyketide single-chain folding,[4] to modulate the biological roles of these biopolymers. To date, PPM has predominantly been used to append or modify side chains or end groups of polymers,[1,5] or alter the polymer topology.[6-13] However, this limits the magnitude and variety of possible changes in polymer properties. In contrast, transforming the composition of the polymer backbone itself-referred to herein as polymer backbone metamorphosis (PBM)—has generally been neglected.[14-16]

The earliest report of PBM was provided by Nozaki,[14] who used the Baeyer-Villiger oxidation to convert a polyketone to a poly(ketone-co-ester) (FIG. 1). Although it provided a valuable proof of concept, the transformation was inefficient. It proceeded for four days at room temperature with eight equivalents of mCPBA per ketone, and yet only 18% of the backbone ketones were converted. The resulting polymer was isolated in 73% yield. The polymer fragmented during the course of the reaction and was unstable, whether in solution or after isolation. Although the thermal and physical properties of the polymer were not extensively reported, the PBM process clearly conferred hydrolytic degradability to the polymer.

Since then, beginning with reports by Moore in 2007,[17-18] PBM through force-induced ring-opening (FIRO) of mechanophores,[19] which are mechanochemically reactive fragments, has been reported (FIG. 1).[20] Most recently, electrocyclic ring opening via the Skattebol rearrangement, induced by lithium-halogen exchange instead of force, has been demonstrated to convert poly-cyclopropanes into poly-allenes (FIG. 1).[16] The discussion above underscores the paucity of methods used to modify polymer backbones.

New methods are needed to explore the potential effects of PBM on the properties of polymers and gain entry into new polymers inaccessible by other means. These and other aspects are addressed by the disclosures herein.

SUMMARY

In accordance with the purpose(s) of the currently disclosed subject matter, as embodied and broadly described herein, in one aspect relates to a method of preparing a product polymer, the method comprising obtaining a polymer, wherein the backbone of the polymer comprises at least one sigmatropomer repeat unit; and inducing a sigmatropic rearrangement of the sigmatropomer in the backbone of the polymer, thereby producing the product polymer. In an embodiment, the sigmatropic rearrangement is selected from the group consisting of the Ireland-Claisen rearrangement and the anionic oxy-Cope rearrangement.

In an embodiment, the wherein the sigmatropomer is a repeat unit of Formula I, II, or III:

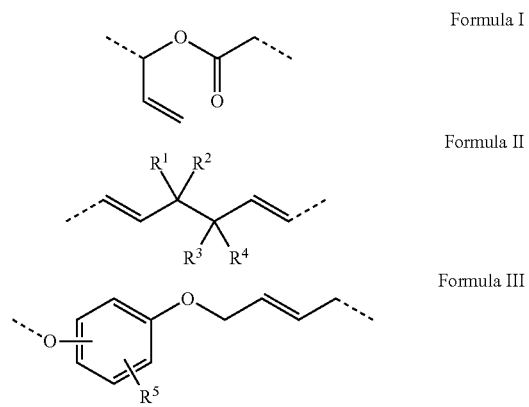

In another aspect, the subject matter described herein is directed to a polymer comprising a sigmatropomer, wherein the sigmatropomer comprising polymer is represented as a compound of Formula Ip or IIp:

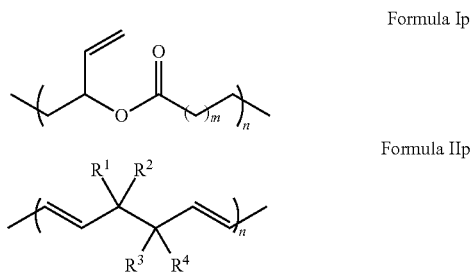

In another aspect, the subject matter described herein is directed to a method of preparing the sigmatropomer comprising polymer, the method comprising the step of performing a ring-opening transesterification polymerization reaction or a ring-opening metathesis polymerization reaction on a monomer unit.

These and other aspects are disclosed in further detail below.

DETAILED DESCRIPTION

Figure 1:
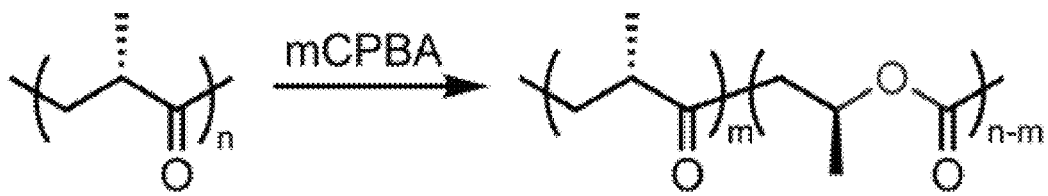
FIG. 1 shows prior methods for polymer backbone modification (PBM).
Figure 1:
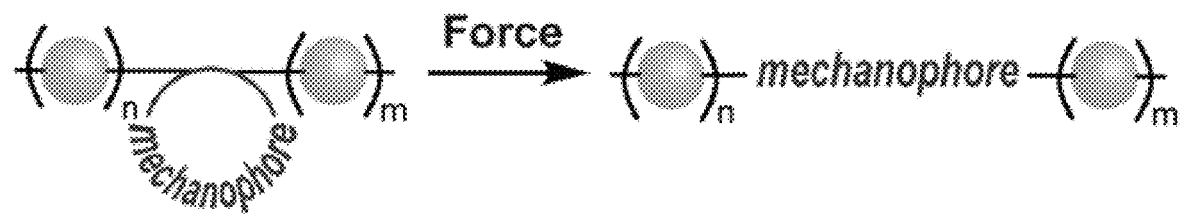
Figure 1:
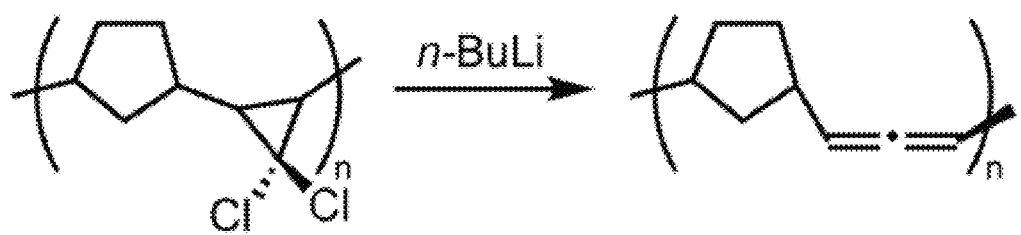
Figure 2:
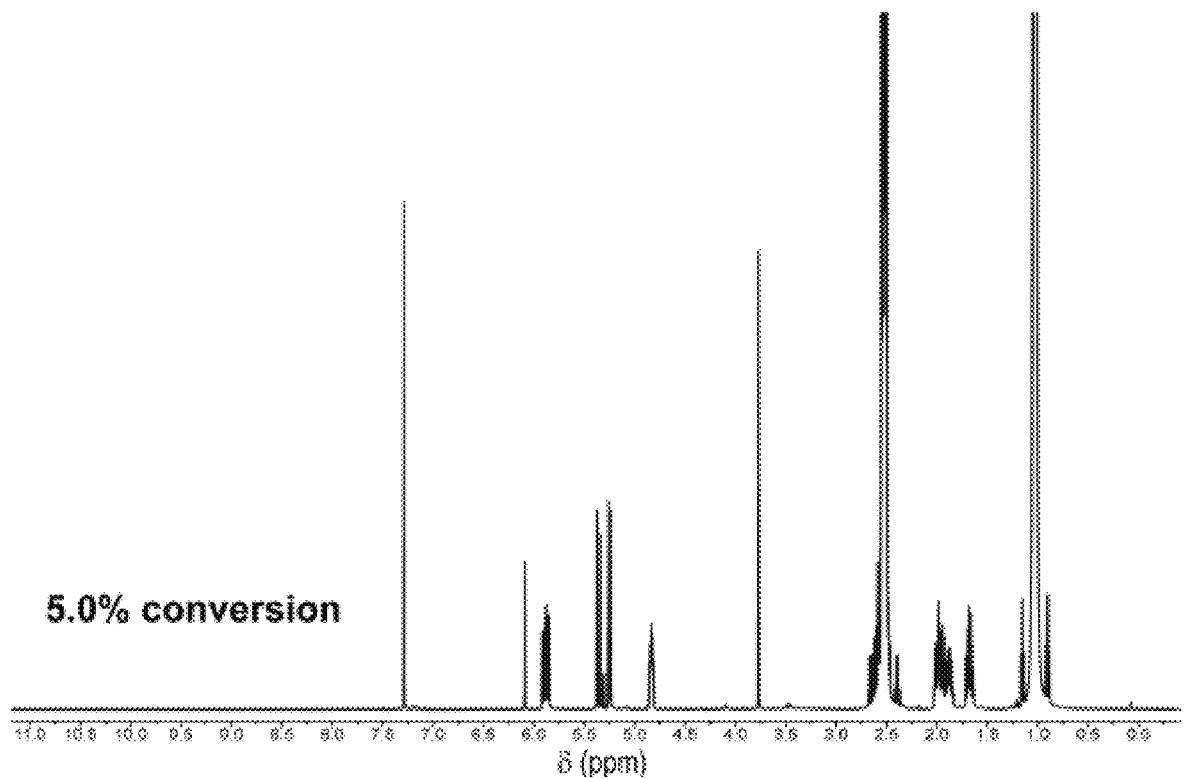
FIG. 2 shows $^1$H NMR (500 MHz, CDCl$_3$, 23° C.) of the polymerization of 1 with DBU and 3-phenylpropan-1-ol at 40° C.
Figure 3:
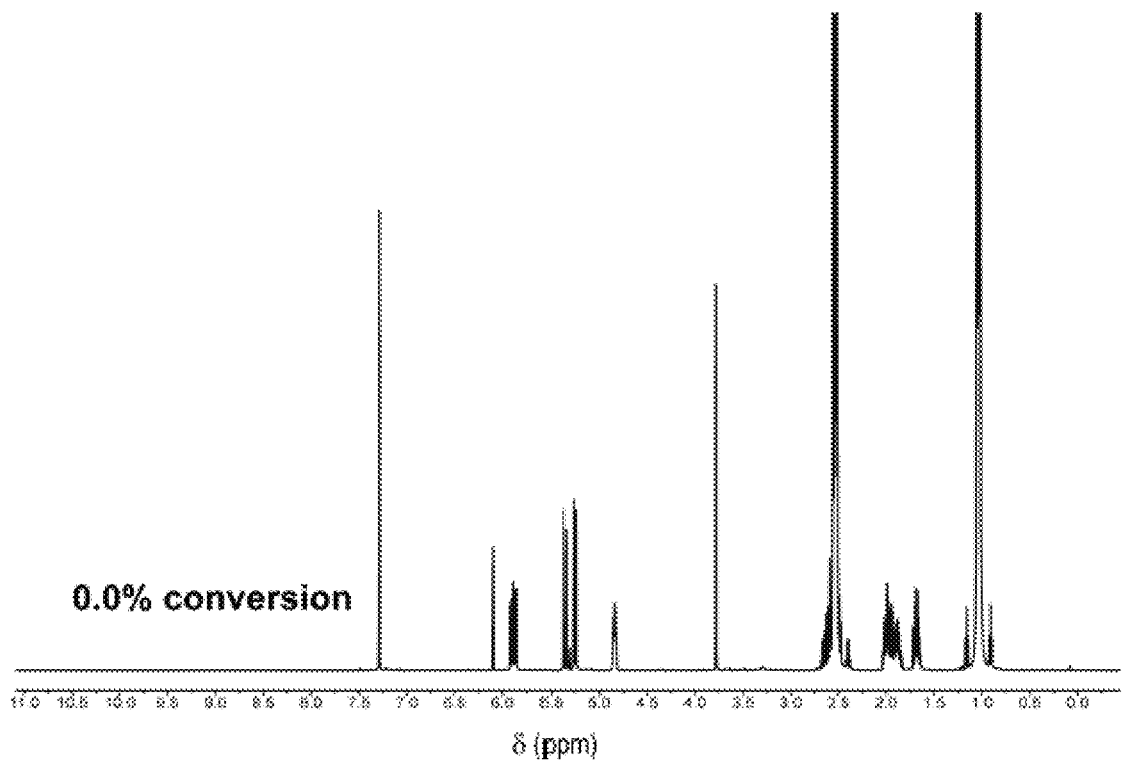
FIG. 3 shows $^1$H NMR (500 MHz, CDCl$_3$, 23° C.) of the polymerization of 1 with TBD and 3-phenylpropan-1-ol at 40° C.
Figure 4:
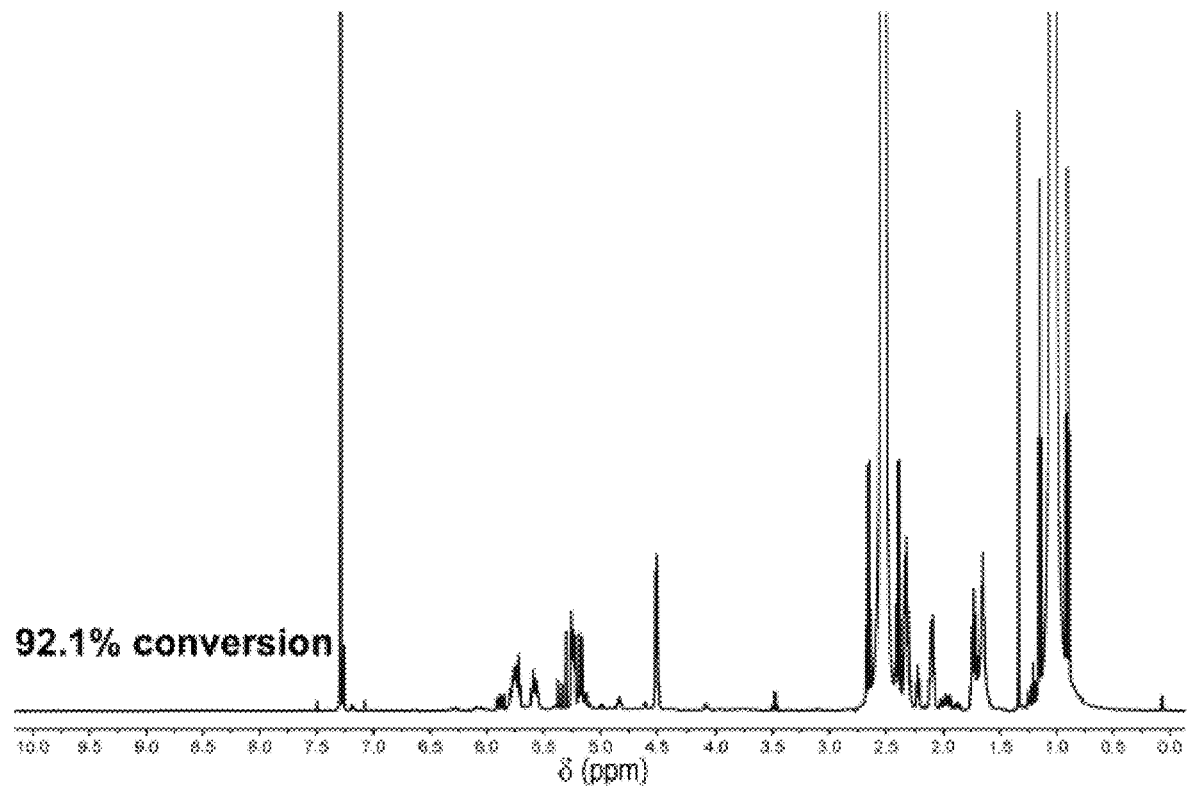
FIG. 4 shows $^1$H NMR (500 MHz, CDCl$_3$, 23° C.) of the polymerization of 1 with Sn(OTf)2 and 3-phenylpropan-1-ol at 40° C.
Figure 5:
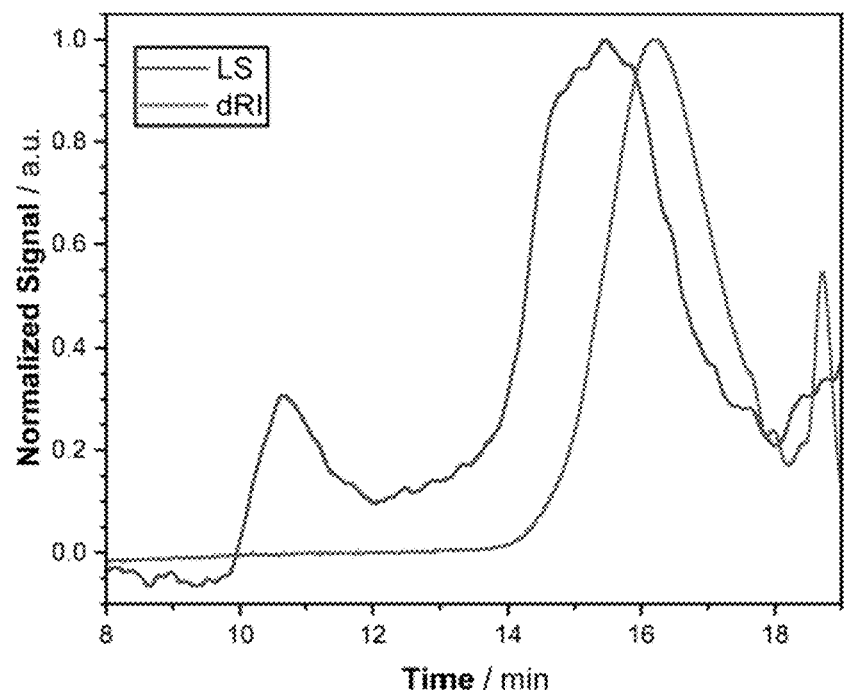
FIG. 5 shows normalized GPC-MALS differential refractive index (dRI) and light scattering (LS) traces of the polymerization of 1 with Sn(OTf)$_2$ and 3-phenylpropan-1-ol at 40° C. with a [M]:[I]:[C] ratio of 100:1:1.
Figure 6A:
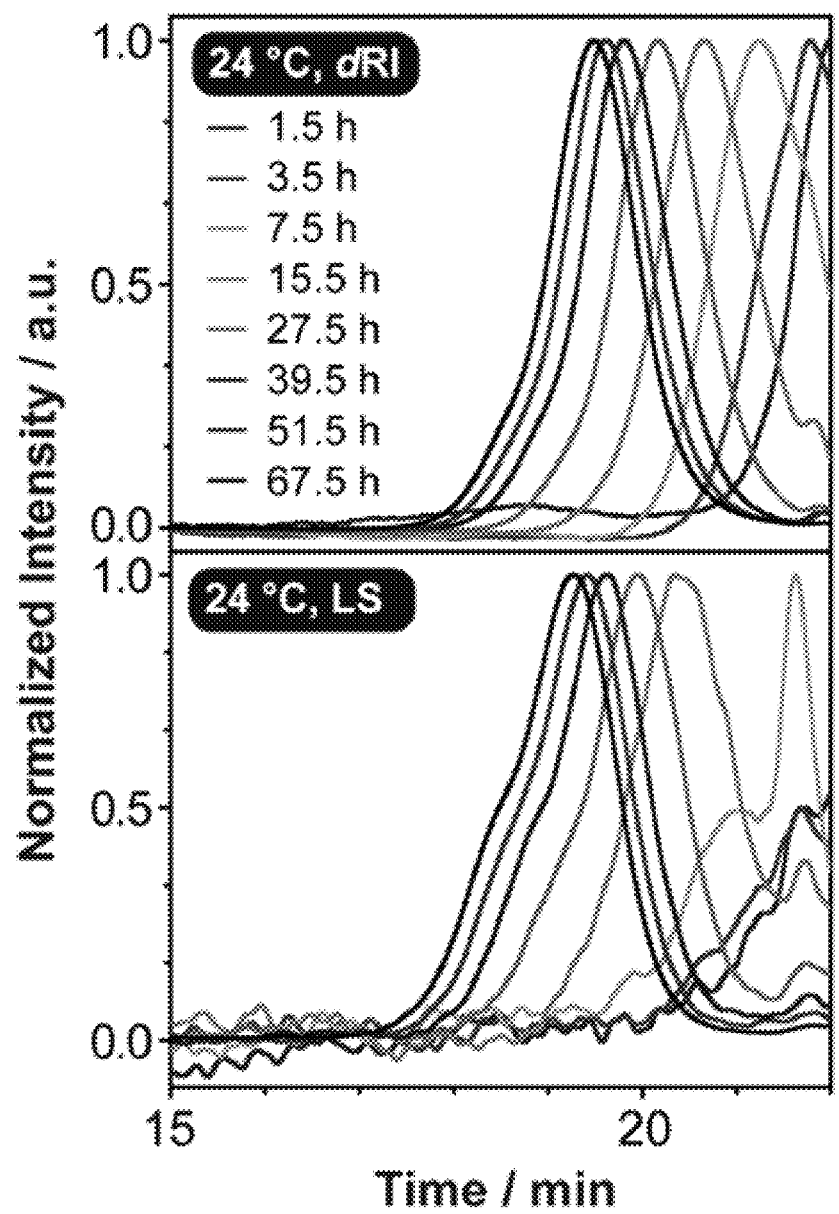
FIG. 6A shows refractive index and light scattering traces obtained from the polymerization of the 6-membered vinyl-lactone with DPP and 3-phenol-1-propanol at 24° C.
Figure 6B:
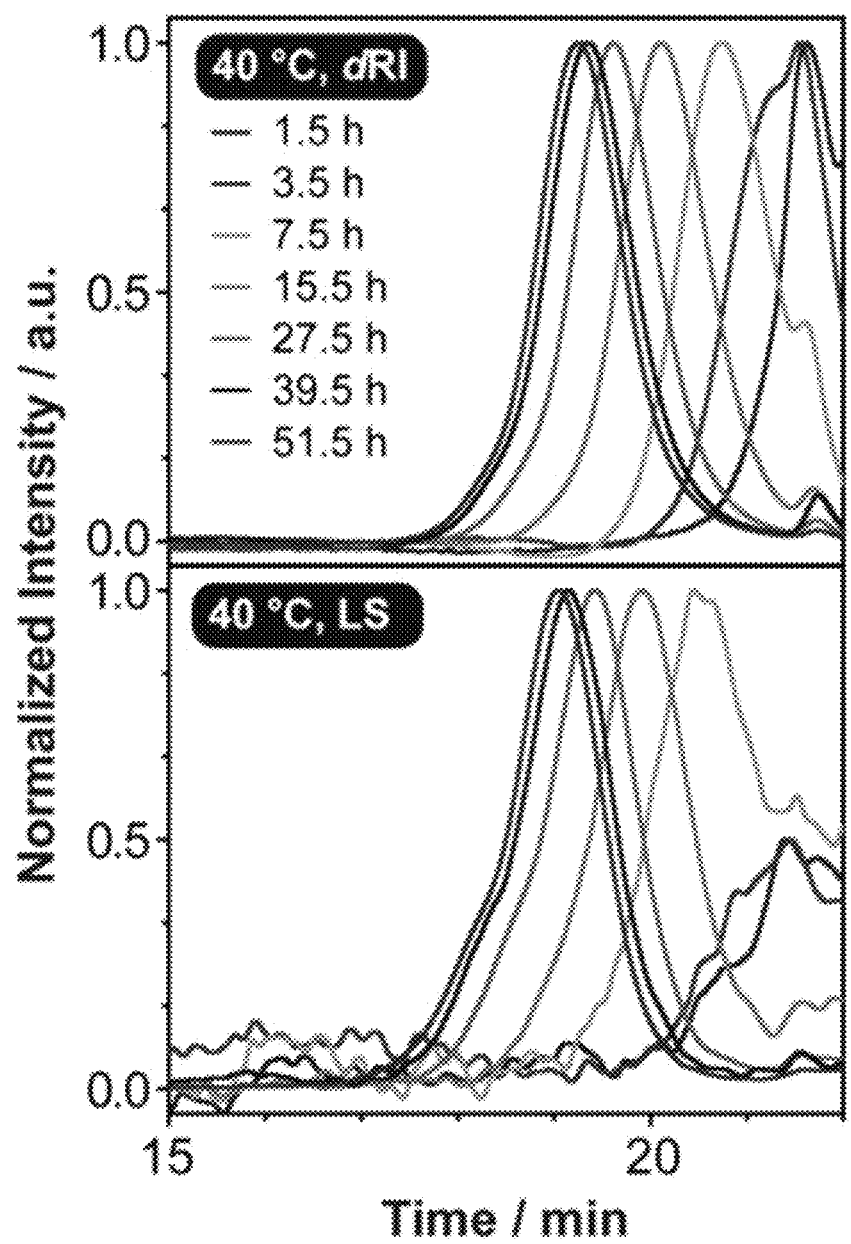
FIG. 6B shows refractive index and light scattering traces obtained from the polymerization of the 6-membered vinyl-lactone with DPP and 3-phenol-1-propanol at 40° C.
Figure 6C:
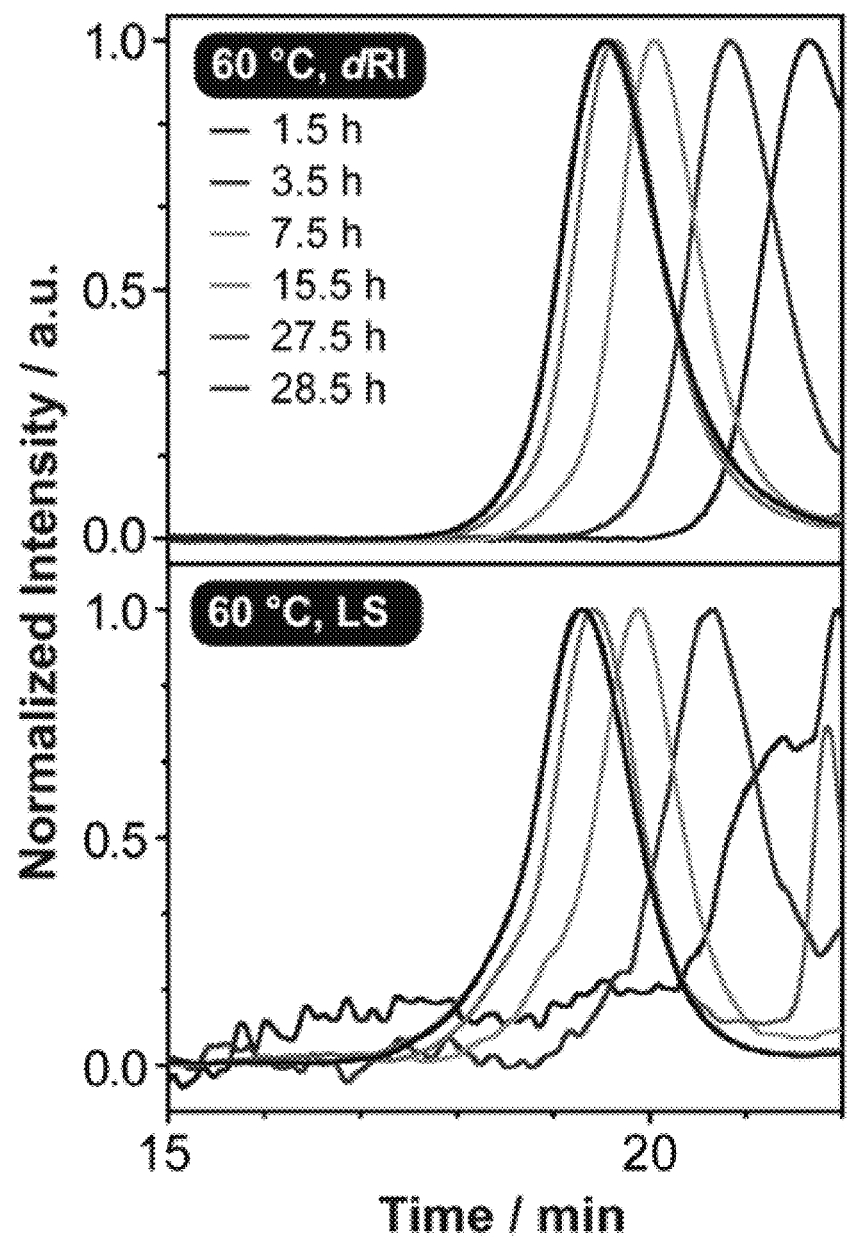
FIG. 6C show refractive index and light scattering traces obtained from the polymerization of the 6-membered vinyl-lactone with DPP and 3-phenol-1-propanol at 60° C.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

As described herein, in embodiments, are polymers comprising a backbone capable of undergoing a sigmatropic rearrangement. Also described herein are methods for transforming the backbones of these polymers by subjecting them to sigmatropic rearrangements. In some embodiments, the rearrangement of polyesters to polyolefins is performed using the Ireland-Claisen rearrangement or the rearrangement of oligo (allyl-aryl ether) s to oligophenols. Examples of sigmatropic rearrangement of selected polymers are presented in Schemes 1 and 2. In these examples, the polymer P undergoes a sigmatropic rearrangement to form polymer P'.

Scheme 1: The sigmatropic rearrangement of a polyester to a polyolefin using the Ireland-Claisen sigmatropic rearrangement.

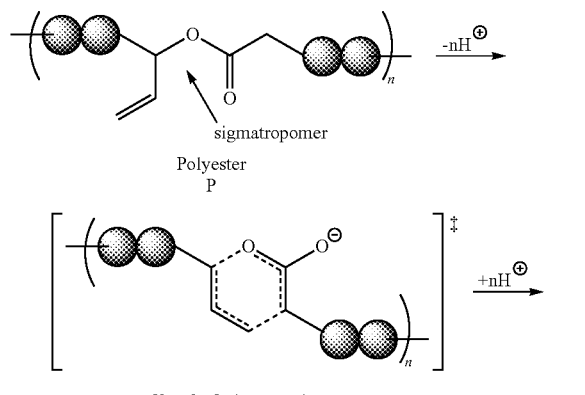

Scheme 2: The sigmatropic rearrangement of a polyunsaturated polymer a saturated polymer using the anionic oxy-Cope sigmatropic rearrangement.

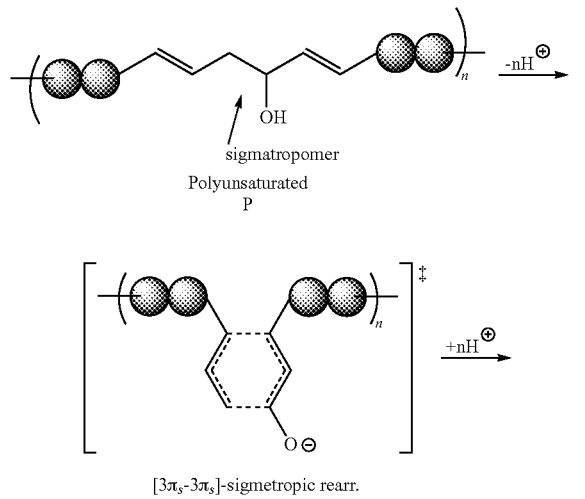

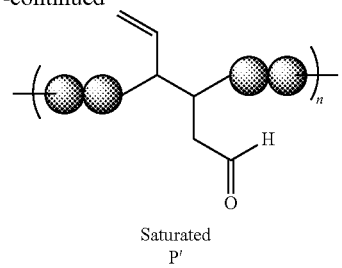

In order for the backbone of the polymer to undergo a sigmatropic rearrangement, the backbone must comprise chemical moieties that can undergo a sigmatropic rearrangement. These chemical moieties are referred to herein as "sigmatropomers." As can be seen in Schemes 1 and 2, the polymers P comprise sigmatropomers, which undergo sigmatropic rearrangements, thus providing the product polymers P'.

Modification of the backbone of polymers can impart dramatic changes to the thermal, optical, and mechanical properties of the polymers. Additional advantages associated with this backbone modification include, but are not limited to, entry to new polymers inaccessible by other means and advancement of the retrosynthetic analysis of polymers by uncovering a chemical kinship between polymer backbones. For example, the new polymers have a complete alternation of repeat units contained within the polymer backbone, without any other chemical moieties present in the polymer backbone.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A. Definitions

Listed below are definitions of various terms used to describe this invention. These definitions apply to the terms as they are used throughout this specification, unless otherwise limited in specific instances, either individually or as part of a larger group.

As used in the specification and the appended claims, the singular forms "a," "an" and "the" include plural referents unless the context clearly dictates otherwise. Thus, for example, reference to "an alkyl group" or "a polymer" includes mixtures of two or more such alkyl groups or polymers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units is also disclosed. For example, if 10 and 15 are disclosed, then 11, 12, 13, and 14 are also disclosed.

References in the specification and concluding claims to parts by weight of a particular element or component in a composition denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compositions.

A weight percent (wt %) of a component, unless specifically stated to the contrary, is based on the total weight of the vehicle or composition in which the component is included.

As used herein, the terms "optional" and "optionally" mean that the subsequently described event or circumstance can or cannot occur, and that the description includes instances where said event or circumstance occurs and instances where it does not.

Throughout this specification and the claims, the words "comprise," "comprises," and "comprising" are used in a nonexclusive sense, except where the context requires otherwise. It is understood that embodiments described herein include "consisting of" and/or "consisting essentially of" embodiments.

As used herein, the terms "increase," "increases," "increased," "increasing", "improve", "enhance", and similar terms indicate an elevation in the specified parameter of at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500%, or more.

As used herein, the terms "reduce," "reduces," "reduced," "reduction", "inhibit", and similar terms refer to a decrease in the specified parameter of at least about 5%, 10%, 15%, 20%, 25%, 30%, 35%, 40%, 45%, 50%, 55%, 60%, 65%, 70%, 75%, 80%, 85%, 90%, 95%, 97%, or 100%.

As used herein, the "contacting" refers to reagents in close proximity so that a reaction may occur.

As used herein, "ambient temperature" or "room temperature" refers to a temperature in the range of about 20° C. to about 25° C.

As used herein, the term "alkyl" refers to a straight or branched chain hydrocarbon containing from 1 to 10 carbon atoms. Representative examples of alkyl include, but are not limited to, methyl, ethyl, n-propyl, isopropyl, n-butyl, sec-butyl, isobutyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. These groups may be substituted with groups selected from halo (e.g., haloalkyl), alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, ester, amide, nitro, or cyano.

As used herein, the term "perfluoroalkyl" refers to an alkyl compound in which the all of the hydrogen atoms directly attached to the carbon atoms are completely replaced by a halogen, such as fluorine. In the term "perfluoroalkyl," the term "alkyl" denotes straight or branched alkyl such as methyl, ethyl, n-propyl, isopropyl, and the different butyl, pentyl, hexyl, heptyl, octyl, nonyl and decyl isomers.

The term "cycloalkyl" refers to a hydrocarbon 3-8 membered monocyclic or 7-14 membered bicyclic ring system having at least one saturated ring or having at least one non-aromatic ring, wherein the non-aromatic ring may have some degree of unsaturation. Cycloalkyl groups may be optionally substituted with one or more substituents. In one embodiment, 0, 1, 2, 3, or 4 atoms of each ring of a cycloalkyl group may be substituted by a substituent. Representative examples of cycloalkyl group include cyclopropyl, cyclopentyl, cyclohexyl, cyclobutyl, cycloheptyl, cyclopentenyl, cyclopentadienyl, cyclohexenyl, cyclohexadienyl, and the like.

As used herein, the term "alkenyl" refers to unsaturated aliphatic groups analogous in length and possible substitution to the alkyls described above, but that contain at least one double bond. For example, the term "alkenyl" includes straight-chain alkenyl groups (e.g., ethylenyl, propenyl, butenyl, pentenyl, hexenyl, heptenyl, octenyl, nonenyl or decenyl), branched-chain alkenyl groups and cycloalkenyl (alicyclic) groups (cyclopropenyl, cyclopentenyl, cyclohexenyl, cycloheptenyl or cyclooctenyl) groups. The term alkenyl further includes alkenyl groups that include oxygen, nitrogen, sulfur or phosphorous atoms replacing one or more carbons of the hydrocarbon backbone. In certain embodiments, a straight chain or branched chain alkenyl group with 10 or fewer carbon atoms in its backbone (e.g., C2-C10 for straight chain, C3-C10 for branched chain) is used. Likewise, cycloalkenyl groups may have from 3-8 carbon atoms in their ring structure, and more preferably have 5 or 6 carbons in the ring structure. The term C2-C10 includes alkenyl groups containing 2 to 10 carbon atoms.

As used herein, the term "heteroaryl" or "heteroaromatic" refers to a monovalent aromatic radical of 5- or 6-membered rings, and includes fused ring systems (at least one of which is aromatic) of 5-20 atoms, containing one or more heteroatoms independently selected from nitrogen, oxygen, and sulfur. Examples of heteroaryl groups are pyridinyl (including, for example, 2-hydroxypyridinyl), imidazolyl, imidazopyridinyl, pyrimidinyl (including, for example, 4-hydroxypyrimidinyl), pyrazolyl, triazolyl (including, for example, 3-amino-1,2-4-triazole or 3-mercapto-1,2,4-triazole), pyrazinyl (including, for example, aminopyrazine), tetrazolyl, furyl, thienyl, isoxazolyl, thiazolyl, oxadiazolyl, oxazolyl, isothiazolyl, pyrrolyl, quinolinyl, isoquinolinyl, tetrahydroisoquinolinyl, indolyl, benzimidazolyl, benzofuranyl, cinnolinyl, indazolyl, indolizinyl, phthalazinyl, pyridazinyl, triazinyl, isoindolyl, pteridinyl, purinyl, oxadiazolyl, triazolyl, thiadiazolyl, thiadiazolyl, furazanyl, benzofurazanyl, benzothiophenyl, benzothiazolyl, benzoxazolyl, quinazolinyl, quinoxalinyl, naphthyridinyl, and furopyridinyl. The heteroaryl groups are thus, in some embodiments, monocyclic or bicyclic. Heteroaryl groups are optionally substituted independently with one or more substituents described herein.

As used herein, the term "aryl" refers to a hydrocarbon monocyclic, bicyclic or tricyclic aromatic ring system. Aryl groups may be optionally substituted with one or more substituents. In one embodiment, 0, 1, 2, 3, 4, 5 or 6 atoms of each ring of an aryl group may be substituted by a substituent. Examples of aryl groups include phenyl, naphthyl, anthracenyl, fluorenyl, indenyl, azulenyl, and the like.

As used herein, the term "substituted" refers to a moiety (such as an alkyl group), wherein the moiety is bonded to one or more additional organic radicals. In some embodiments, the substituted moiety comprises 1, 2, 3, 4, or 5 additional substituent groups or radicals. Suitable organic substituent radicals include, but are not limited to, hydroxyl, amino, mono-substituted amino, di-substituted amino, mercapto, alkylthiol, alkoxy, substituted alkoxy or haloalkoxy radicals, wherein the terms are defined herein. Unless otherwise indicated herein, the organic substituents can comprise from 1 to 4 or from 5 to 8 carbon atoms. When a substituted moiety is bonded thereon with more than one substituent radical, then the substituent radicals may be the same or different.

As used herein, the term "alkoxy", used alone or as part of another group, means the radical-OR, where R is an alkyl group as defined herein.

As used herein, the terms "halo," "halogen," and "halide" refer to any suitable halogen, including —F, —Cl, —Br, and —I.

As used herein, the term "mercapto" refers to an —SH group.

As used herein, the term "cyano" refers to a —CN group.

As used herein, the term "carboxylic acid" refers to a —C(O)OH group.

As used herein, the term "hydroxyl" refers to an —OH group.

As used herein, the term "nitro" refers to an —$NO_2$ group.

As used herein, the term "sulfonyl" refers to the $SO_2^-$ group. The "sulfonyl" may refer to a sulfonyl group, which is, for example, an alkylsulfonyloxy group such as a methylsulfonyloxy or ethylsulfonyloxy group and an aromatic sulfonyloxy group such as a benzenesulfonyloxy or tosyloxy group.

As used herein, the terms "ether" and "alkylether" are represented by the formula $R_a$—O—$R_b$, where $R_a$ and $R_b$ can be, independently, an alkyl, cycloalkyl, alkenyl, cycloalkenyl, alkynyl, cycloalkynyl, aryl, or heteroaryl group as described herein. The term "polyether" as used herein is represented by the formula —$(R_a$—O—$R_b)_x$—, where $R_a$ and $R_b$ can be, independently, an alkyl, cycloalkyl, alkenyl, cycloalkenyl, alkynyl, cycloalkynyl, aryl, or heteroaryl group described herein and "x" is an integer from 1 to 500. Examples of polyether groups include polyethylene oxide, polypropylene oxide, and polybutylene oxide.

As used herein, the term "acyl", used alone or as part of another group, refers to a —C(O)R radical, where R is any suitable substituent such as aryl, alkyl, alkenyl, alkynyl, cycloalkyl or other suitable substituent as described herein.

As used herein, the terms "alkylthio" and "thiyl," used alone or as part of another group, refers to an alkyl group, as defined herein, appended to the parent molecular moiety through a thio moiety, as defined herein. Representative examples of alkylthio include, but are not limited, methylthio, ethylthio, tert-butylthio, hexylthio, and the like.

As used herein, the term "amino" means the radical —$NH_2$.

As used herein, the term "alkylamino" or "mono-substituted amino", used alone or as part of another group, means the radical —NHR, where R is an alkyl group.

As used herein, the term "disubstituted amino", used alone or as part of another group, means the radical —$NR_aR_b$, where $R_a$ and $R_b$ are independently selected from the groups alkyl, haloalkyl, alkenyl, alkynyl, cycloalkyl, cycloalkylalkyl, aryl, arylalkyl, heterocyclo, and heterocycloalkyl.

As used herein, the term "ester", used alone or as part of another group, refers to a —C(O)OR radical, where R is any suitable substituent such as alkyl, cycloalkyl, alkenyl, alkynyl or aryl.

As used herein, the term "amide", used alone or as part of another group, refers to a —C(O)$NR_aR_b$ radical, where $R_a$ and $R_b$ are any suitable substituent such as alkyl, cycloalkyl, alkenyl, alkynyl or aryl.

As used herein, the term "unsubstituted" refers to a moiety (such as an alkyl group) that is not bonded to one or more additional organic or inorganic substituent radical as described above, meaning that such a moiety is only substituted with hydrogens.

B. Sigmatropic Rearrangements

Sigmatropic rearrangements are known in the art as a class of chemical reactions. Sigmatropic rearrangements are a class of pericyclic reactions[21] that, phenomenologically, transpose molecular payloads across a system of conjugated orbitals.[22] More than a century since the first report of sigmatropic rearrangements in 1912,[23] only eleven studies have explored them in the context of polymers.[24-35] Five of these studies are theoretical: Roald Hoffmann and coworkers concocted intriguing hypothetical classes of polymers they called "sigmatropic shiftamers," because they predicted sigmatropic shifts-either Cope rearrangements or [1,n]-hydride shifts—would render the polymer fluxional along its entire backbone.[24-29] The other six studies were experimental and utilized (orthoester-) Claisen rearrangements for peripheral modification of polyaramids and polyimides[31-34] or the surface of graphene oxide,[30] or diaza-Cope rearrangement to mediate step-growth polymerization of diamines and dialdehydes.[35]

In order to perform a sigmatropic rearrangement on the backbone of polymer P comprising a sigmatropomer, the sigmatropomer comprising polymer P must first be obtained. The sigmatropomer-containing polymers may be prepared by methods disclosed herein.

As used herein, the terms "sigmatropic" and "sigmatropic rearrangement" refer to migration in an intramolecular process of a sigma (σ) bond, adjacent to one or more pi (π) systems, to a new position in a molecule, with the pi systems becoming reorganized in the process. Non-limiting examples of sigmatropic rearrangements include the Claisen rearrangement, Ireland-Claisen rearrangement, Bellus-Claisen rearrangement, Johnson-Claisen rearrangement, Eschenmoser-Claisen rearrangement, allenoate-Claisen, aza-Claisen rearrangement, thio-Claisen rearrangement Cope rearrangement, oxy-Cope rearrangement, anionic oxy-Cope rearrangement, 2-aza-Cope rearrangement, Overman rearrangement, Carroll rearrangement, Fischer indole synthesis, [1,φ] sigmatropic migrations of hydrogen, [1,φ] sigmatropic migrations of carbon, benzidine rearrangement, conversion of vinylcyclopropanes to cyclopentenes, [2,3] sigmatropic rearrangements including the [2,3]-Wittig and aza-[2,3]-Wittig rearrangements, the Sommelet-Hauser rearrangement, and the Doyle-Kirmse reaction, [1,3] shifts, [1,5] shifts, [1,7] shifts, and the benzidine rearrangement. Sigmatropic rearrangements are known in the art, as exemplified in "Advanced Organic Chemistry, Reactions, Mechanisms, and Structure," 4th ed. Jerry March, John Wiley & Sons, 1992, 1121-1146.

Below are provided examples of a selected set of sigmatropic rearrangements where the sigmatropomer may be distinguished by the arrows showing the rearrangement.

Claisen Rearrangement of an Allyl Vinyl Ether

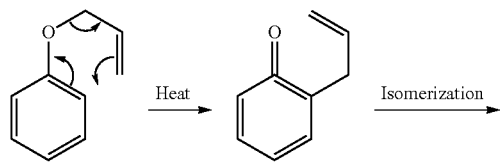

Aromatic Claisen Rearrangement

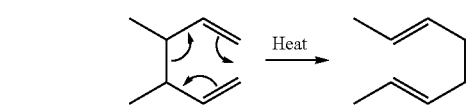

Cope Rearrangement

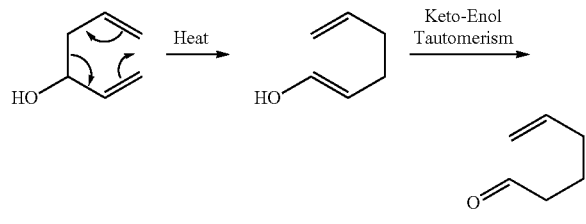

Oxy-Cope Rearrangement

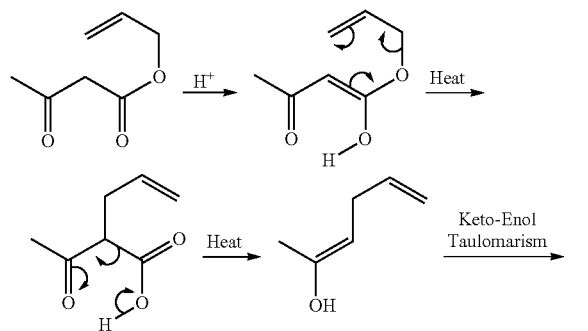

Carroll Rearrangement

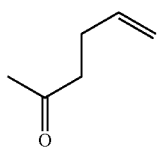

Fischer Indole Synthesis

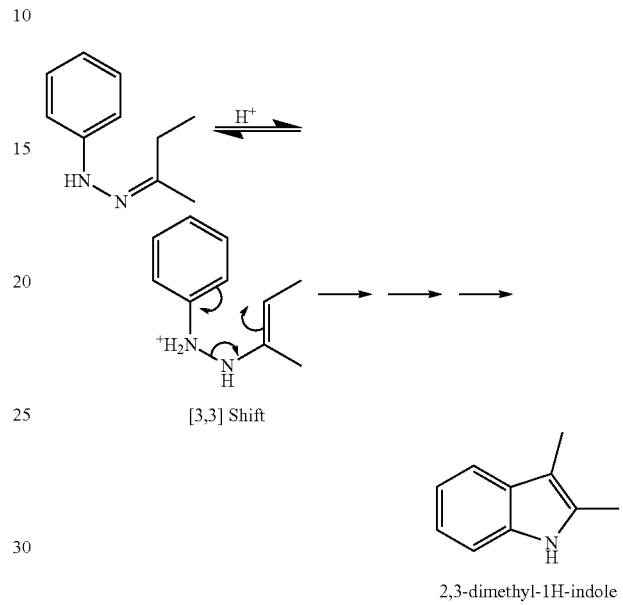

2,3-Sigmatropic Rearrangement (such as a 2,3-Wittig Rearrangement)

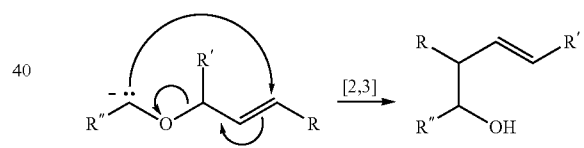

Sigmatropic rearrangements may be initiated by methods known in the art, which include, but are not limited to, heating the sigmatropomer-containing polymer, and/or contacting the sigmatropomer-containing polymer with acid or base.

C. Sigmatropomers

The polymers described herein have a backbone with at least one repeat unit which is a sigmatropomer. As used herein, the term "sigmatropomer" refers to a repeat unit in the backbone of a polymer which may on its own or in the presence of a suitable reactant or reagent undergo a sigmatropic rearrangement. In some embodiments, the sigmatropomer is a repeat unit of Formula I, II, or III.

Formula I

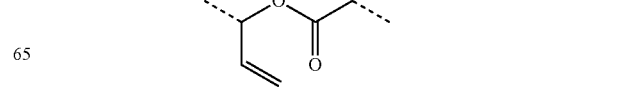

-continued

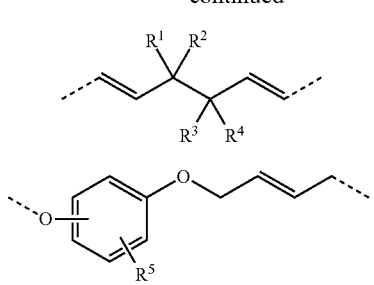

Formula II

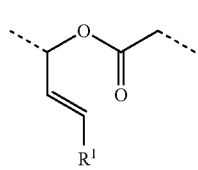

Formula III

In the sigmatropomers of Formulae I, II, and III, the dashed lines represent a chemical bond that is covalently attached to another repeat unit or an alternate section of the polymer.

In an embodiment, the repeat unit is represented by a sigmatropomer of Formula Ia, wherein $R^1$ is selected from the group consisting of hydrogen, alkyl, perfluoroalkyl, alkenyl, aryl, heteroaryl, acyl, sulfonyl, thiyl, and halide. In an embodiment, the sigmatropomer of Formula Ia may be used in the Ireland-Claisen rearrangement. In a further embodiment, the sigmatropomer of Formula Ia is converted to its enol form prior to the rearrangement.

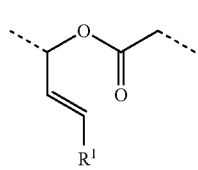

Formula Ia

In an embodiment, the repeat unit is represented by a sigmatropomer of Formula Ib, wherein $R^1$ is selected from the group consisting of hydrogen, alkyl, perfluoroalkyl, alkenyl, aryl, heteroaryl, acyl, sulfonyl, thiyl, and halide; and $R^2$ is selected from the group consisting of alkyl, perfluoroalkyl, alkenyl, aryl, and heteroaryl. In an embodiment, the sigmatropomer of Formula Ib may be used in the aza-Claisen rearrangement. In a further embodiment, the sigmatropomer of Formula Ib is converted to its enol form prior to the rearrangement.

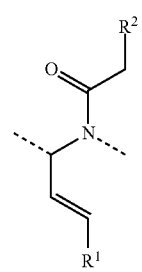

Formula Ib

In an embodiment, the repeat unit is represented by a sigmatropomer of Formula Ic, wherein $R^1$ is selected from the group consisting of hydrogen, alkyl, perfluoroalkyl, alkenyl, aryl, heteroaryl, acyl, sulfonyl, thiyl, and halide; and $R^2$ is selected from the group consisting of alkyl, perfluoroalkyl, alkenyl, aryl, and heteroaryl. In an embodiment, the sigmatropomer of Formula Ic may be used in the thio-Claisen rearrangement. In a further embodiment, the sigmatropomer of Formula Ic is converted to its enol form prior to the rearrangement.

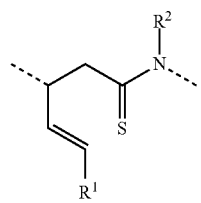

Formula Ic

In the sigmatropomer of Formula II, $R^1$, $R^2$, $R^3$, and $R^4$ are independently selected from hydrogen, alkyl, aryl, heteroaryl, amino, amidyl, thiyl, and hydroxyl. In an embodiment, $R^1$-$R^4$ are each hydrogen. In an alternate embodiment, $R^1$-$R^3$ are hydrogen and $R^4$ is hydroxyl, and is represented by a sigmatropomer of Formula IIa.

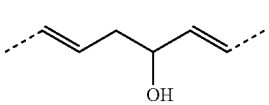

Formula IIa

In an alternate embodiment, $R^1$ and $R^2$ are hydrogen, $R^3$ is alkyl, and $R^4$ is hydroxyl. In a further embodiment, $R^1$ and $R^2$ are hydrogen, $R^3$ is methyl, and $R^4$ is hydroxyl, and is represented by a sigmatropomer of Formula IIb.

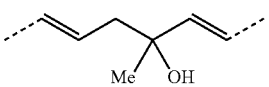

Formula IIb

In the sigmatropomer of Formula III, $R^5$ is hydrogen, alkyl, aryl, or halo. In an embodiment, $R^5$ is hydrogen and the sigmatropomer of Formula III is represented by a sigmatropomer of Formula IIIa.

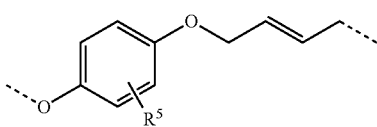

Formula IIIa

In an embodiment, the repeat unit is represented by a sigmatropomer of Formula IV wherein $R^1$ is selected from the group consisting of hydrogen, alkyl, perfluoroalkyl, alkenyl, aryl, heteroaryl, sulfonyl, thiyl, and halide; and $R^2$ is selected from the group consisting of hydrogen, alkyl, perfluoroalkyl, alkenyl, aryl, heteroaryl, sulfonyl, thiyl, and halide. In an embodiment, the sigmatropomer of Formula IV may be used in the Doyle-Kirmse rearrangement. In a further embodiment, the sigmatropomer of Formula IV requires addition of a metallocarbene reagent to facilitate the rearrangement.

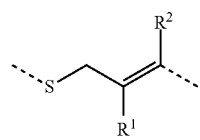

Formula IV

D. Sigmatropomer-Containing Polymers

In order to perform a sigmatropic rearrangement on the backbone of polymer P comprising a sigmatropomer, the sigmatropomer-containing polymer must first be obtained. The sigmatropomer-containing polymers may be prepared by methods disclosed herein. In one aspect, the synthetic methods disclosed herein advance the application of retrosynthetic analysis in polymer synthesis. In a further aspect, the production of polyolefins from lactones enables the preparation of previously inaccessible materials.

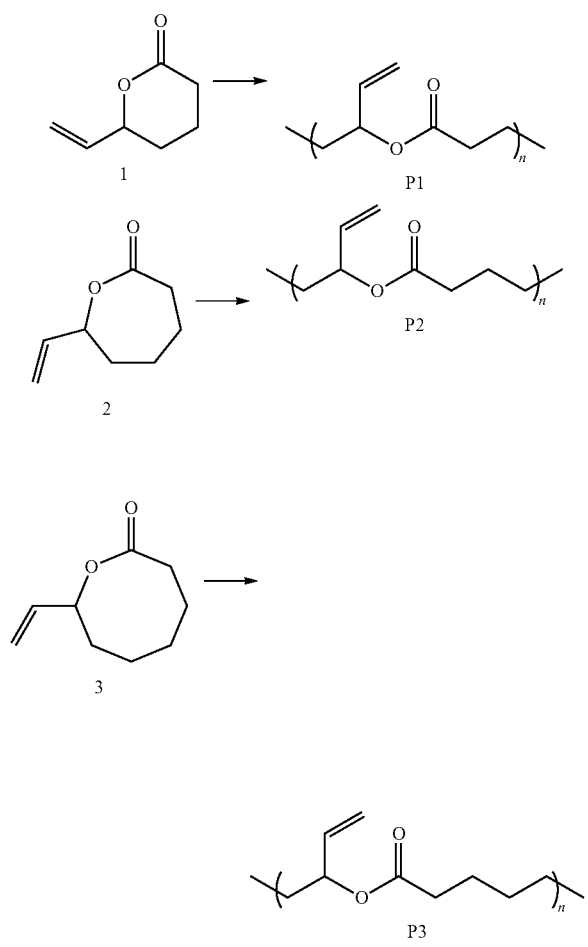

Scheme 3 - Ring Opening Trans-Esterification Polymerization (ROTEP)

Scheme 3 depicts the formation of polymers P1-P3 via ROTEP from monomers 1-3, where the polymers comprise a sigmatropomer repeat unit suitable to undergo an Ireland-Claisen sigmatropic rearrangement.[36-37]

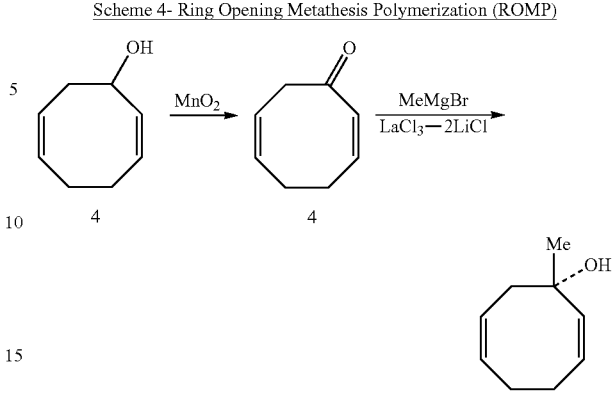

Scheme 4- Ring Opening Metathesis Polymerization (ROMP)

Scheme 4 depicts the formation of previously unknown monomer 5 from monomer 4 via a two-step process. Then, depicted is conversion of monomers 4 and 5 to polymers P4 and P5 via ROMP. Polymers P4 and P5 comprise a sigmatropomer repeat unit (highlighted for clarity) suitable to undergo an anionic oxy-Cope sigmatropic rearrangement.

Polymers formed in this manner have a complete alternation of repeat units contained within the polymer backbone, without any other chemical moieties present in the polymer backbone. In fact, in an embodiment, the Ireland-Claisen rearrangement produces a backbone that is equivalent to poly(butadiene-alt-acrylic acid), but where the alternation of the monomers is perfect, and butadiene is incorporated in exclusively 1,4-fashion. This is in contrast to polymers produced by more traditional methods such as metathesis reactions, which will have additional chemical moieties in the polymer backbone, in addition to the desired repeat units.

Co-polymerization of butadiene and acrylates is known: Marvel, C. S.; Potts, R.; Economy, J.; Scott, G. P.; Taft, W. K.; Labbe, B. G., "Butadiene-Acrylic Acid Copolymers," Ind. Eng. Chem. 1955, 47, 2221-2223; Furukawa, J.; Iseda, Y.; Kobayashi, E., "Alternating Copolymerization of Butadiene with Acrylic Compounds; Monomer-Catalyst Complexes," Polym. J. 1971, 2, 337-344; Bamford, C. H.; Han, X.-z., "Alternating Copolymerization of Conjugated Dienes with Methyl Acrylate. Part 1.—Butadiene," J. Chem. Soc., Faraday Trans. 1 1982, 78, 855-868. However, the alternation is not perfect and depends on reactivity ratios. Further, the polymers are prepared via uncontrolled free radical polymerization. Again, this is in contrast to the methods disclosed herein, where in some embodiments perfect alternation is guaranteed by the mechanism of the rearrangement.

Accordingly, in an embodiment, the polymers described herein have at least one repeat unit which is a sigmatropomer. The polymer may be represented as a compound of Formula Ip, IIp, or IIIp.

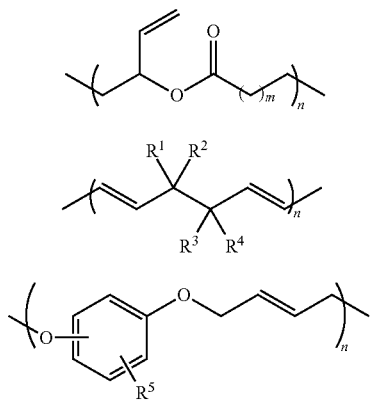

Formula Ip

Formula IIp

Formula IIIp

In some embodiments, n is an integer selected from 2-10,000, for example, from 2-5,000, 2-1,000, 2-500, 2-250, 2-100, or 2-50. In some embodiments, n is in a range from 50-150, from 25-300, or from 10-500.

In some embodiments, m is an integer from 1-10, from 1-5, or from 1-3.

In some embodiments, $R^1$, $R^2$, $R^3$, and $R^4$ are, in each instance, independently selected from hydrogen, alkyl, and hydroxyl. In an embodiment, $R^1$-$R^4$ are each hydrogen. In an alternate embodiment, $R^1$-$R^3$ are hydrogen and $R^4$ is hydroxyl. In another embodiment, $R^1$ and $R^2$ are hydrogen, $R^3$ is alkyl, and $R^4$ is hydroxyl. In a further embodiment, $R^1$ and $R^2$ are hydrogen, $R^3$ is methyl, and $R^4$ is hydroxyl. In some embodiments, $R^5$ is hydrogen, alkyl, aryl, or halo.

In some embodiments, the average molecular weight of the polymer PM is in the range from about 500 g/mol to about 200,000, from about 1,000 g/mol to about 50,000 g/mol, from about 1,500 g/mol to about 25,000 g/mol, from about 2,000 g/mol to about 15,000 g/mol, or from about 2,500 g/mol to about 5,000 g/mol. In some embodiments, the average molecular weight of the polymer PM is less than about 100,000 g/mol, less than about 50,000 g/mol, less than about 25,000 g/mol, less than about 10,000 g/mol, or less than about 5,000 g/mol. In some embodiments, the average molecular weight of the polymer PM is about 2,500 g/mol, about 5,000 g/mol, about 10,000 g/mol, about 25,000 g/mol, about 50,000 g/mol, or about 100,000 g/mol.

Studies were performed using ω-vinyllactones 1 and 2 where the synthesis of polyesters P1 and P2 was accomplished by ROTEP of 1 and 2 (Table 1) (FIGS. 2-10B). Although both 1 and 2 are known compounds,[38-39] they have not been previously used as polymer building blocks. Additionally, polyesters P1 and P2 (derived from 1 and 2, respectively) have not previously been reported.

TABLE 1

Lactone ring-opening transesterification polymerization (ROTEP) studies

| Entry # | Mon. | Cat. | Mon.:Cat.:I | Temp./ °C. | Time/h | % Conv.[a] | $M_n$[b]/ kg·mol$^{-1}$ | DP | Đ[b] |
|---|---|---|---|---|---|---|---|---|---|
| 1 | 1 | DBU | 100:1:1 | 40 | 31.5 | 5.0 | — | — | — |
| 2 | 1 | TBD | 100:1:1 | 40 | 31.5 | 0 | — | — | — |
| 3 | 1 | Sn(OTf)$_2$ | 100:1:1 | 40 | 31.5 | 92.1 | 3.49 | 27 | 1.59 |
| 4 | 1 | DPP | 100:1:1 | 40 | 51.5 | 82.4 | 4.06 | 31 | 1.31 |
| 5 | 1 | DPP | 100:1:1 | 24 | 63.5 | 81.6 | 4.00 | 31 | 1.35 |
| 6[d] | 1 | DPP | 100:1:1 | 60 | 25.0 | 71.4(5) | 4.1(1) | 28(1) | 1.24(1) |
| 7[d] | 1 | DPP | 25:1:1 | 60 | 5.0 | 77.1(6) | 2.3(2) | 16(2) | 1.35(5) |
| 8[d] | 1 | DPP | 50:1:1 | 60 | 7.5 | 78.2(3) | 3.6(3) | 25(2) | 1.26(1) |
| 9[d] | 1 | DPP | 250:1:1 | 60 | 60.0 | 69.3(8) | 4.9(5) | 37(3) | 1.34(9) |
| 10[d] | 1 | DPP | 500:2:1[c] | 60 | 65.0 | 60(4) | 6.21(9) | 43(1) | 1.32(4) |
| 11[e] | 2 | DPP | 25:1:1 | 60 | 7.5 | 74.2(9) | 2.4(5) | 20(0) | 1.3(1) |
| 12[d] | 2 | DPP | 50:1:1 | 60 | 23.5 | 88(1) | 4.3(1) | 30(1) | 1.16(2) |
| 13[e] | 2 | DPP | 100:1:1 | 60 | 65.5 | 78(2) | 5.7(9) | 40(7) | 1.2(1) |
| 14[e] | 2 | DPP | 250:1:1 | 60 | 118.0 | 34(3) | 5.2(5) | 34(4) | 1.14(7) |
| 15[e] | 2 | DPP | 500:2:1[c] | 60 | 122.0 | 25(4) | 5.0(7) | 34(5) | 1.4(1) |

[a]Monitored by 1H NMR with internal standard = 1-bromo-3,5-bis(trifluoromethyl)benzene
[b]Measured via GPC-MALS (THF, 35° C.), using dn/dc – 0.0771 mL · g$^{-1}$ for 1 and dn/dc – 0.0775 mL · g$^{-1}$ for 2
[c]1,4-phenylenedimethanol was used as the initiator instead of I
[d,e]Reactions run in triplicate (d) and duplicate (e); standard deviations shown in parentheses next to average value

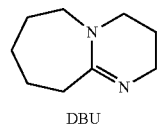

DBU

TABLE 1-continued

Lactone ring-opening transesterification polymerization (ROTEP) studies

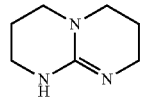

| Entry # | Mon. | Cat. | Mon.:Cat.:I | Temp./ °C | Time/h | % Conv.[a] | $M_n^{b}$/ kg·mol$^{-1}$ | DP | $Đ^b$ |
| --- | --- | --- | --- | --- | --- | --- | --- | --- | --- |

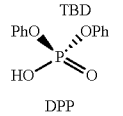

DBU: 1,8-Diazabicyclo [5.4.0] undec-7-ene; TBD: Triazabicyclodecene; DPP: Diphenyl hydrogen phosphate.

Figure 7:
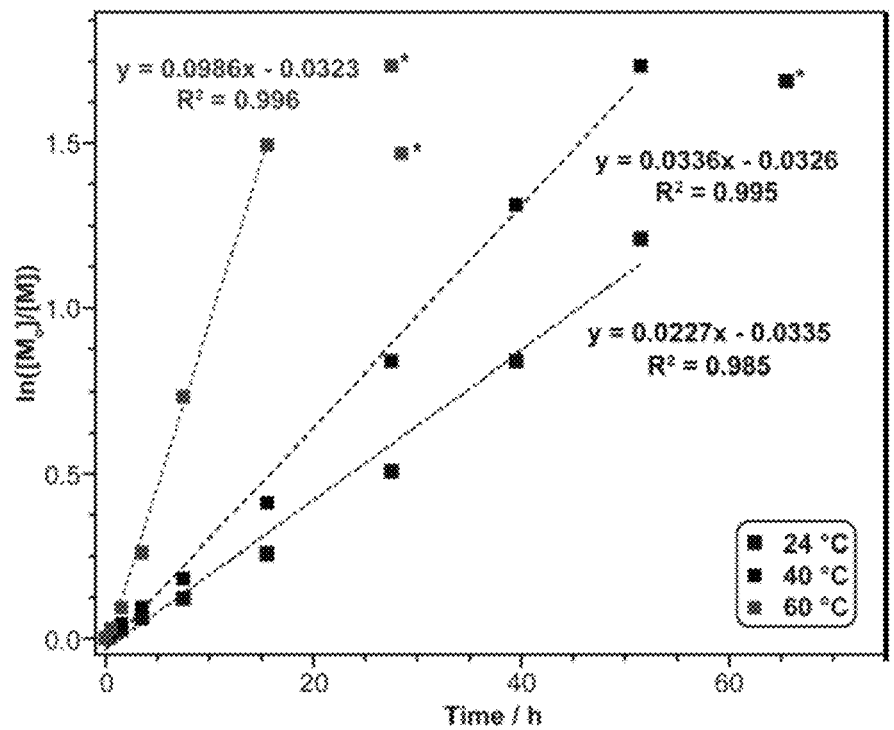
FIG. 7 shows semilogarithmic kinetic plots for the polymerization of 1 with DPP and 3-phenylpropan-1-ol at 24° C., 40° C., and 60° C. * These data points toward the end of the polymerization deviated considerably from 1$^{st}$-order kinetics, and were therefore excluded from the corresponding linear fits.
Figure 8:
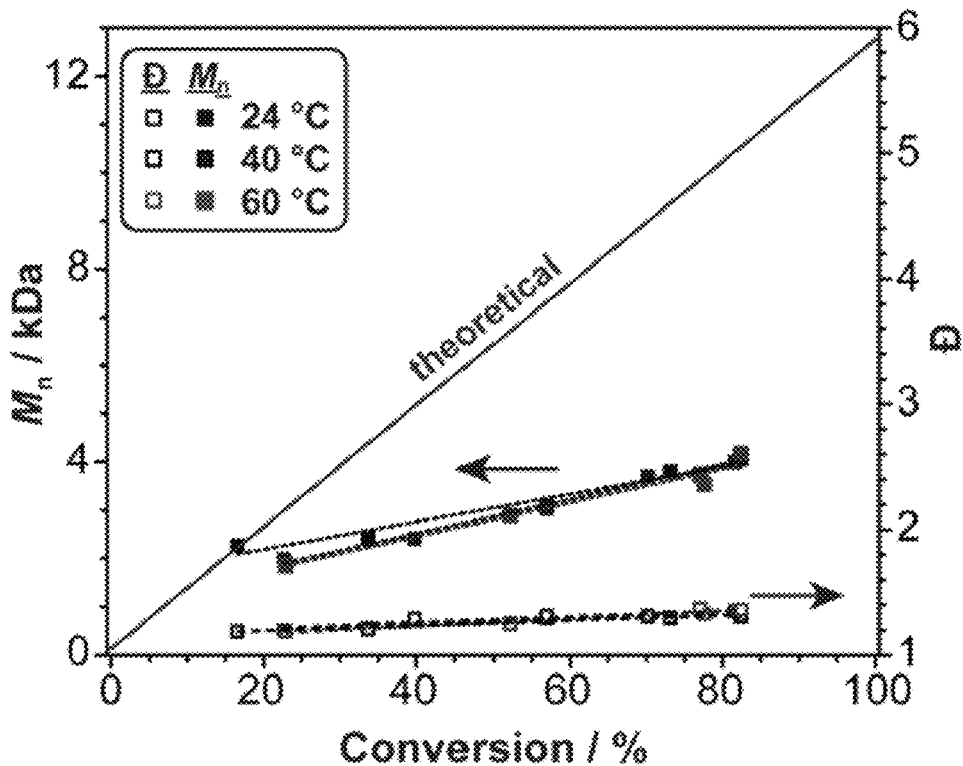
FIG. 8 shows the dependence of Mn and Đ on monomer conversion for the polymerization of 1 with DPP and 3-phenol-1-propanol at 24° C., 40° C., and 60° C.
Figure 9A:
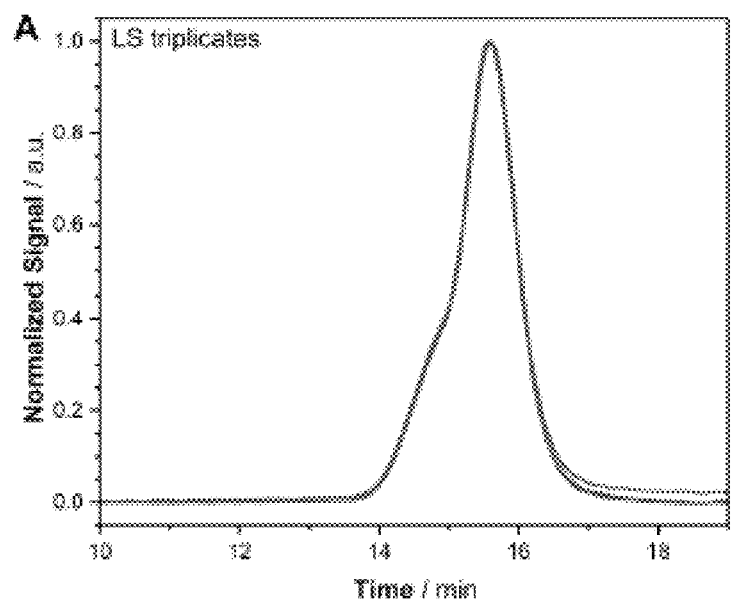
FIG. 9A shows normalized GPC-MAL (FIG. 9A) light scattering (LS) traces of the polymerization of 1 with DPP and 3-phenylpropan-1-ol at 60° C. with a [M]:[I]:[C] ratio of 100:1:1.
Figure 9B:
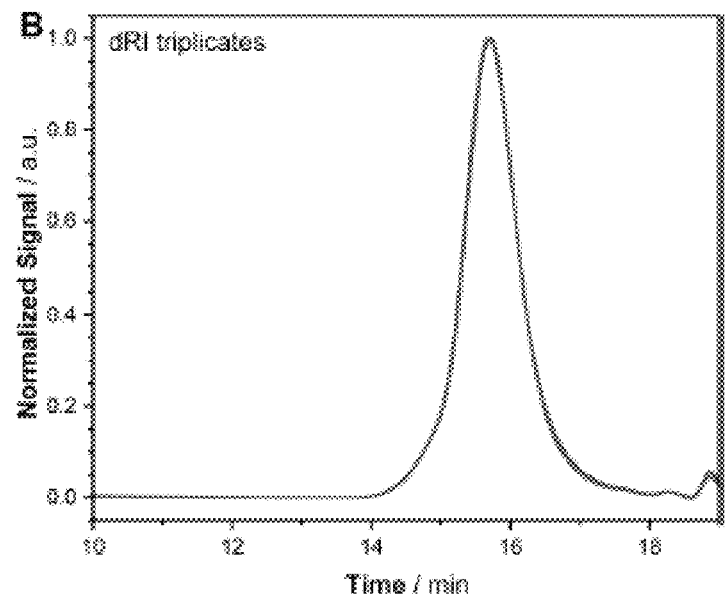
FIG. 9B shows normalized differential refractive index (dRI) traces of the polymerization of 1 with DPP and 3-phenylpropan-1-ol at 60° C. with a [M]:[I]:[C] ratio of 100:1:1.

ROTEP methods were explored at 40° C. using neat 1 and initiator I.[41-44] The fastest conversion of 1 was achieved with diphenylphosphate (DPP)[44] and Sn (OTf)$_2$[41] as catalysts (Table 1, entries 1-4) (FIGS. 2-6). However, in the case of Sn(OTf)$_2$, side reactions were observed, and so DPP was used for further optimization of ROTEP. Reducing the temperature to 24° C. led to slower conversion of 1, virtually no change in ultimate conversion, and no improvement in dispersity (Đ) of P1 (Table 1, entry 5) (FIGS. 6-8).

Figure 10A:
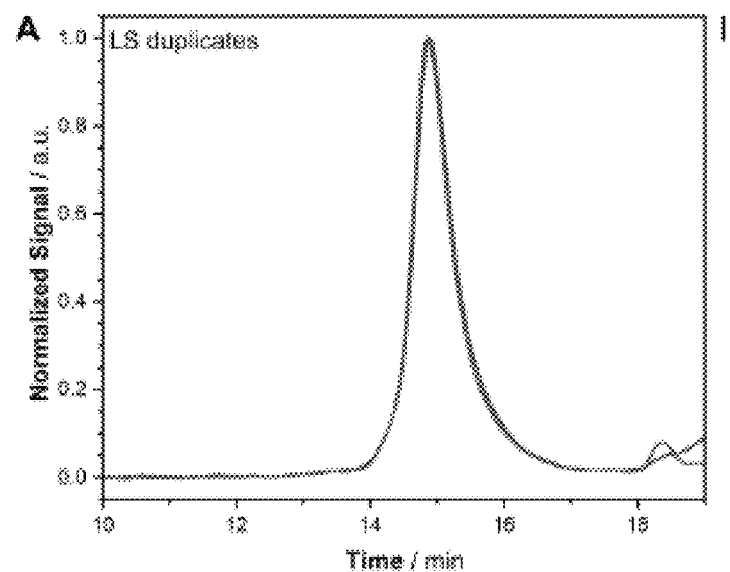
FIG. 10A show normalizeds GPC-MALS (FIG. 10A) light scattering (LS) traces of the polymerization of 2 with DPP and 3-phenylpropan-1-ol at 60° C. with a [M]:[I]:[C] ratio of 100:1:1 in duplicate.
Figure 10B:
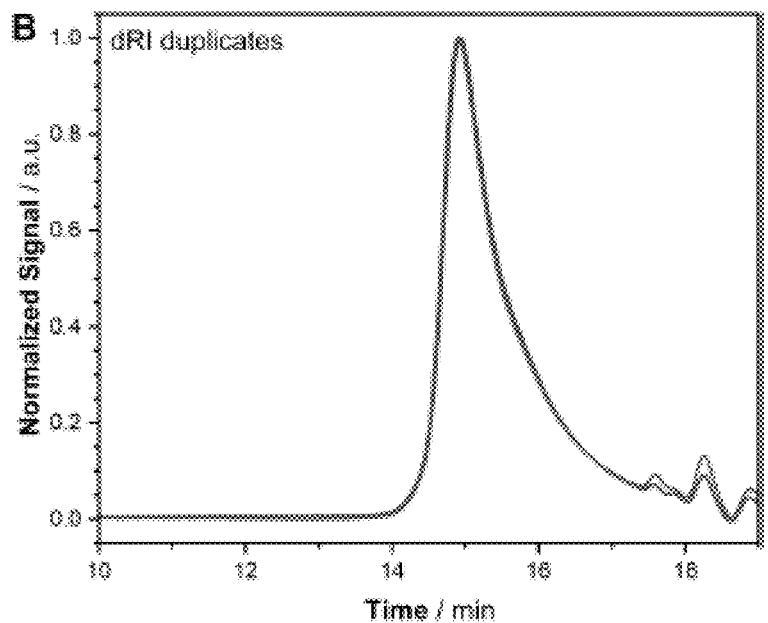
FIG. 10B shows normalized differential refractive index (dRI) traces of the polymerization of 2 with DPP and 3-phenylpropan-1-ol at 60° C. with a [M]:[I]:[C] ratio of 100:1:1 in duplicate.
Figure 11:
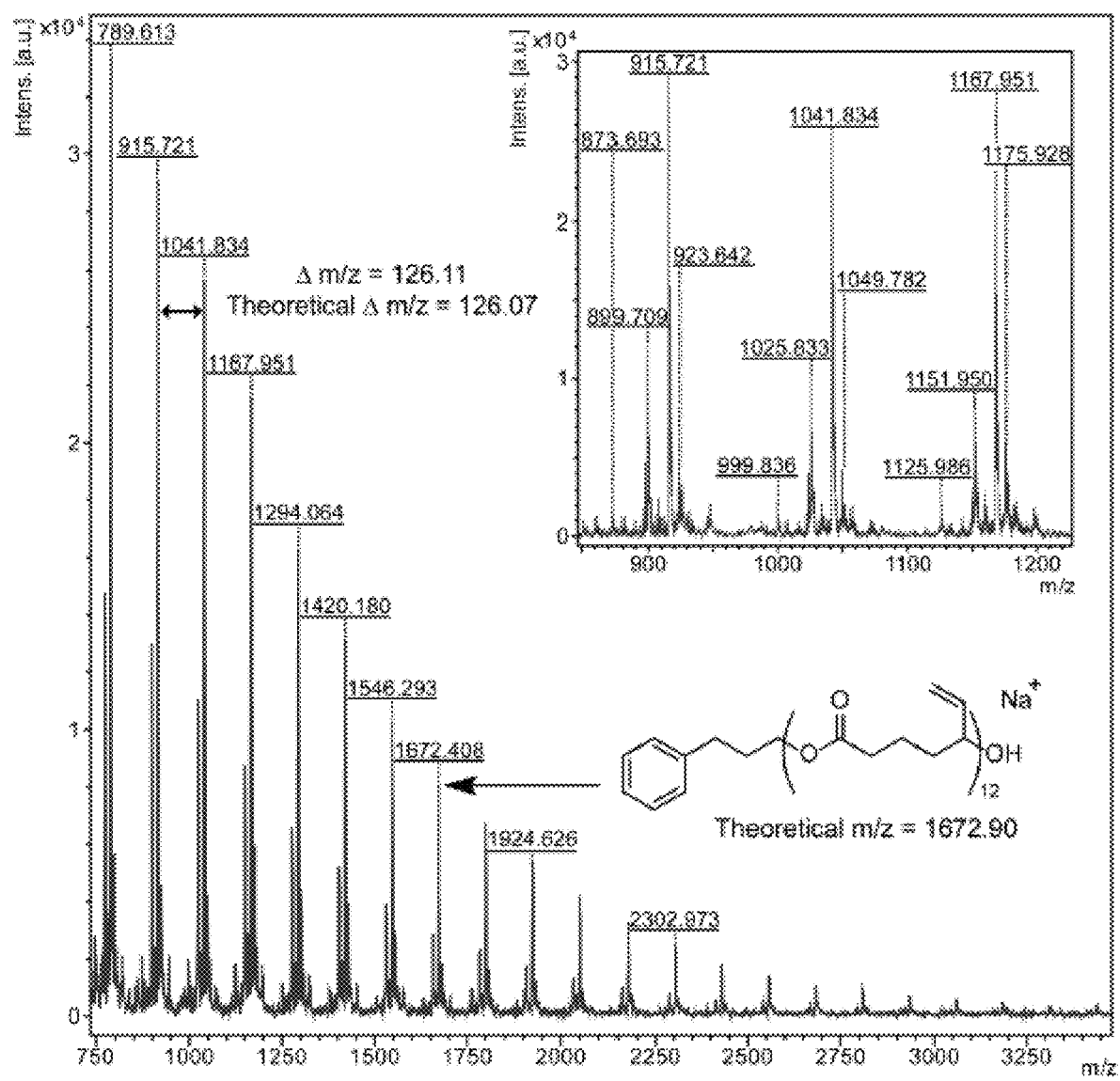
FIG. 11 shows a MALDI-TOF spectrum of the homopolymer P1 synthesized using a [M]:[C]:[I] ratio of 25:1:1.
Figure 12:
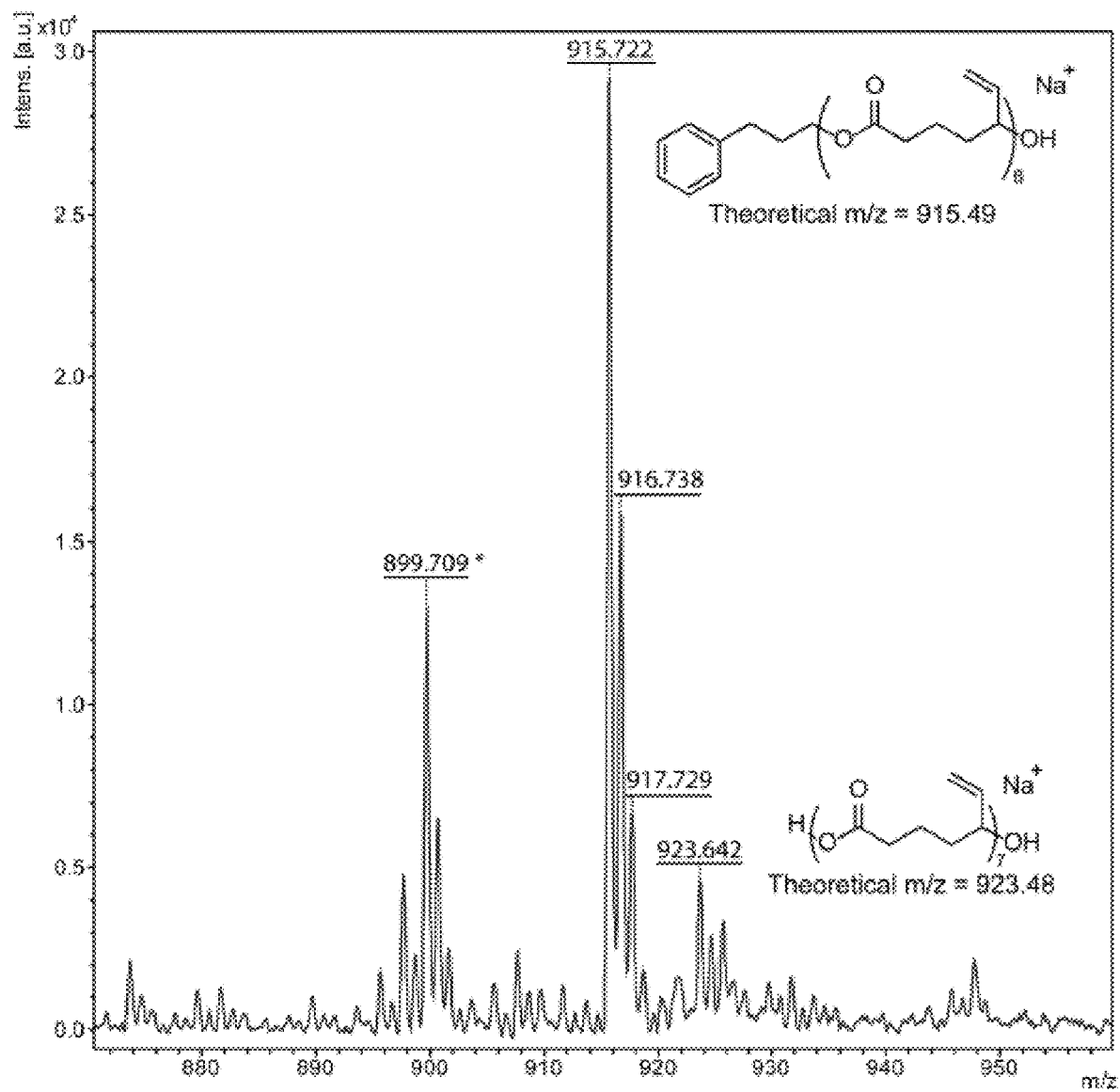
FIG. 12 shows a MALDI-TOF analysis of homopolymer P1 synthesized using a [M]:[C]:[I] ratio of 25:1:1 with the respective m/z peaks labeled with their respective molecules. *m/z of this peak series could not be assigned to any possible combination of ionizing agents (H$^+$, Na$^+$, or K$^+$) and end groups (PhC3H6O/OH or HO/OH for linear chains, or no end groups for cyclics).
Figure 13:
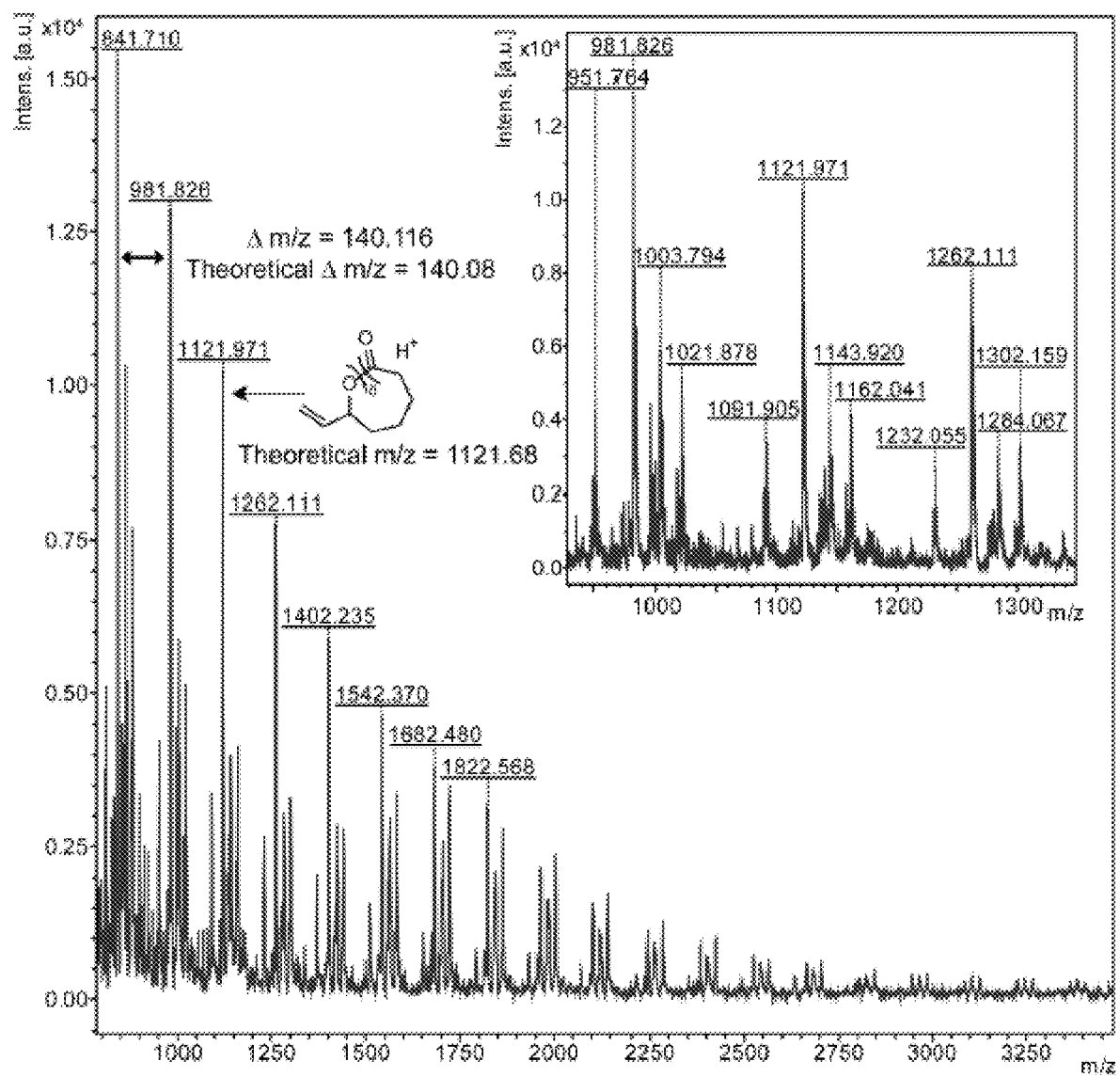
FIG. 13 shows a MALDI-TOF spectrum of the homopolymer P2 synthesized using a [M]:[C]:[I] ratio of 25:1:1.
Figure 14:
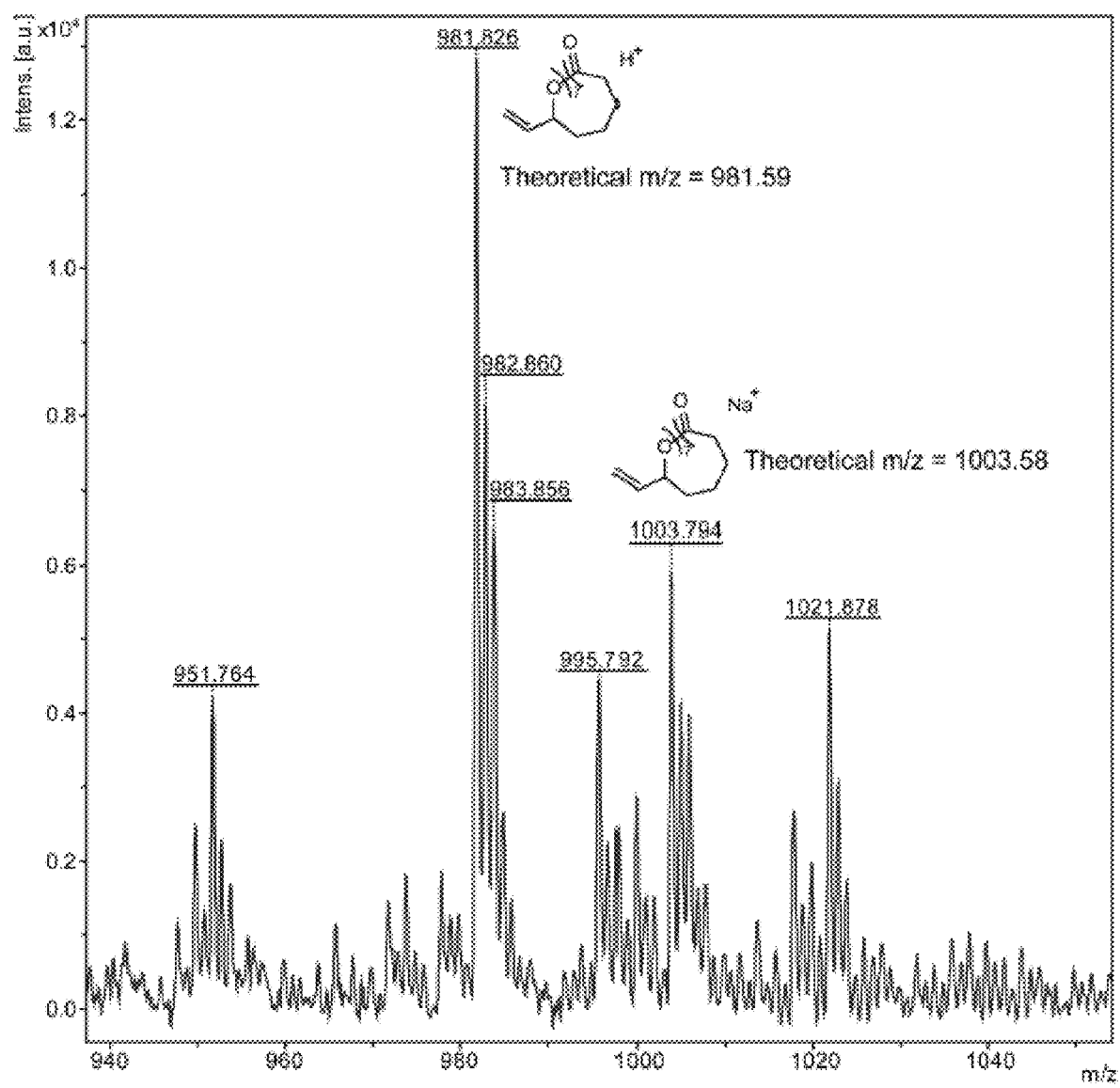
FIG. 14 shows MALDI-TOF analysis of homopolymer P2 synthesized using a [M]:[C]:[I] ratio of 25:1:1 with the respective m/z peaks labeled with their respective molecules.

At 60° C., conversion was considerably accelerated with little impact on Đ or terminal number-average molecular weight (Mn) of P1 (Table 1, entry 6) (FIGS. 6A-9B). Thus, for [1]$_o$/[DPP]/[I]$_o$=100:1:1 at 60° C., a conversion of ~71% was achieved in 25 h (FIG. 25), and the resulting P1 was characterized by gel permeation chromatography with multi-angle light scattering (GPC-MALS) to have $M_n$=4.1± 0.1 kg/mol (degree of polymerization (DP)=28±1) and Đ=1.24±0.01 (Table 1, entry 6) (FIGS. 6A-6C, 9A, 9B and 26). Further reaction led to the concomitant broadening of the molecular weight distribution, expected as a consequence of ring-chain equilibrium.[45] When applied to monomer 2, the same conditions at [2]$_o$/[DPP]/[I]$_o$=100:1:1 afforded monomer conversion of 78±2%, albeit after much longer reaction times (66 h), with P2 $M_n$=5.7±0.9 kg/mol (DP=40±7) and Đ=1.2±0.1 (Table 1, entry 13) (FIG. 10A, 10B). Conversions as high as about 90% were observed for 2. Hence, the ROTEP conditions established for 1—neat at 60° C. with DPP as the catalyst—were also extended to 2.

Figure 15:
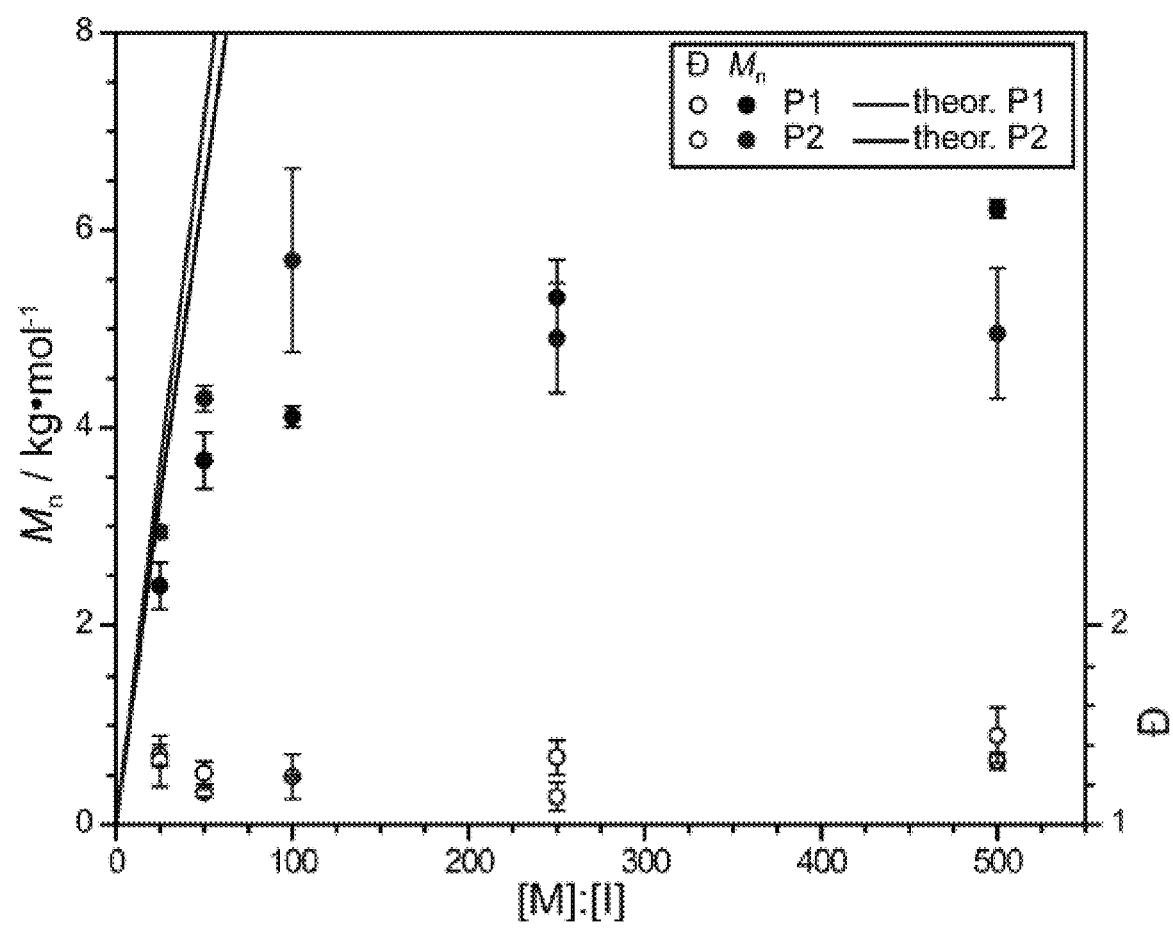
FIG. 15 shows Mn of P1 and P2 vs [M]:[I] for M=1 and 2, respectively. Data plotted here correspond to entries 6-15 in Table 1.
Figure 16:
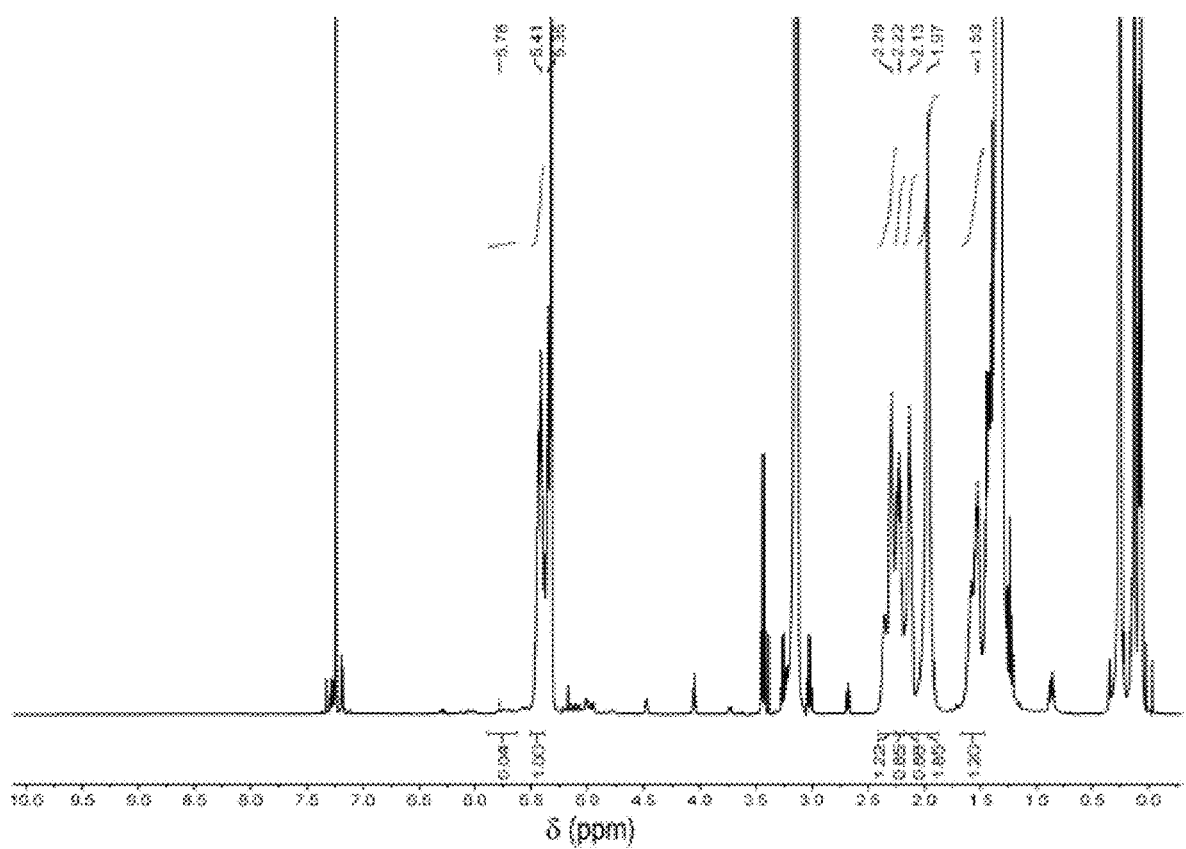
FIG. 16 shows an $^1$H NMR (600 MHz, CD$_2$Cl$_2$, 23° C.) spectrum of P2'.
Figure 17:
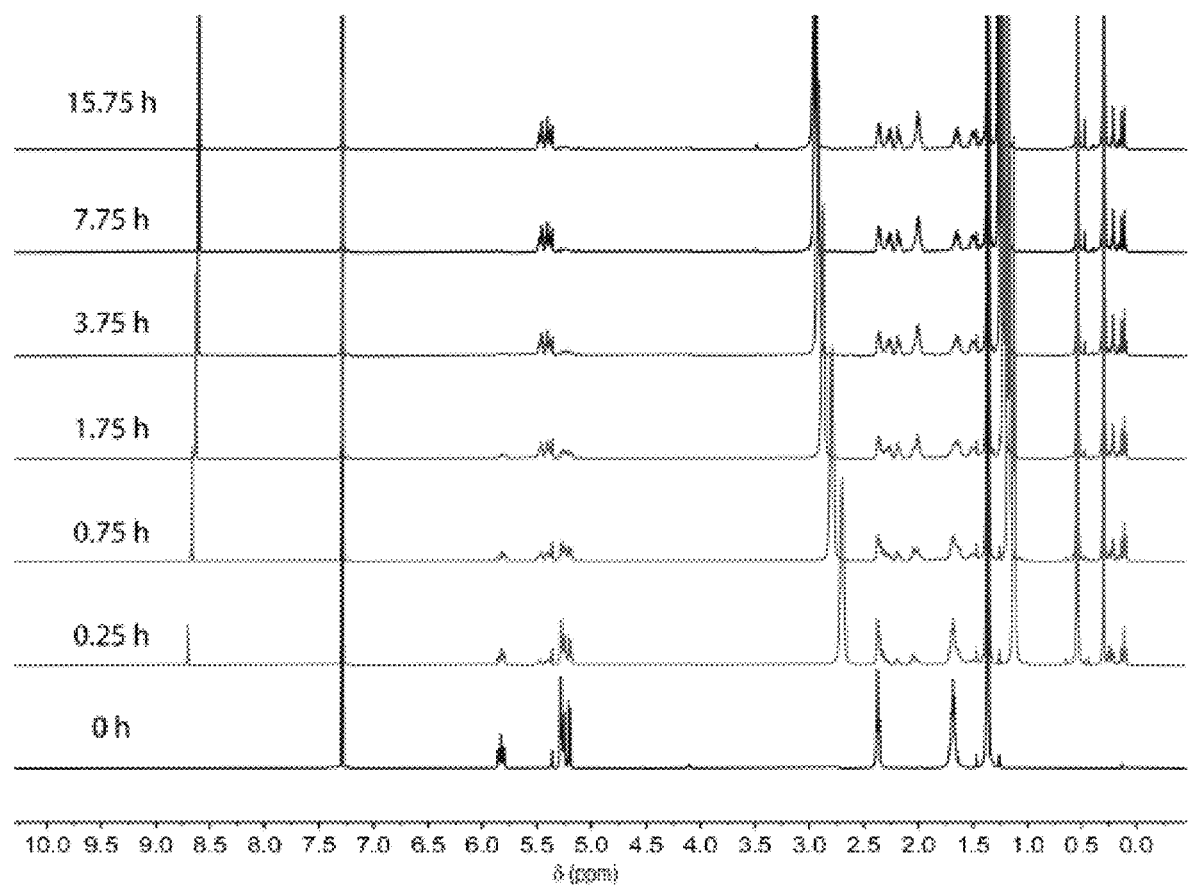
FIG. 17 shows $^1$H NMR (600 MHz, CD$_2$Cl$_2$, 23° C.) at various times throughout the rearrangement of P1 to P1" with 1.20 equiv triethylamine and 1.15 equiv TMSOTf.
Figure 18:
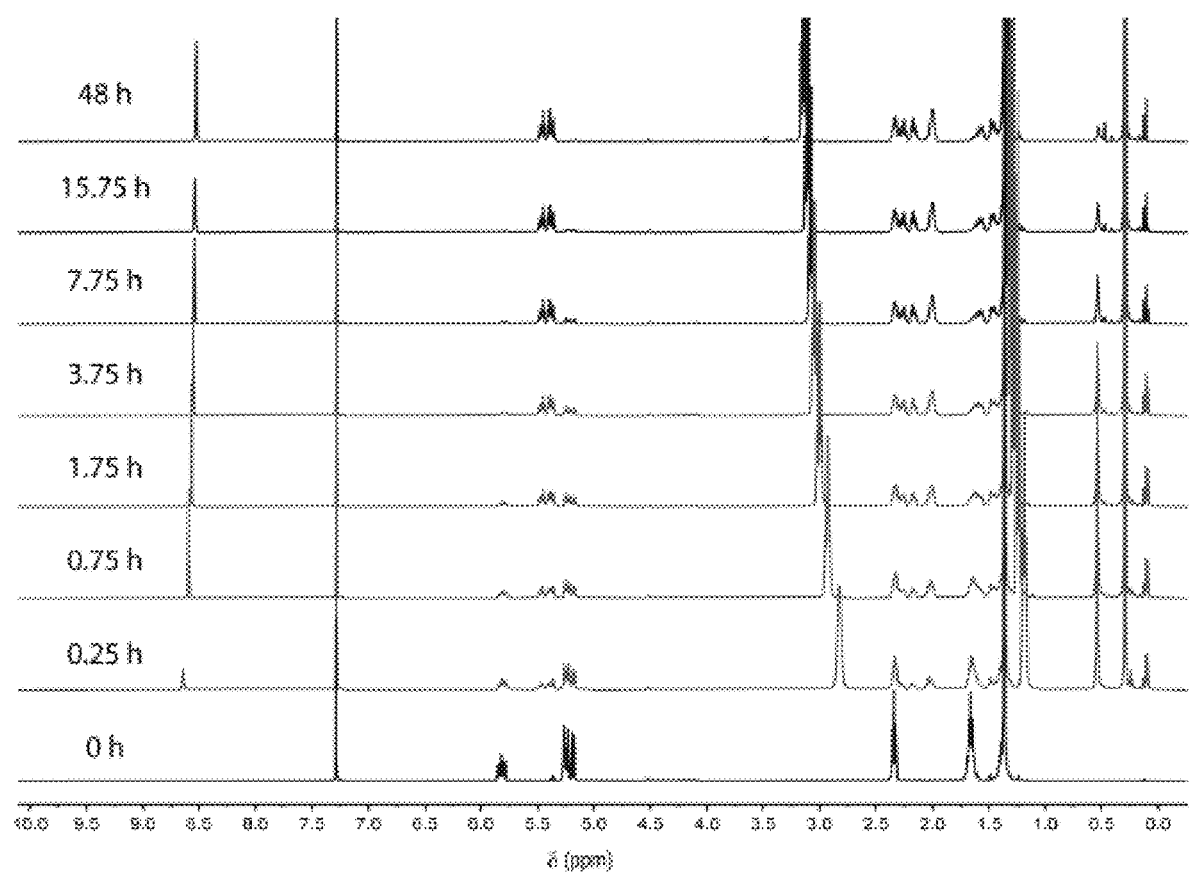
FIG. 18 shows $^1$H NMR (600 MHz, CD$_2$Cl$_2$, 23° C.) at various times throughout the rearrangement of P2 to P2" with 1.20 equiv triethylamine and 1.15 equiv TMSOTf.
Figure 19:
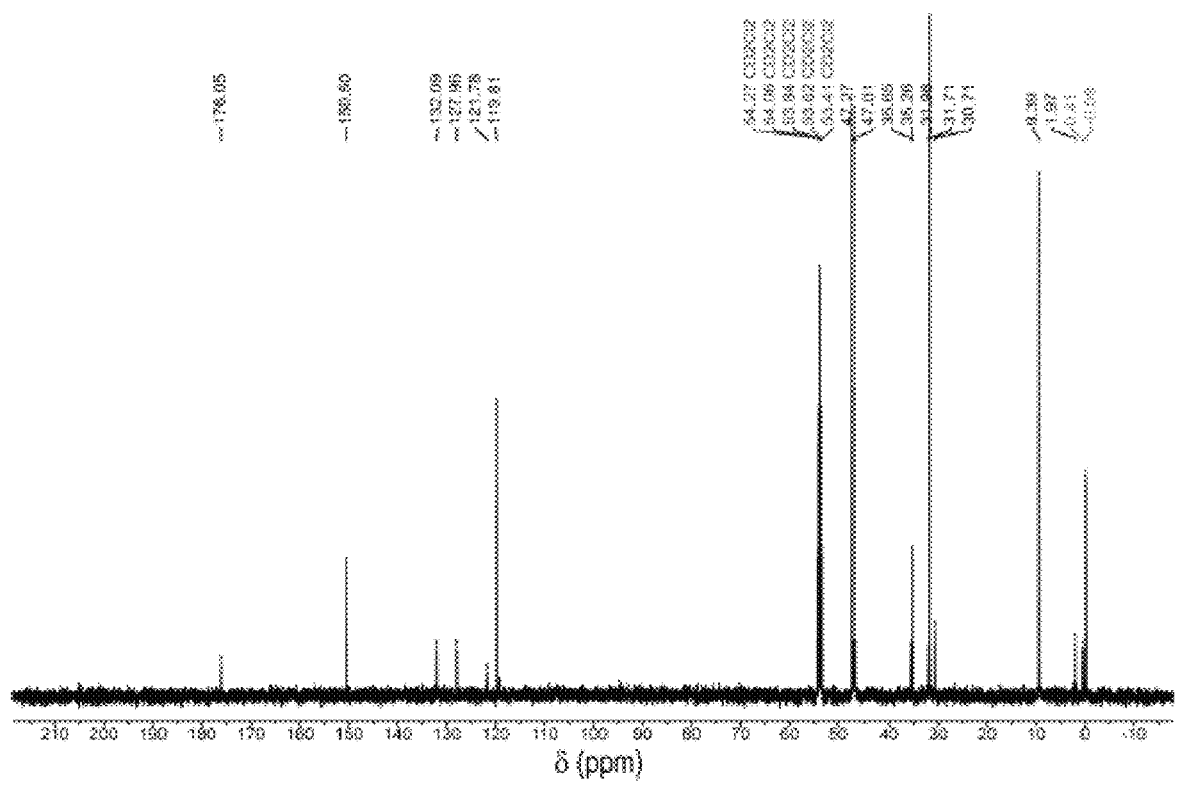
FIG. 19 shows a $^{13}$C NMR (600 MHz, CD$_2$Cl$_2$, 23° C.) spectrum of P1'.
Figure 20:
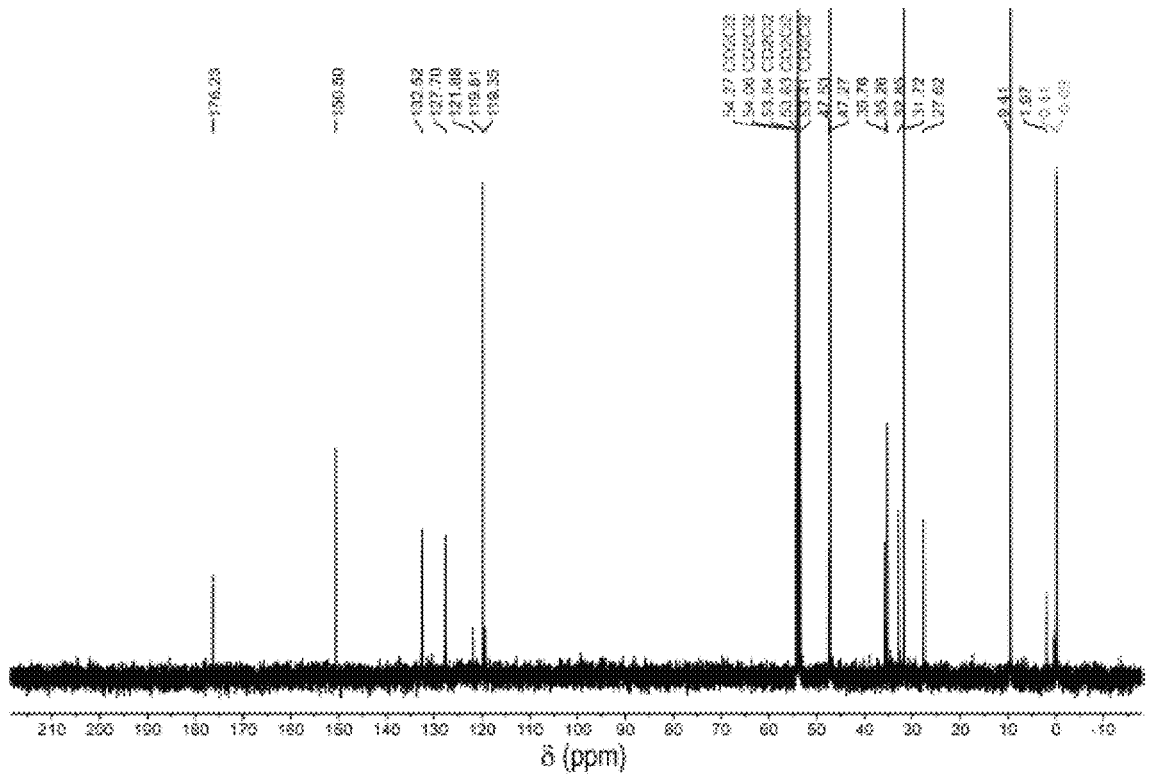
FIG. 20 shows a $^{13}$C NMR (600 MHz, CD$_2$Cl$_2$, 23° C.) spectrum of P2'.
Figure 27:
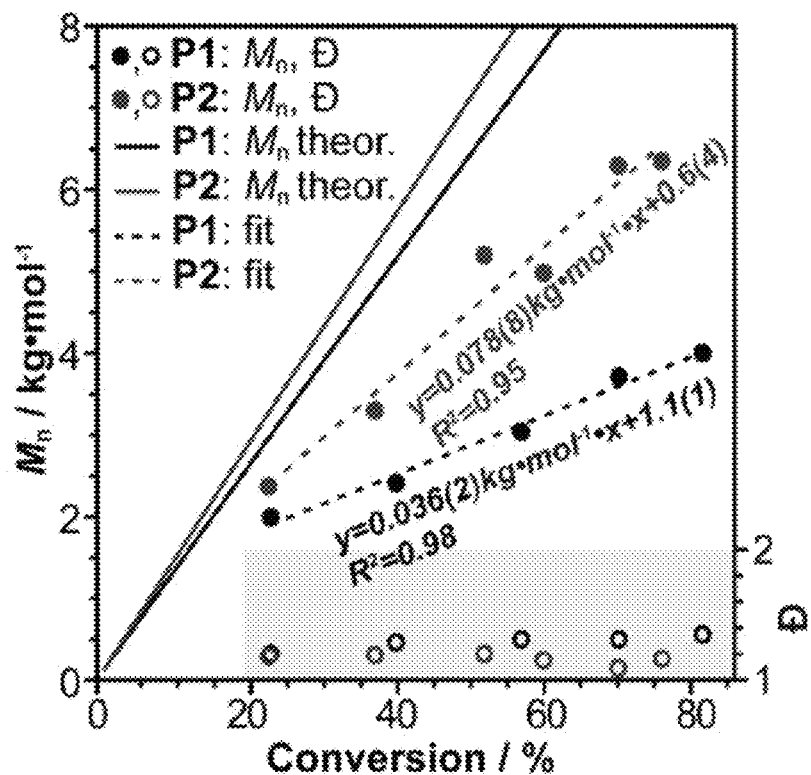
FIG. 27 shows dependence of the M$_n$ and Đ (from GPC-MALS) of P1 and P2 on monomer conversion; equations for the linear fits are provided next to the fits, and standard errors in the last digits of the slope and y-intercept are provided in parentheses.
Figure 28:
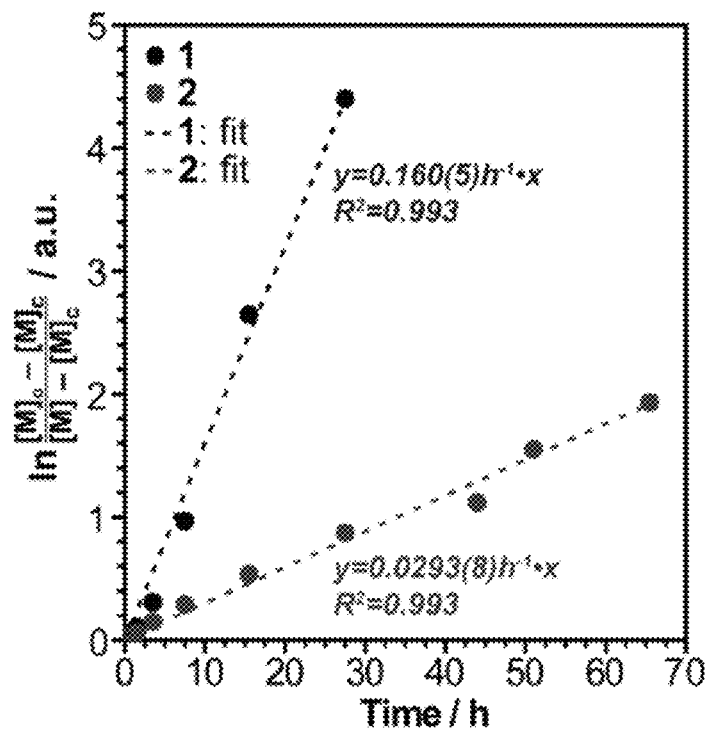
FIG. 28 shows semilogarithmic kinetic plot for the reversible ROTEP of 1 and 2, where equilibrium conversions for 1 and 2 are set to 0.824 and 0.890, respectively; equations are provided for the linear fits with y-intercept fixed at 0, and standard errors in the last digit of the slope are provided in parentheses.
Figure 29:
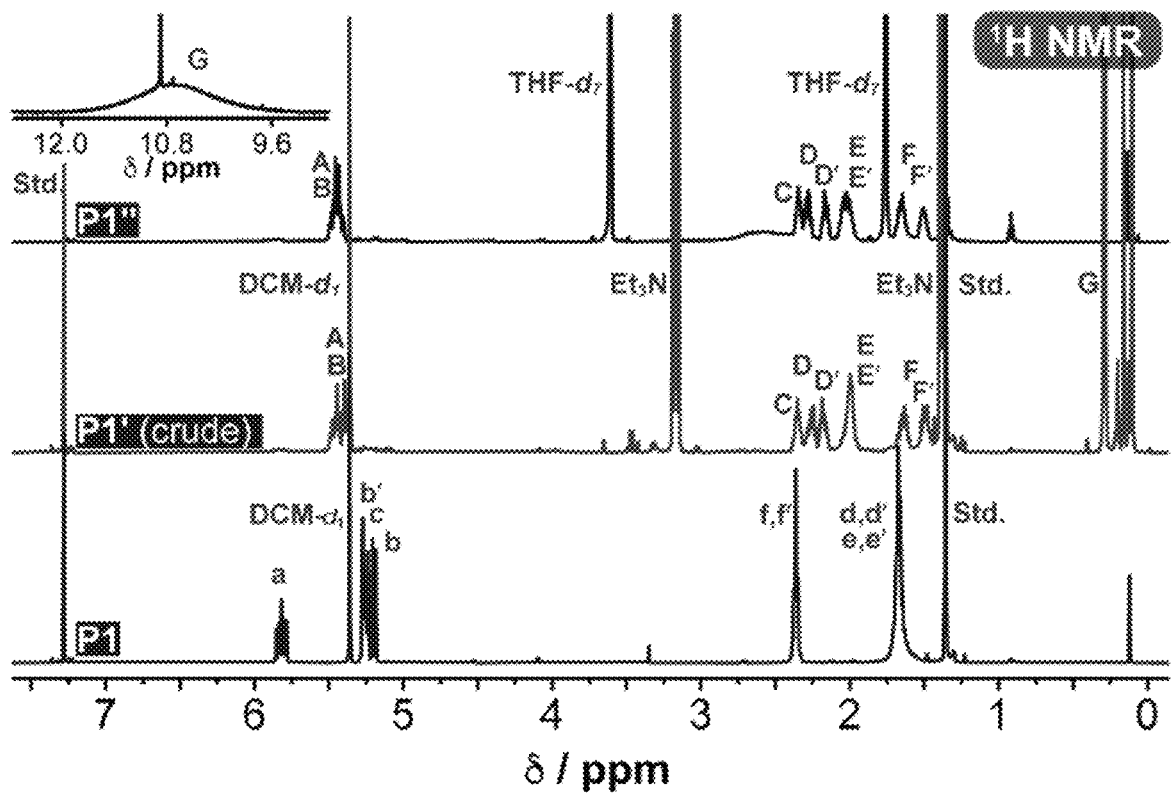
FIG. 29 shows $^1$H NMR spectroscopy of P1, crude P1', and isolated P1", with labeled resonances corresponding to the protons labeled in Scheme 5.

Using these ROTEP conditions (neat at 60° C. with DPP as the catalyst), molecular weight control was investigated. Monitoring the $M_n$ of P1 and P2 as a function of monomer conversion for [1]$_o$/[2]$_o$:[DPP]:[I]$_o$=100:1:1, a linear increase in the $M_n$ was observed. This indicated a degree of molecular weight control (FIG. 27). However, a negative deviation of the molecular weights of P1—less so of P2—from the theoretical, and a gradual increase in Đ from ~1.2 to ~1.4 with conversion, were signs of chain transfer via back-biting and interpolymer transesterification, and the establishment of ring-chain equilibrium.[45] Kinetic analysis indicated reversible chain growth mechanism with rapid initiation compared to propagation[45] (FIG. 28). Matrix-assisted laser desorption ionization time-of-flight mass spectrometry (MALDI-TOF MS) revealed the presence of predominantly linear chains for P1 and cyclic chains for P2, further supporting the analysis described above (FIGS. 11-14). Changing the monomer-to-initiator ratio (with [DPP]=[I]$_o$) led to similar trends to the ones noted when monitoring $M_n$ versus conversion. Namely, an increase in conversion for both monomers, which deviated negatively from the theoretical (FIG. 15, Table S1, entries 7-15). This demonstrated controlled ROTEP of 1 and 2, thereby enabling the preparation of P1 and P2 with $M_n$ as high as 6.2 kg/mol (DP=43) and moderate dispersity (1.2-1.4).

E. Product Polymers Via Backbone Rearrangement

Polymer modification is a fundamental scientific challenge, both as a means of upcycling plastics and extracting from them a stimulus response. To date, the overwhelming majority of examples of polymer modification have focused on the polymer periphery, neglecting the foundational portion of the polymer: its backbone. In contrast, disclosed herein is a quantitative, scission-free conversion of homologous polyester backbones into polyolefins. In one aspect, this conversion occurs via a sigmatropic rearrangement. In an embodiment, a representative sigmatropic rearrangement is the Ireland-Claisen rearrangement.

In another aspect, the thermal, optical, and mechanical properties of the polymers undergo dramatic changes as a consequence of the backbone conversion. Examples of thermal properties include glass transition temperature (Tg) and thermal stability. Furthermore, such polymer backbone modification (PBM) could grant entry to new polymers inaccessible by other means. Additionally, commodity polyesters that incorporate 3-5% of the sigmatropomers disclosed herein, following backbone rearrangement, result in dramatically altered thermal phase behavior. More broadly, PBM could advance the retrosynthetic analysis of polymers by uncovering a chemical kinship between polymer backbones that are not trivially cognate.

The polymers with a backbone comprising sigmatropomer repeat units is subjected to reactions conditions suitable to cause a sigmatropic reaction to occur. This converts the sigmatropomer-containing polymer into a product polymer.

For example, sigmatropomer-containing polymer P1 was subjected to ICR conditions (Scheme 5).

Scheme 5 - Sigmatropic Rearrangement of Polymer Backbone

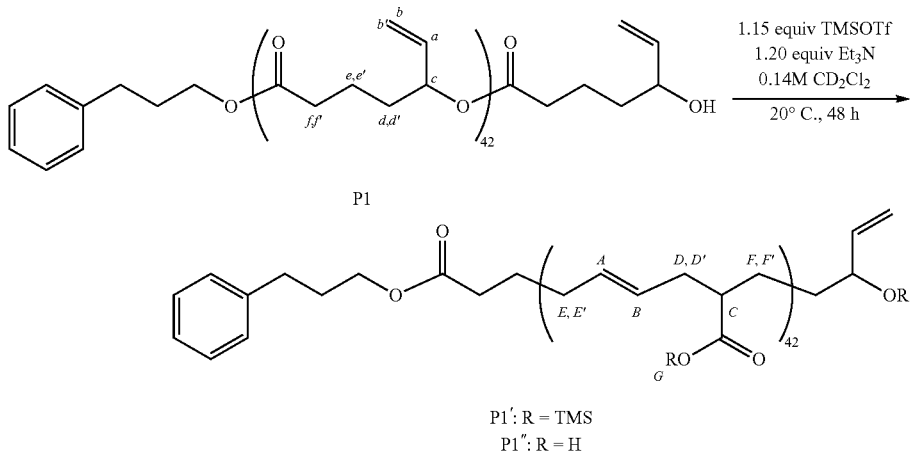

P1′: R = TMS
P1″: R = H

Scheme 5 shows the Ireland-Claisen rearrangement (ICR) of P1 to P1′ with labeled protons/carbons (standard=1,3,5-tris(tert-butyl)benzene).

Figure 30:
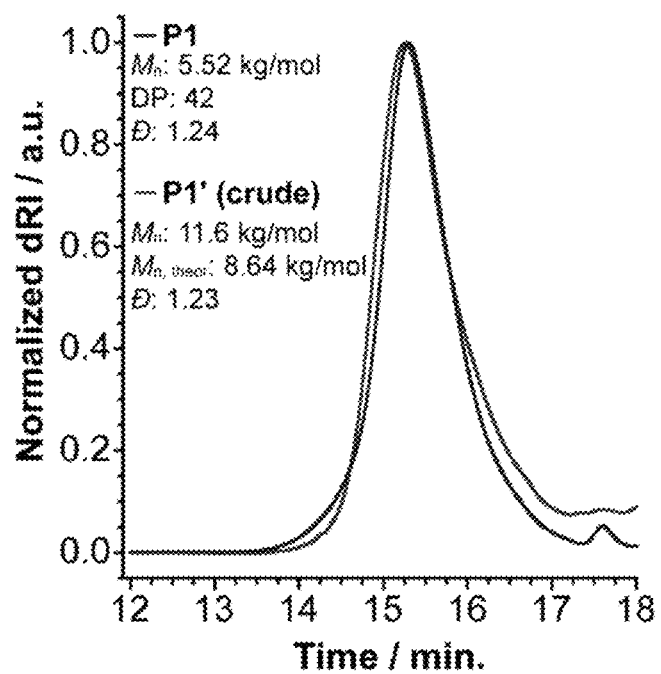
FIG. 30 shows GPC-MALS analysis of P1 and crude P1', with the corresponding M$_n$, DP, and Đ indicated. dn/dc of P1' is 0.634 in THF at 35° C.

More specifically, purified P1 and P2 were subjected to the ICR conditions developed by Nakai, Kobayashi, and coworkers.[46] Addition of 1.20 equiv of triethylamine (Et$_3$N) followed by 1.15 equiv of trimethylsilyl triflate (TMSOTf) at 20° C. in anhydrous CD$_2$Cl$_2$ led in 48 h to nearly quantitative transformation of P1 to P1′ (88% conversion) and P2 and P2′ (96% conversion) (Scheme 3 and FIG. 15), as evidenced by $^1$H and $^{13}$C nuclear magnetic resonance (NMR) (FIGS. 16-20 and 29). For instance, substitution of resonances a, b, and b′ with resonances A and B is indicative of the conversion of terminal olefins to internal ones. Additionally, the chemical shift of the new carbonyl $^{13}$C resonance (176.1 ppm, FIG. 19) is consistent with that observed for aliphatic trimethylsilyl (TMS) esters.[47] A minor set of resonances (~5-10% abundance based on TMS $^1$H resonance integration) was also noted, which corresponds to equilibrium silylation of P1, P2, P1′, and P2′ with TMSOTf and Et$_3$N[48]; this silylation of P1′ and P2′ is undone during workup (vide infra). No chain scission was observed by GPC-MALS (FIG. 30). In short, this polymer transformation is remarkably effective.

Figure 21:
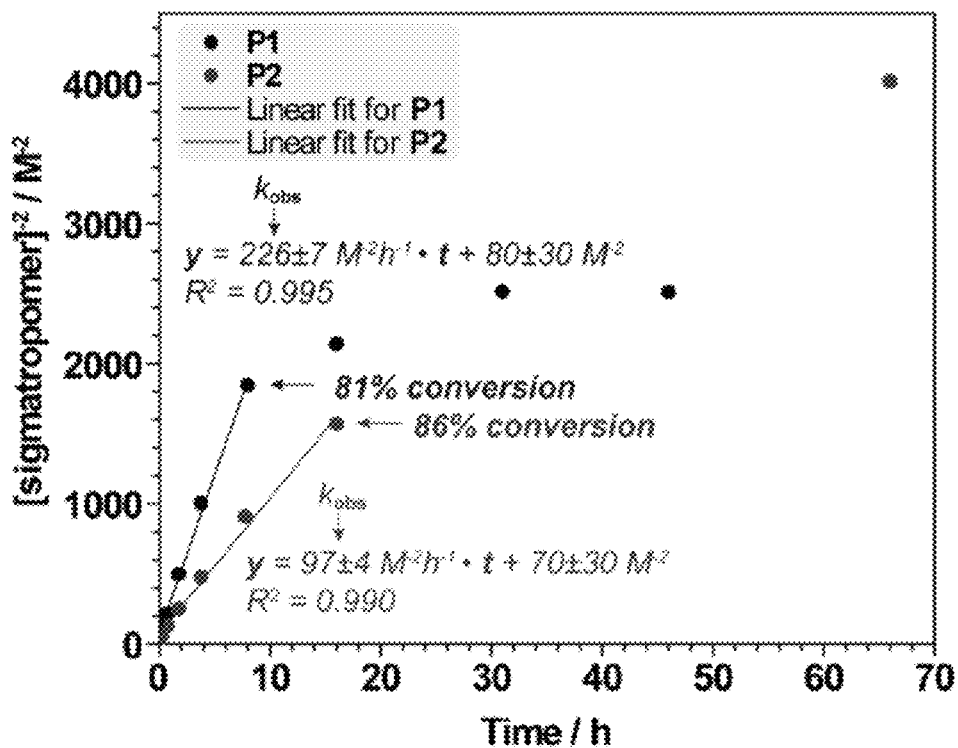
FIG. 21 shows a kinetic plot for the rearrangement of P1 to P1' and P2 to P2' using TMSOTf and triethylamine at 20° C. over 48 hours.

ICR of both P1 and P2 follows third order kinetics (FIG. 21) until conversion is nearly complete. Consistent with the mechanism, rapid equilibrium formation of a silyl ketene acetal and triethylammonium triflate precedes the rate-determining exergonic rearrangement step (see, e.g., Example 5). Notably, despite the well-behaved kinetics, we cannot rule out deviation from statistical rearrangement along the polymer backbone because ICR of one sigmatropomer may affect the kinetics of the rearrangement of its neighbors. Further investigation is underway to address this question.

Figure 22:
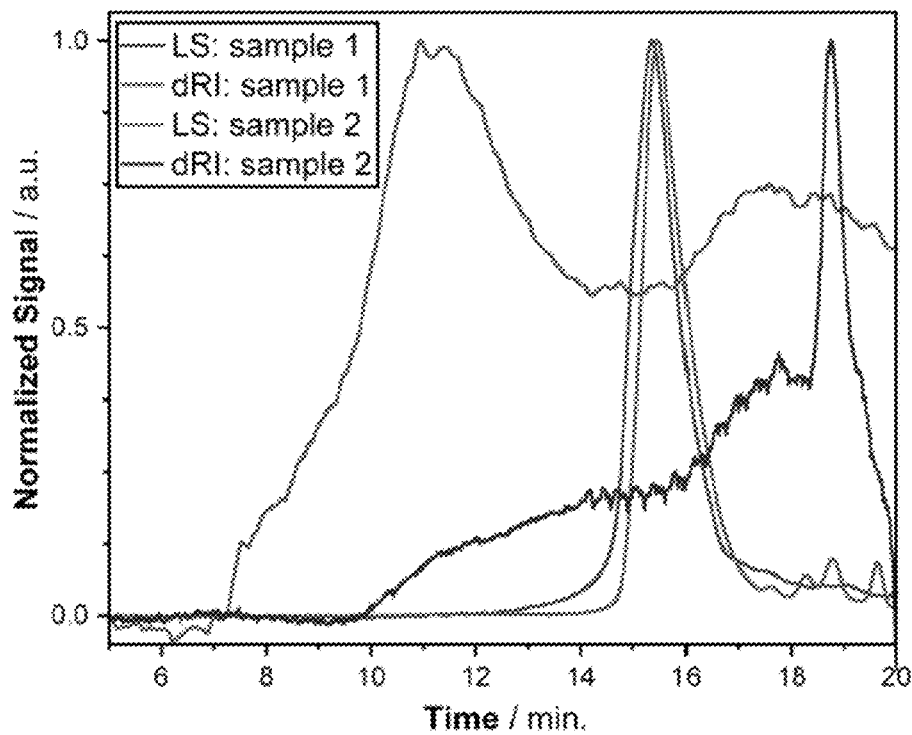
FIG. 22 shows normalized GPC-MALS light scattering (LS) and differential refractive index (dRI) traces of the rearranged and isolated material P1" showing variability in the GPC traces due to solubility and cross-linking in the material.

The silyl esters of P1′ and P2′ may be removed by brief treatment with 1M aqueous ammonium fluoride (NH$_4$F). After concentration and trituration with dichloromethane, protonation of the carboxylate anions with 1M HCl afforded carboxylic acid-functionalized polymers P1″ and P2″ (Scheme 5), which are constitutional isomers of P1 and P2, in 80% and 56% isolated yields, respectively. Notably, the isolated polyacids were poorly soluble in organic solvents, which rendered accurate GPC-MALS analysis challenging (FIG. 22). Without being bound by theory, it is believed that low levels of cross-linking upon workup lead to the insolubility.

P1″ is similar in structure to poly(1,4-butadiene-alt-acrylic acid) as both are vinyl polymers. The preparation of poly(1,4-butadiene-alt-acrylic acid) is, in principle, feasible through copolymerization of butadiene and an acrylate. While this methodology has been explored,[49-51] free radical polymerization methodology that was employed results in poor control over molecular weight and dispersity, sequence, 1,4-versus 1,2-addition of butadiene, and E/Z-isomerism. In contrast, the rearrangement methodology described herein resolves all these limitations and enables the preparation of precision analogues of materials utilized both in industry and academia (e.g., as oil-resistant resins like Hycar®).[52-53] Moreover, P2″ is an entirely novel polymer, which cannot be readily accessed through vinyl polymerization.

Figure 23:
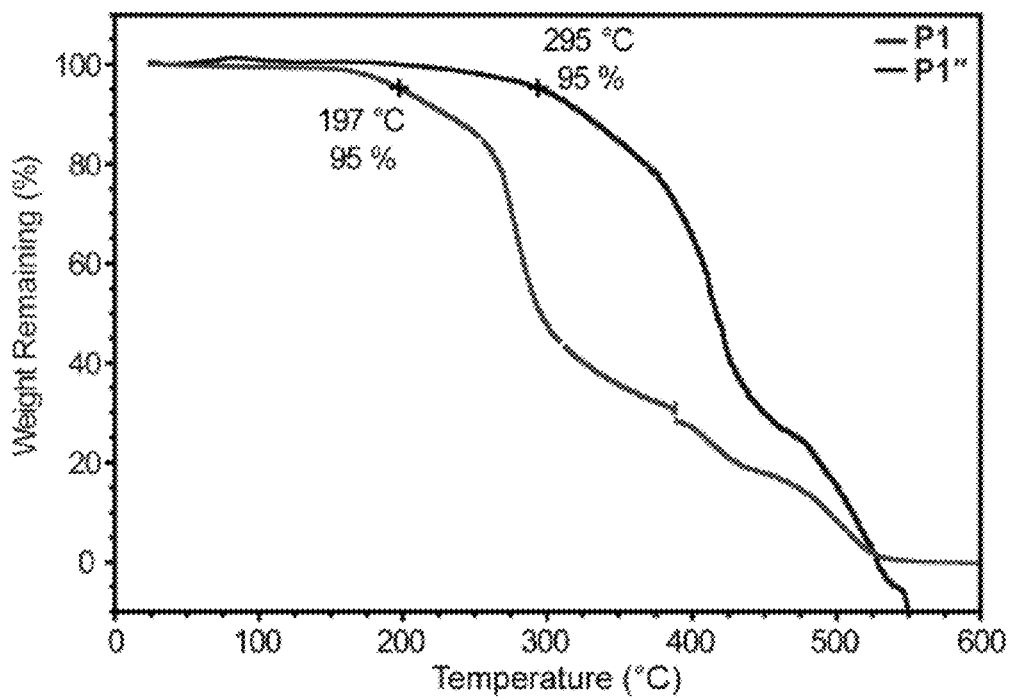
FIG. 23 shows TGA traces for P1 and P1".
Figure 24:
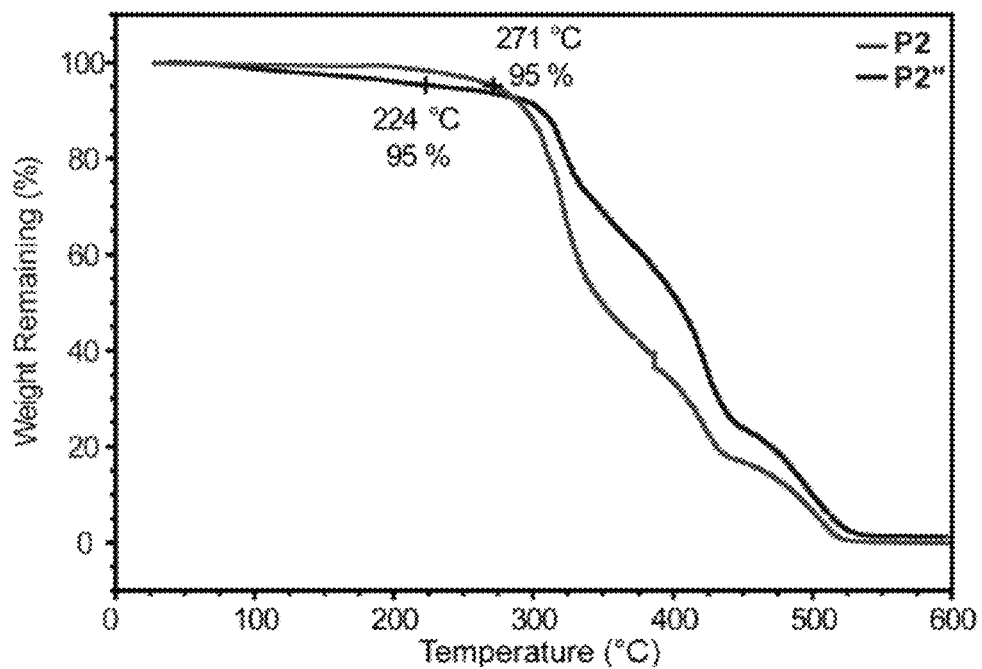
FIG. 24 shows TGA traces for P2 and P2".

Polymer backbone modification brought about dramatic changes in the thermal properties of the polymers. Differential scanning calorimetry (DSC) revealed that the glass transition temperatures ($T_g$) of P1″ and P2″ were ~60° C. greater than those of P1 and P2, respectively. Furthermore, based on thermal gravimetry analysis (TGA), P1″ displayed a ~95° C. enhancement in thermal stability compared to P1, as judged by the temperature beyond which >5% mass was lost (FIG. 23). Meanwhile, P2″ shows an initial 50° C. decrease in thermal stability at 5% degradation but after 10% degradation, P2″ shows a ~10-15° C. increase in thermal stability compared to P2. (FIG. 24). These changes are consistent with transformation of a polyester into a more thermally stable all-carbon backbone, with pendent carboxylic acids capable of hydrogen bonding.

Sigmatropic rearrangements may be affected using methods known in the art. These methods include heating the sigmatropomer-containing polymer, and/or contacting the sigmatropomer-containing polymer with acid or base. Non-limiting examples of bases used include hindered amine bases such as lithium diisopropyl amide (LDA), triethylamine (TEA), lithium hexamethyldisilazide (LiHMDS), potassium hexamethyldisilazide (KHMDS). Additional bases include hydride bases such as sodium hydride and potassium hydride, basic alcohols such as potassium t-butoxide, and phosphazene superbases such as 2-tert-butylimino-2-diethylamino-1,3-dimethylperhydro-1,3,2-diazaphosphorine (BEMP) and 1-tert-Butyl-4,4,4-tris(dimethylamino)-2,2-bis[tris(dimethylamino)-phosphoranylidenamino]-2λ5,4λ5-catenadi(phosphazene) (i.e., t-Bu-P4).

The polymers prepared may be atactic. In alternative embodiments, the polymers may be highly diasteroselective and/or stereospecific.

Sigmatropic PBM may induce changes in polymer properties, including Tg, degradability, and ion transport. For instance, polyesters P1-P3 may have low Tg values (~−50° C.), while P1'-P3', upon de-silylation, would present a large content of pendant carboxylic acids whose hydrogen bonding is expected to afford values of Tg approaching that of atactic polyacrylic acid (~105° C.), a difference of ~150° C. The opposite effect may be observed for the conversion of P4 and P5 to P4' and P5' due to the elimination of hydroxyl groups capable of hydrogen bonding. Further, oxidative stability of the polymer backbones will altered. For example, P4' and P5' may be considerably more resistant to oxidative degradation compared to P4 and P5.

Accordingly, in some embodiments, product polymers are formed. In some embodiments, the product polymers comprise repeat units represented by the structure of Formulae V and VI.

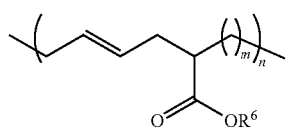

Formula V

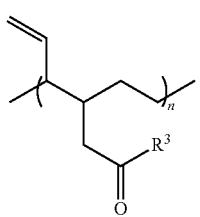

Formula VI

In some embodiments, m is an integer from 1-3, n is an integer from 2-10,000, as defined herein, $R^3$ is hydrogen or alkyl, and $R^6$ is hydrogen or silyl. In a further embodiment, $R^3$ is methyl.

Besides the properties described above, we expect that numerous other properties will change upon rearrangement of the polymer backbone. These changes include persistence length, entanglement molecular weight, modulus and tensile strength, and heat and ion transport.

F. EXAMPLES

The following preparations and examples are given to enable those skilled in the art to more clearly understand and to practice the present invention. They should not be considered as limiting the scope of the invention, but merely as being illustrative and representative.

In one aspect, disclosed are methods of making the monomers. In another aspect are disclosed methods of polymerizing the monomers to form polymers. In another aspect is modification of the backbone of the polymers.

Example 1: General Procedures

Purchased Materials: Glutaraldehyde was purchased from Alfa Aesar as a 50% aqueous solution and purified via reported procedures.[56] Deuterated solvents were purchased from Cambridge Isotope Laboratories, Inc. and were used as received. Molecular sieves were purchased from both Fisher Scientific and Sigma Aldrich and were activated by heating at 250° C. under dynamic vacuum (~60 mTorr) for 6 h. For anhydrous reactions, deuterated solvents were degassed using the freeze-pump-thaw technique and stored over 3 Å molecular sieves. 1,8-Diazabicyclo[5.4.0]undec-7-ene (DBU), 1.0 M vinylmagnesium bromide solution in tetrahydrofuran (THF), benzoic acid, pyridine, pyridinium chlorochromate (PCC), ethyl-6-hydroxyhexanoate (S1), trimethylsilyl trifluoromethanesulfonate (TMSOTf), 4-(dimethylamino)pyridine (DMAP) and 1,5,7-triazabicyclo[4.4.0]dec-5-ene (TBD) were purchased from Sigma Aldrich and used as received. Potassium hydroxide, diethyl ether, and concentrated HCl were purchased from Fisher Scientific and used as received. 1-(3-Dimethylaminopropyl)-3-ethylcarbodiimide hydrochloride was purchased from TCI America and used as received. Tin (II) trifluoromethanesulfonate (tin triflate) was purchased from Strem Chemicals and used as received. Ammonium fluoride was purchased from Alfa Aesar and used as received. 1,3,5-tri-tert-butyl benzene was purchased from Combi-Blocks and dried by heating at 80° C. under vacuum (~60 mTorr). E-Caprolactone was purchased from Alfa Aesar, degassed by three freeze-pump-thaw cycles, and stored over 3 Å molecular sieves. o-Hexalactone was purchased from TCI America, degassed by three freeze-pump-thaw cycles, and stored over 3 Å molecular sieves. Diphenyl phosphate (DPP) and 1,3-diphenylurea (DPU) were purchased from Oakwood Chemicals and dried by heating at 80° C. under vacuum. 3-phenylpropan-1-ol was purchased from Oakwood Chemicals and was degassed by three freeze-pump-thaw cycles and stored over 3 Å molecular sieves. 3,5-Bis(trifluoromethyl) bromobenzene was purchased from Matrix Scientific and was degassed by three freeze-pump-thaw cycles and stored over 3 Å molecular sieves. Dichloromethane (DCM), THF, hexanes and, ethyl acetate were purchased from VWR and used as received. Reactions requiring anhydrous and air-free DCM, diethyl ether, THF, and triethylamine were dispensed through a Pure Process Technologies solvent purification system.[56] SiliaFlash F60 silica gel size 230-400 mesh (40-63 μm) and glass backed TLC plates were purchased from Silicycle and used as received.

Nuclear magnetic resonance (NMR) spectroscopy: $^1$H and $^{13}$C NMR spectra were recorded on Bruker NMR spectrometers operating at 400, 500, and 600 MHz for $^1$H (100, 125, and 150 MHz for $^{13}$C, respectively). These instrument models are listed here with the corresponding supporting federal grants: Bruker AVANCE III Nanobay 400 MHz, Bruker AVANCE III 500 MHz, Bruker AVANCE III 600 MHz, and Bruker AVANCE NEO 600 MHz. Chemical shifts are expressed in parts per million (ppm), and splitting patterns are designated as s (singlet), d (doublet), t (triplet), q (quartet), sept (septet), oct (octet), m (multiplet), b (broad), and combinations thereof. Scalar coupling constants J are reported in Hertz (Hz). MestReNova v14.1.0-24037 software (Mestrelab Research S.L.) was used to analyze the NMR spectra. $^1$H and $^{13}$C NMR spectra were referenced to residual monoproteo-solvent peaks as reported in literature.[57] Matrix assisted laser desorption/ionization time of flight (MALDI-TOF) spectroscopy: MALDI-TOF mass spectrometry was performed on a Bruker Microflex LRF with 15k resolution. Samples were prepared as follows. The purified polymer synthesized at a target degree of polymerization of 25:1:1 [M]:[C]:[I] was concentrated to dryness and redissolved in high-performance liquid chromatography (HPLC)-grade tetrahydrofuran (THF) at a concentration of ~1 mg/mL (Solution A). Next, a ~15 mg/mL solution of 2,5-dihydroxybenzoic acid (DHB) was prepared in HPLC-grade THF (solution B). Lastly, sodium iodine was dissolved in acetone at a concentration of 1 mg/mL (solution C). 5 μL of Solution A were mixed with 5 μL of Solution B. 1 μL of Solution C was spotted onto a MALDI plate and allowed to evaporate at 24° C. After complete evaporation of acetone was achieved, 1 μL of the resulting mixture was spotted onto a MALDI plate and allowed to evaporate at 24° C. The calibration was carried out using a mix of peptides, ranging in mass from ~300 g/mol to ~3000 g/mol, and the samples were ionized using 90-100% laser power.

Gel Permeation Chromatography (GPC):

Analytical GPC was performed on an Agilent Technologies 1260 Infinity II instrument equipped with two PL gel 10 μm mixed-B LS columns connected in series, with tetrahydrofuran (THF) (35° C.) as the eluent, a Wyatt Technologies DAWN 8-angle light scattering (MALS) detector ($/\therefore=658$ nm), a Wyatt Technologies ViscoStar differential viscometer, and a Wyatt Technologies Optilab T-rEX differential refractometer. The samples were prepared by dissolution of the polymer samples at a concentration of ~3 mg/mL in HPLC-grade THF stabilized with butylated hydroxytoluene (BHT), followed by filtration through a 0.22-μm syringe filter. The dn/dc values were calculated for purified polymers in Astra software using the 100% mass recovery method.

Preparative-scale GPC (prep-GPC) was performed on Recycling Preparative HPLC LaboACE LC-5060 Series equipped with JAIGEL-2 HR column and a UV and RI detectors, with dichloromethane (DCM) at room temperature (rt) as the eluent. The samples were prepared by dissolution of the polymer samples up to a concentration of 40 mg/mL in HPLC-grade DCM stabilized with amylene, followed by filtration through a 0.22-μm syringe filter. Samples were injected into the sample loop and recycled through the columns until baseline separation was obtained for the desired peak.

Differential Scanning Calorimetry (DSC):

This analysis was carried out using a TA Instruments Discovery DSC using aluminum pans, in air, with a heating and cooling rate of 10° C./min. Melting-transition temperature (Tm) and glass-transition temperature (Tg) were obtained from the second heating scan.

Thermogravimetric Analysis (TGA):

This analysis was carried out using a TA Instruments Q5000 Thermogravimetric Analyzer. Characterization was performed under nitrogen using aluminum pans with a heating rate of 10° C./min from room temperature to 600° C. Values for the decomposition onset temperature were obtained from weight percent vs temperature (° C.) plots.

General Synthetic Protocol:

All air-sensitive reactions were carried out in flame-dried glassware in a nitrogen-filled glove box or using standard Schlenk techniques. Hamilton gas-tight syringes were cleaned by rinsing with copious amounts of DCM and drying under a stream of N2. Reactions were monitored via $^1$H NMR and TLC, and TLC plates were visualized via standard staining procedures. Removal of solvents in vacuo was achieved using a IKA rotary evaporator and a Schlenk line (~12-60 mTorr, dynamic vacuum). Purification via flash chromatography was carried out following standard procedures.[58]

Example 1: Synthesis of Monomer 2

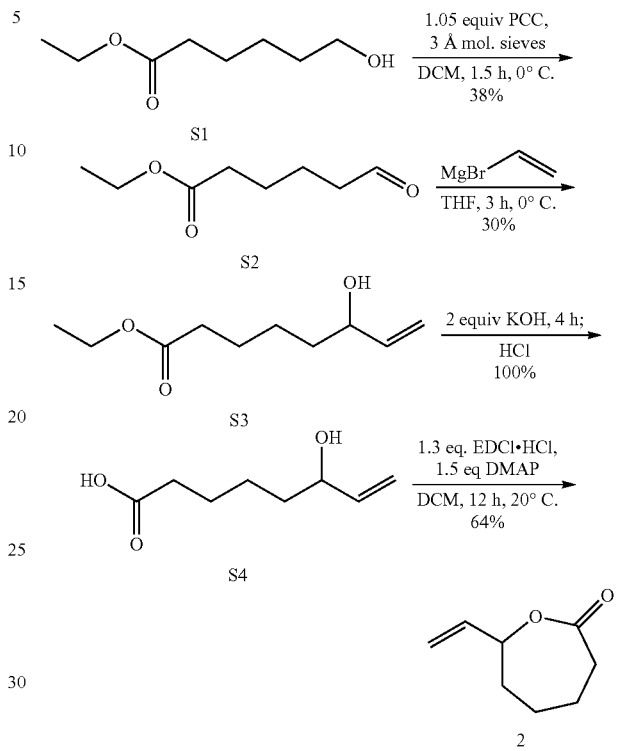

Ethyl 6-oxohexanoate, S2 (20.245 g, 90% purity, 38% yield) was synthesized from ethyl-6-hydroxyhexanoate, S1, (48.06 g) and PCC according to the cited reference, except powdered 3 Å molecular sieves (105.0 g) were added to the suspension instead of sodium acetate.[59] $^1$H NMR spectra matched reported.

Ethyl 6-hydroxy-7-octenoate, S3 (6.925 g, 29.4% yield) was synthesized from S2 (20.0 g) and vinylmagnesium bromide (1.0 M in THF) according to the cited reference.[59] $_1$H NMR spectra matched reported.

6-hydroxy-7-octenoic acid, S4 (4.79 g, 90.4% yield) was synthesized from S3 (6.24 g), potassium hydroxide, and hydrochloric acid according to the cited reference, except the reaction was carried out as a 1.34 M solution and the product was used without purification by flash silica gel chromatography.[60] $^1$H NMR spectra matched reported.

7-inyloxepan-2-one, 2 (2.98 g, 63.5% yield) was synthesized S4 (5.300 g), EDC. HCl, and 4-dimethylaminepyridine according to the cited reference, except the reaction was run for 12 hours and the product was purified by silica gel flash chromatography in DCM (Rf=0.27).[60] $^1$H NMR spectra matched reported.

Example 2: Synthesis of Monomer 1

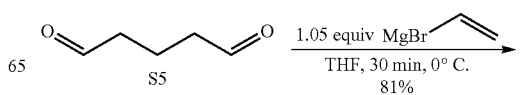

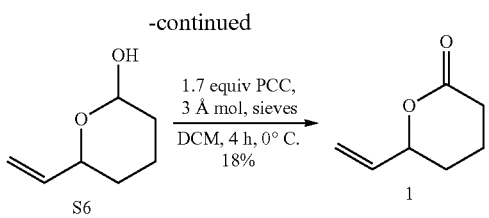

6-vinyltetrahydro-2H-pyran-2-ol, S6. To a 2-neck 2 L round-bottom equipped with a stir bar under an inert atmosphere containing glutaraldehyde, S5, (41.18 g, 411.3 mmol) in THF (600 mL), a solution of vinyl magnesium bromide in THF (1.0 M, 432 mL) was added dropwise over 30 minutes at 0° C. After complete addition of the vinyl magnesium bromide solution, all starting material was consumed. The reaction was quenched with saturated aqueous ammonium chloride (200 mL). The aqueous layer was extracted with diethyl ether (3×300 mL), washed with brine (4×500 mL), dried over magnesium sulfate, filtered, and concentrated in vacuo. S6 was obtained as a viscous, yellow oil (mixture of diastereomers, 42.9 g, 81.4% crude yield) and used without further purification. $^1$H NMR spectra matched reported literature spectra.[61]

o-vinyl-o-valerolactone, 1. To a 3-neck 500 mL round-bottom equipped with a stir bar under an inert atmosphere containing PCC (94.712 g, 439.4 mmol) and powdered 3 Å molecular sieves (92.60 g) in DCM (262 mL), S6 (42.91 g, 334.8 mmol) in DCM (104 mL) was added slowly via cannula at 0° C. After 30 minutes, the reaction was warmed to 25° C. and stirred for another 1.5 hr. Additional PCC (36.02 g, 167.1 mmol) was added and stirred for 2 hours. The resulting material was filtered over celite, concentrated in vacuo, passed through a silica plug (7-8 in) with diethyl ether as eluent to remove PCC byproducts, and concentrated in vacuo. 1 was purified via flash silica gel chromatography in DCM (Rf=0.20) to afford pure material as a pale yellow oil. $^1$H NMR spectra matched reported literature spectra.[61]

Example 3: Methods for Polymerization of Monomers

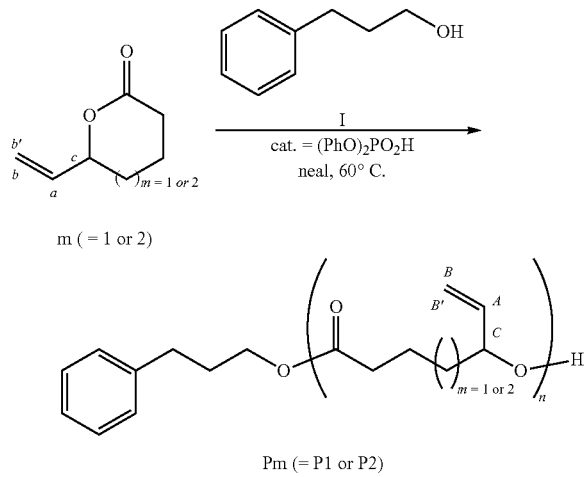

Representative Procedure: In a glove box with nitrogen atmosphere, to a 2.0 mL scintillation vial containing a stir bar, stock solutions of diphenyl phosphate (0.01 equiv) and 3-phenylpropan-1-ol (0.0100 equiv) in DCM were added via Hamilton syringe and solvent was removed in vacuo. To the vial, 1 (1.00 equiv) and internal standard 1-bromo-3,5-bis (trifluoromethyl) benzene (10.0 μL) were added. The reaction was stirred at a specified temperature until conversion stopped as judged by 1H NMR. The reaction was quenched with triethylamine (1.50 equiv) and removed from the glove box. Product was purified via prep-GPC in DCM, concentrated in vacuo, and dried by sparging with N2.

Conversion was monitored by $^1$H NMR as follows: resonances corresponding to protons "a" and "A" in 1 and P1, respectively, were integrated separately, and the total area of integration was set to 100.00. The percent conversion was taken as the area of integration for P1. Comparison of the total integration of these resonances to the internal standard (1-bromo-3,5-bis (trifluoromethyl) benzene) was unchanged between the beginning and end of the polymerization.

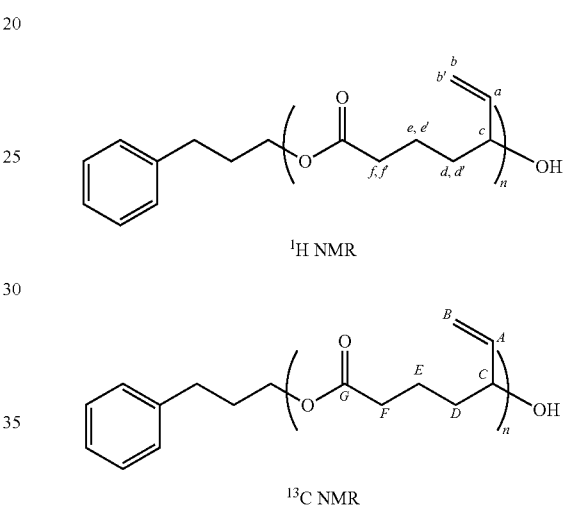

Synthesis of P1. Prepared from 1 following the general procedure on a 599.4 mg scale at 60° C. for 20 h. Isolated as a viscous pale-yellow liquid (404 mg, 67.4% yield). 1H NMR (600 MHZ, CDCl$_3$) δ 5.81-5.71 (ddd, 1H, a), 5.29-5.20 (m, 2H, b' and c), 5.20-5.13 (d, 1H, b), 2.43-2.27 (m, 2H, f, f') 1.74-1.59 (m, 4H, d, d', e, and e'). $^{13}$C NMR (600 MHZ, CDCl$_3$) δ 172.6 (G), 136.3 (A), 117.2 (B), 74.4 (C), 34.1 (F), 33.6 (D), 20.6 (E). dn/dc in THF at 35° C.: 0.0771; Mn=5.52 kg·mol$^{-1}$; Mw=6.86 kg·mol$^{-1}$; Đ=1.24. Assignments were confirmed by a combination of HSQC, HMBC, and COSY. Of particular importance were the following observations: (1) coupling between proton "a" and both of the protons "b" and "c" corresponding to the overlapping resonances at 5.29-5.20 ppm. Proton "a" is also coupled to the proton "b" at 5.20-5.13 ppm and is the only proton attached to carbon "A" at 136.1 ppm. (2) Proton "c" at 5.29-5.20 ppm is coupled to protons "d" and "d'" at 1.74-1.59 ppm. Additionally, proton "c" at 5.29-5.20 ppm is attached to carbon "C" at 74.3 ppm while proton "b" at 5.29-5.20 ppm and proton "b" at 5.20-5.13 ppm are both attached to carbon "B" at 117.2 ppm. (3) Carbon G is not directly attached to any protons and shows only HMBC correlation to protons "f" and "f'" at 2.43-2.27 ppm and weaker correlation to protons "e" and "e'" at 1.74-1.59 ppm. Additionally, protons "f" and "f'" are coupled only to protons "e" and "e'" at 1.74-1.59 ppm.

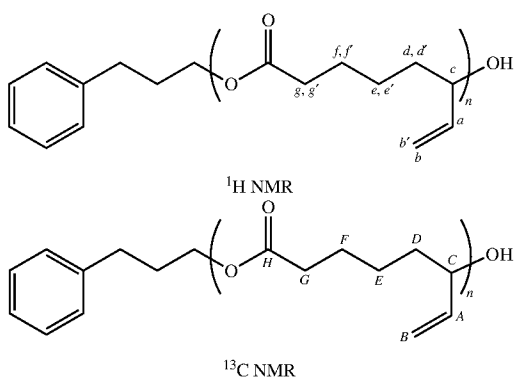

¹H NMR

¹³C NMR

P2. Prepared from 2 following the general procedure on a 321.6 mg scale at 60° C. for 65 h; isolated as a viscous pale-yellow liquid (254 mg, 79.0% yield). 1H NMR (600 MHz, CDCl$_3$) δ 5.80-5.68 (ddd, 1H, a), 5.30-5.18 (m, 2H, b' and c), 5.18-5.12 (d, 1H, b), 2.30 (t, 2H, g and g') 1.71-1.58 (m, 4H, d, d', f, and f'), 1.39-1.29 (m, 2H, e and e'). 13C NMR (600 MHZ, CDCl$_3$) δ 172.9 (H), 136.6 (A), 117.0 (B), 74.6 (C), 34.5 (G), 34.0 (D), 24.9 (F), 24.8 (E). dn/dc in THF at 35° C.: 0.0775; Mn=4.91 kg·mol⁻¹; Mw=5.66 kg·mol⁻¹; Đ=1.15. Assignments were confirmed as above for P1 by a combination of HSQC, HMBC, and COSY.

Figure 25:
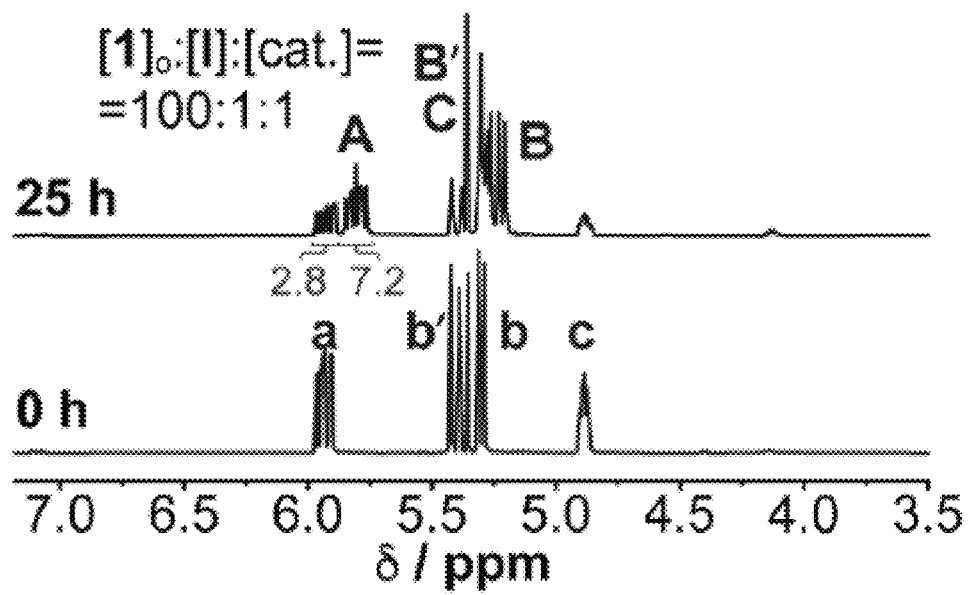
FIG. 25 shows stacked proton nuclear magnetic resonance spectra (CDCl$_3$, 500 (0 h) or 400 (25 h) MHz, 25° C.) at the beginning and end of a representative ROTEP of 1 at 60° C. with DPP as catalyst.
Figure 26:
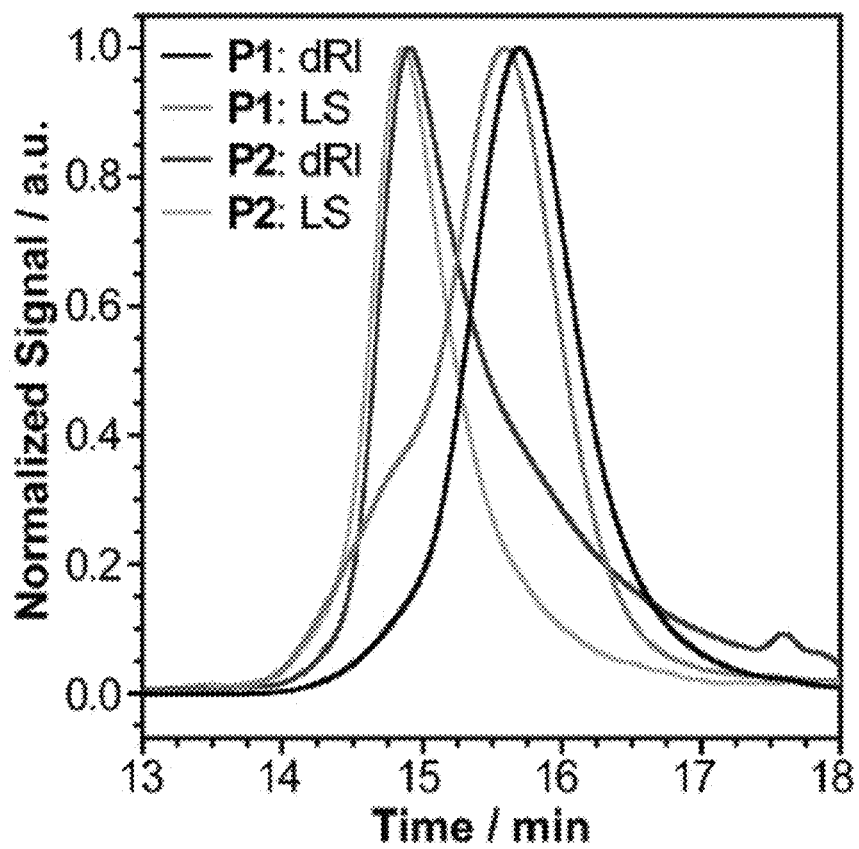
FIG. 26 shows GPC-MALS (tetrahydrofuran (THF), 35° C.) dRI and LS traces of P1 and P2 corresponding to Table 1, entries 6 and 15, respectively.

Stacked proton nuclear magnetic resonance spectra (CDCl$_3$, 500 (0 h) or 400 (25 h) MHz, 25° C.) were also obtained (FIG. 25). Comparison data was obtained for P1 and P2, shown in FIGS. 26-28. FIG. 26 shows GPC-MALS (tetrahydrofuran (THF), 35° C.) dRI and LS traces of P1 and P2. FIG. 27 shows dependence of the $M_n$, and Đ (from GPC-MALS) of P1 and P2 on monomer conversion; equations for the linear fits are provided next to the fits, and standard errors in the last digits of the slope and y-intercept are provided in parentheses. FIG. 28 shows a semilogarithmic kinetic plot for the reversible ROTEP of 1 and 2, where equilibrium conversions for 1 and 2 are set to 0.824 and 0.890, respectively. Equations are provided for the linear fits with y-intercept fixed at 0, and standard errors in the last digit of the slope are provided in parentheses.

Example 4: Protocol for the Rearrangement of P1 and P2

In a glove box with nitrogen atmosphere, to a 20 mL scintillation vial with a stir bar, P2 (1.00 equiv) and 1,3,5-tritertbutylbenzene (20.0 mg) were mixed in deuterated DCM (0.14 M). To the reaction mixture, triethylamine (1.20 equiv) was added first, followed by trimethylsilyl triflate (1.15 equiv). The reaction was monitored via ¹H NMR until conversion reached a plateau (48 h) and then quenched with pyridine (0.4 equiv). The sample was transferred to a polypropylene Eppendorf tube, mixed with equal volume of aqueous ammonium fluoride solution (1M), and agitated for 5 minutes. After 30 minutes at rest, all volatiles were removed in vacuo, and the residue was washed with DCM (volume equal to original sample×4), and dried. To the dried sample, water (15 mL) was added and treated with conc. HCl to obtain a 1M HCl solution. Aqueous wash was removed, sample was dried, and transferred to a glass vial, assisted with pentane. The sample was dissolved in THF (10 mg/mL, 15 mL total), precipitated into 1M HCl (30 mL), and centrifuged. Precipitate was removed after washing with pentane (5.5 mL) and dried in vacuo.

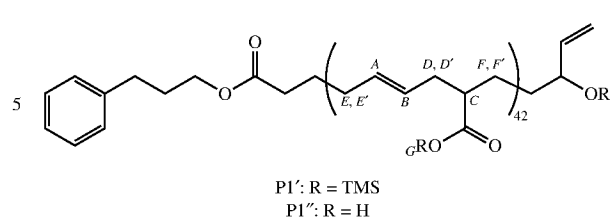

P1': R = TMS
P1'': R = H

P1''. Prepared from P1 following the general procedure on a 48.9 mg scale; isolated as a pale-yellow solid (42.4 mg, 80% yield). ¹H NMR (600 MHz, THF-d$_8$) δ 13.98-8.03 (s, 1H), 5.52-5.35 (m, 2H), 2.35-2.29 (m, 1H), 2.29-2.21 (m, 1H), 2.18-2.09 (m, 1H), 2.06-1.92 (m, 2H), 1.68-1.55 (m, 2H), 1.52-1.43 (m, 1H). ¹³C NMR (600 MHz, THF-d7) δ 176.4, 132.3, 128.6, 45.4, 35.9, 32.2, 31.0.

P2''. Prepared from P2 following the general procedure on a 108.8 mg scale; isolated as a pale-yellow solid (56.5 mg, 55% yield). ¹H NMR (600 MHz, THF-d$_8$) δ 14.16-8.10 (s, 1H), 5.49-5.33 (m, 2H), 2.31-2.22 (m, 2H), 2.15-2.07 (m, 1H), 2.02-1.92 (m, 2H), 1.63-1.50 (m, 2H), 1.49-1.40 (m, 1H), 1.40-1.27 (m, 2H). ¹³C NMR (600 MHz, THF-d7) δ 176.5, 132.6, 128.4, 46.1, 36.1, 33.3, 32.0, 28.0.

Example 5: Kinetic Analysis of the Ireland-Claisen Rearrangement of P1 and P2 to P1' and P2'

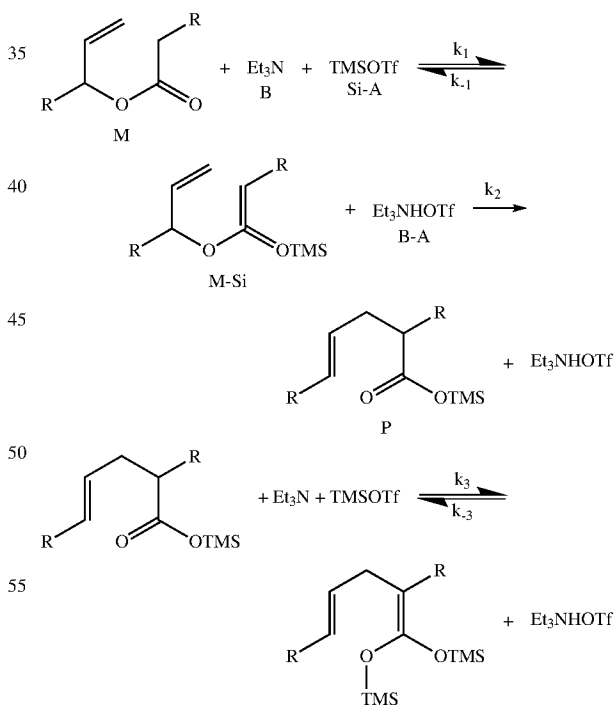

$$\text{rate} = -\frac{\partial [M]}{\partial t} = k_1[M][B][Si-A] - k_{-1}[M-Si][B-A] \tag{1}$$

Until the reaction obtains a high conversion, the second equilibrium process may be ignored. Thus, the analysis below will hold only until sufficiently high conversions are reached. Furthermore, accumulation of [M-Si] was never observed. Therefore, a steady-state of [M-Si] was assumed, which implies the following:

$$-\frac{\partial([\text{M-Si}])}{\partial t} = 0 = k_2[\text{M-Si}] - k_1[\text{M}][\text{B}][\text{Si-A}] + k_{-1}[\text{M-Si}][\text{B-A}] \quad (2)$$

Because M, B, and Si-A are consumed in a ~1:1:1 fashion, and initial concentrations of M, B, and Si-A are approximately the same, this results in $[\text{M}] \approx [\text{B}] \approx [\text{Si-A}]$.

$$\therefore [\text{M-Si}] = \frac{k_1[\text{M}]^3}{k_2 + k_{-1}([\text{M}]_\circ - [\text{M}])}, \text{ and} \quad (3)$$

$$\therefore \text{rate} = -\frac{\partial[\text{M}]}{\partial t} = k_1[\text{M}]^3 - \frac{k_{-1}k_1[\text{M}]^3([\text{M}]_\circ - [\text{M}])}{k_2 + k_{-1}([\text{M}]_\circ - [\text{M}])} = \frac{k_1k_2[\text{M}]^3([\text{M}]_\circ - [\text{M}])}{k_2 + k_{-1}([\text{M}]_\circ - [\text{M}])}. \quad (4)$$

Because the rearrangement is rate-limiting, $k_2 \ll k_{-1}$, and we expect that at intermediate to high conversions $k_2 \ll k_{-1}([\text{M}]_o - [\text{M}])$. For this regime, we have:

$$\text{rate} = -\frac{\partial[\text{M}]}{\partial t} = k_{obs}[\text{M}]^3, \text{ where } k_{obs} = \frac{k_1 k_2}{k_{-1}} \quad (5)$$

Integration of this differential rate law yields the standard integrated rate law for $3^{rd}$-order kinetics:

$$[\text{M}]^{-2} = k_{obs} \cdot t + [\text{M}]_\circ^{-2} \quad (6)$$

Note that in the regime where $k_2 \ll k_{-1}([\text{M}]_o - [\text{M}])$ does not hold, integration gives a mixed-order rate law:

$$\frac{k_{-1}k_2^{-1}[\text{M}]_\circ + 1}{2[\text{M}]_\circ}[\text{M}]^{-2} + \frac{1}{[\text{M}]_\circ^2}[\text{M}]^{-1} + \frac{1}{[\text{M}]_\circ^3}\ln\frac{[\text{M}]_\circ - [\text{M}]}{[\text{M}]} = k_1 t + C \quad (7)$$

However, this low-conversion regime was not probed, and (7) has a logarithmic term that diverges at low and high conversions, thus, (6) was used to fit the data.

Example 6: Bisalloxybenzene Polymer Synthesis—General Scheme

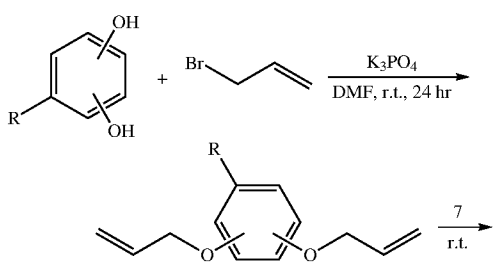

Example 7: Synthesis of Polymer P10'

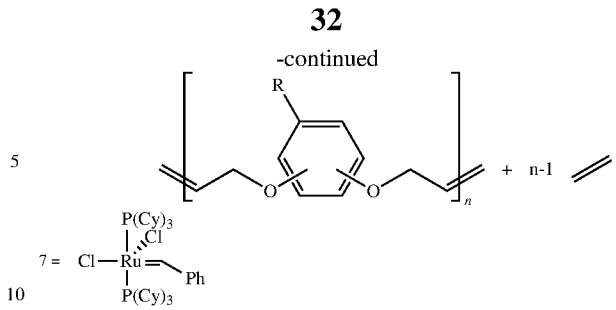

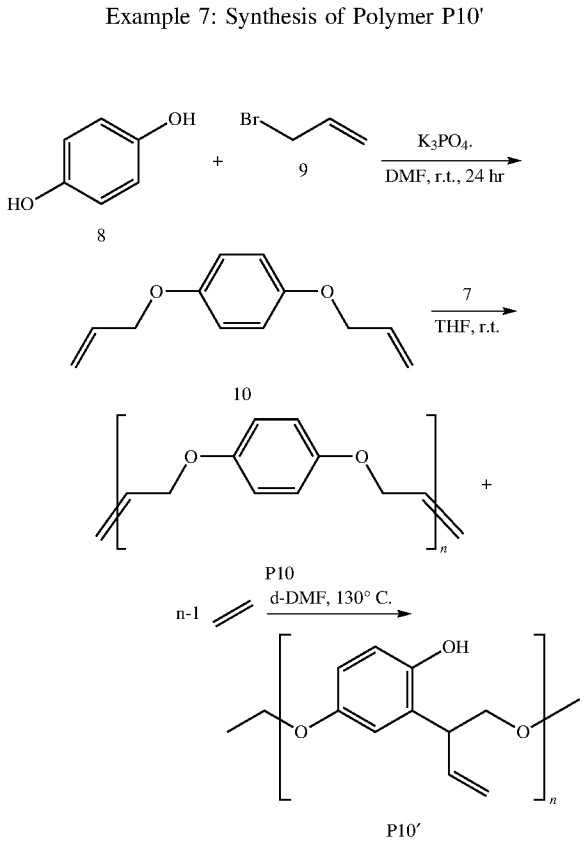

Figure 31:
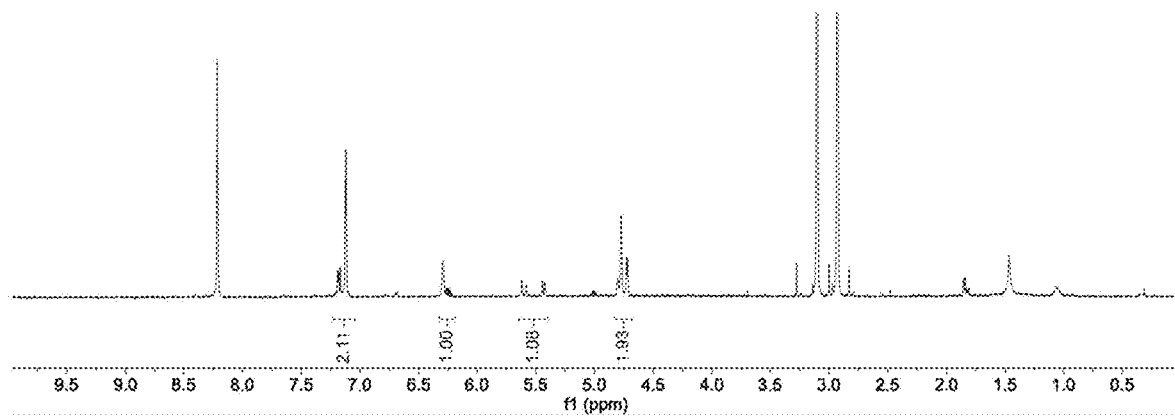
FIG. 31 shows the $^1$H NMR for the product (polymer P10) from bisallyloxybenzene polymerization.

The ¹H NMR for compound P10 is shown in FIG. 31.

Example 8: Bisallyloxybenzene Synthesis of Polymer P12

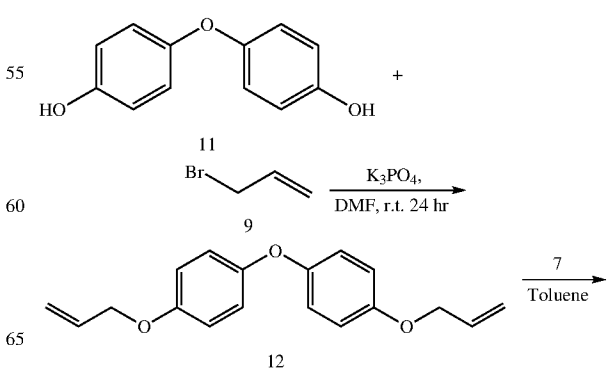

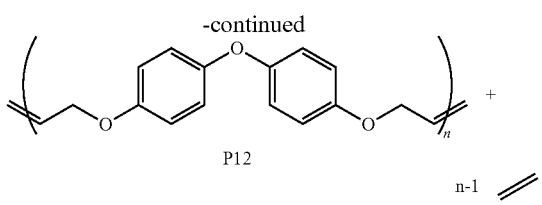

P12

Figure 32:
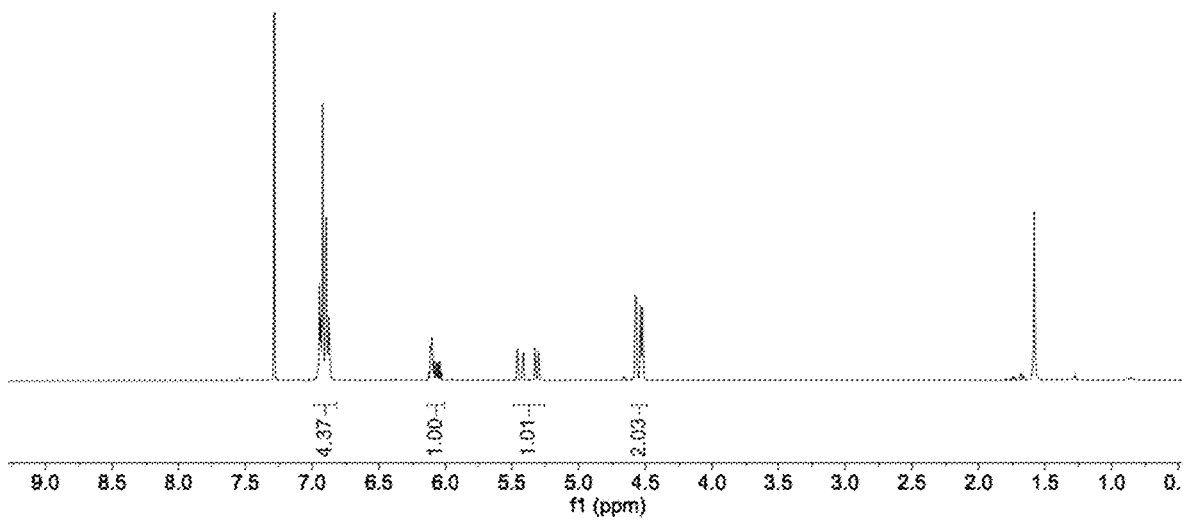
FIG. 32 shows the $^1$H NMR for the product (polymer P12) from bisallyloxybenzene polymerization.

The $^1$H NMR for compound P12 is shown in FIG. 32.

Example 9: Poly(allyl aryl ether) Claisen Rearrangement Formation of Polymer P13'

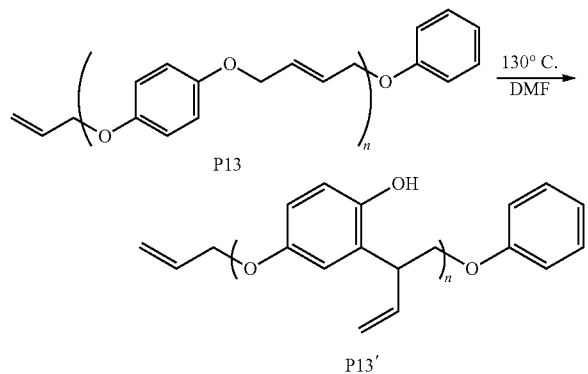

Example 10: Sigmatropic Rearrangement of Polymers P1-P3

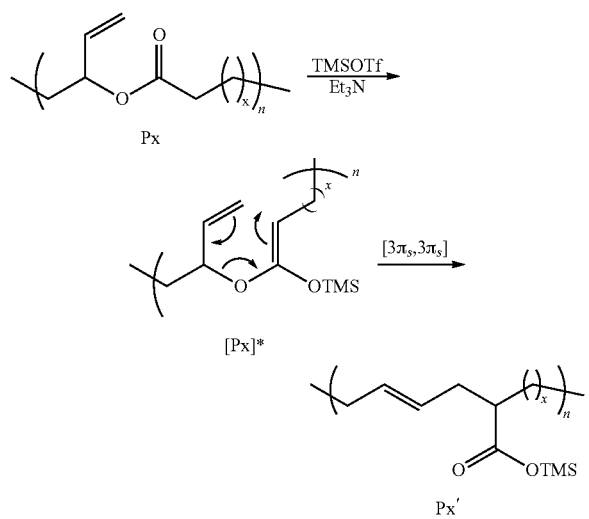

Ireland-Claisen rearrangement conditions include treatment with powerful sterically hindered bases—e.g., lithium diisopropyl amide (LDA) and lithium hexamethyldisilazide (LiHMDS)—in aprotic medium-polarity solvents (e.g., tetrahydrofuran) at cryogenic temperatures (−78° C.), followed by addition of chlorotrimethylsilane and warming to room temperature. These conditions ensure stereoselective formation of the Z-enolate trapped as a silyl ketene acetal, which, after the stereospecific rearrangement, afford the product with high diastereoselectivity. It is possible to generate the E-enolate if hexamethylphorphoramide (HMPA) is added to the reaction mixture. For the polymer reagents, x=1, 2, or 3.

Another Ireland-Claisen method comprises a combination of trialkylsilyl triflate (e.g., TMSOTf) and a tertiary amine (e.g., triethylamine) at room temperature. This set of conditions is more mild and operationally simpler than the reaction conditions using powerful bases. In this method, the triflate and tertiary amine may be varied, where non-limiting examples include silyl triflates such as trimethyl-, triethyl-, and tert-butyldimethyl triflates, and nitrogen bases such as amines, amidines, and guanidines, spanning a wide spectrum of pKb values and steric demand.

Example 11: Sigmatropic Rearrangement of Monomers 4-5

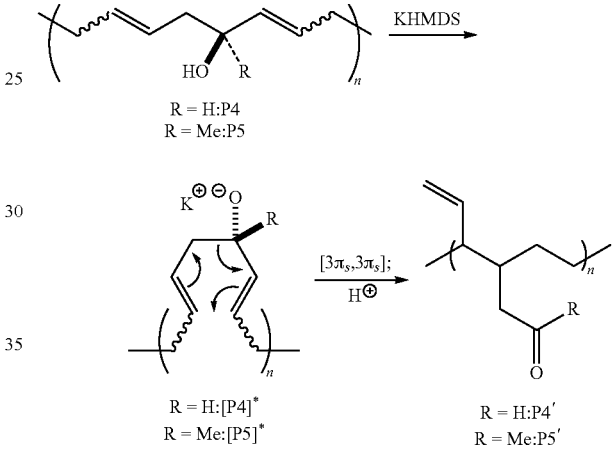

To affect the anionic oxy-Cope rearrangement, potassium bases like KH and KHMDS may be used, which in combination with 18-crown-6 produce highly dissociated potassium alkoxide salts that rapidly facilitate polymer rearrangement at room temperature. In the alternative, less basic t-BuOK or phosphazenes superbases such as B1-R-B4-R (pictured below) may be used. Depending on the base used, heat may also be required to facilitate polymer rearrangement. Without being bound by theory, it is believed that the alcohol moiety in the polymer P4 or P5 is deprotonated at varying amounts, depending on the base used. The greater the degree of alcohol deprotonation, the less heat required.

For example, the conjugate acids of representative phosphazenes bases have the following pKa values in MeCN: pKa (B1-tBu·H$^+$)=26.9, pKa (B2-tBu·H$^+$)=33.5, pKa (B3-tBu·H$^+$)=38.6, and pKa (B4-tBu·H$^+$)=42.7. Meanwhile, the pKa of a typical 2° alcohol is estimated to be ~34, which indicates that at equilibrium, B4-tBu and B3-tBu will deprotonate the alcohol quantitatively, while B2-tBu will do so partially, and B1-tBu will do so marginally. Consequently, B1-R and, less so, B2-R, may require substantial heating to induce the anionic oxy-Cope PBM, while B3-R and B4-R may induce the anionic oxy-Cope PBM at room temperature. Further, since B3-R may be deprotonated by the produced enolate, B3-R may be used in a catalytic amount.

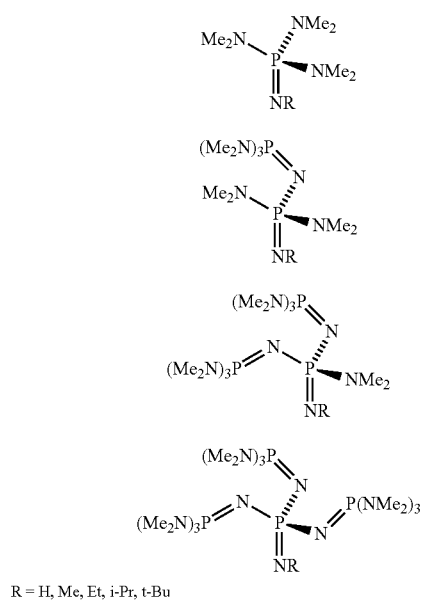

R = H, Me, Et, i-Pr, t-Bu

Example 12: Copolymerization of Monomer 4

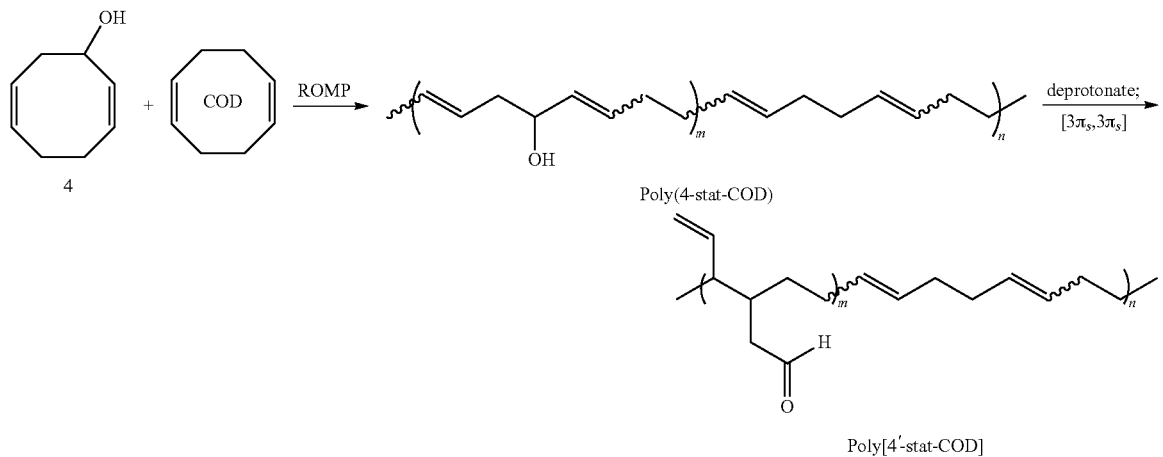

ROMP copolymerization of cyclooctadiene (COD) with monomer 4 may be performed to afford 1,4-poly (butadiene) with periodically incorporated hydroxyl groups that enable the execution of the anionic oxy-Cope rearrangements.

In some embodiments, the feed ratio of the co-monomers will be controlled following the Mayo-Lewis copolymerization equation to ensure statistical incorporation of monomers 2 and 4 at 1%, 5%, 10%, and 20% cumulative content.

The PBM copolymers produced by the above methods are entirely new copolymers that could not be accessed by other means. The rearrangements may improve the thermal stability of the commodity polymers due to the presence of fragments that block chain-like depolymerization. The $T_g$ of poly(2'-stat-CL) may be greater compared to poly(2-stat-CL) due to the introduction of carboxylic acids that engage in hydrogen bonding, while the $T_g$ of poly(4'-stat-COD) is expected to be diminished compared to poly(4-stat-COD) due to the elimination of hydrogen-bonding alcohol groups. Introduction of the hydrogen-bonding carboxylic acids through the PBM of poly(2-stat-CL) may improve the polymer adhesion to polar surfaces, where the PBM of poly(4-stat-COD) will reduce the polymer adhesion to polar surfaces.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

REFERENCES (1) Theato, P.; Klok, H.-A., *Functional Polymers by Post-polymerization Modification: Concepts, Guidelines and Applications*, Wiley-VCH Verlag GmbH & Co. KGaA: Weinheim, Germany, 2013.
(2) Macek, B.; Forchhammer, K.; Hardouin, J.; Weber-Ban, E.; Grangeasse, C.; Mijakovic, I., Protein Post-translational Modifications in Bacteria, *Nat. Rev. Microbiol.* 2019, 17 (11), 651-664.
(3) Allis, C. D.; Jenuwein, T., The Molecular Hallmarks of Epigenetic Control, *Nat. Rev. Genet.* 2016, 17 (8), 487-500.
(4) Staunton, J.; Weissman, K. J., Polyketide Biosynthesis: A Millennium Review, *Nat. Prod. Rep.* 2001, 18 (4), 380-416.
(5) Kim, J.; Jung, H. Y.; Park, M. J., End-group Chemistry and Junction Chemistry in Polymer Science: Past, Present, and Future, *Macromolecules* 2020, 53 (3), 746-763.
(6) Tezuka, Y., *Topological Polymer Chemistry: Progress of Cyclic Polymers in Syntheses, Properties and Functions*, World Scientific Publishing Co Pte Ltd: Singapore, United States, 2012.
(7) Gu, Y.; Alt, E. A.; Wang, H.; Li, X.; Willard, A. P.; Johnson, J. A., Photoswitching Topology in Polymer Networks with Metal-organic Cages as Crosslinks, *Nature* 2018, 560 (7716), 65-69.
(8) Mohanty, A. K.; Ye, J.; Ahn, J.; Yun, T.; Lee, T.; Kim, K.-s.; Jeon, H. B.; Chang, T.; Paik, H.-j., Topologically Reversible Transformation of Tricyclic Polymer into (9) Sun, H.; Kabb, C. P.; Sims, M. B.; Sumerlin, B. S., Architecture-Transformable Polymers: Reshaping the Future of Stimuli-responsive Polymers, *Prog. Polym. Sci.* 2019, 89, 61-75.
(10) Miao, W.; Zou, W.; Jin, B.; Ni, C.; Zheng, N.; Zhao, Q.; Xie, T., On Demand Shape Memory Polymer Via Light Regulated Topological Defects in a Dynamic Covalent Network, *Nat. Commun.* 2020, 11 (1), 4257.
(11) Oldenhuis, N. J.; Qin, K. P.; Wang, S.; Ye, H.-Z.; Alt, E. A.; Willard, A. P.; Van Voorhis, T.; Craig, S. L.; Johnson, J. A., Photoswitchable Sol-gel Transitions and Catalysis Mediated by Polymer Networks with Coumarin-decorated Cu24L24 Metal-organic Cages as Junctions, *Angew. Chem. Int. Ed.* 2020, 59 (7), 2784-2792.
(12) Takata, T., Switchable Polymer Materials Controlled by Rotaxane Macromolecular Switches, *ACS Cent. Sci.* 2020, 6 (2), 129-143.
(13) Zou, W.; Jin, B.; Wu, Y.; Song, H.; Luo, Y.; Huang, F.; Qian, J.; Zhao, Q.; Xie, T., Light-triggered Topological Programmability in a Dynamic Covalent Polymer Network. *Sci. Adv.* 2020, 6 (13), 2362.
(14) Kosaka, N.; Hiyama, T.; Nozaki, K., Baeyer-Villiger Oxidation of an Optically Active 1,4-Polyketone, *Macromolecules* 2004, 37 (12), 4484-4487.
(15) Chen, Y.; Mellot, G.; van Luijk, D.; Creton, C.; Sijbesma, R. P., Mechanochemical Tools for Polymer Materials, *Chem. Soc. Rev.* 2021, 50 (6), 4100-4140.
(16) Galan, N. J.; Brantley, J. N., General Access to Allene-Containing Polymers Using the Skattebøl Rearrangement, *ACS Macro Lett.* 2020, 9 (11), 1662-1666.
(17) Hickenboth, C. R.; Moore, J. S.; White, S. R.; Sottos, N. R.; Baudry, J.; Wilson, S. R., Biasing Reaction Pathways with Mechanical Force, *Nature* 2007, 446 (7134), 423-427.
(18) Potisek, S. L.; Davis, D. A.; Sottos, N. R.; White, S. R.; Moore, J. S., Mechanophore-linked Addition Polymers, *J. Am. Chem. Soc.* 2007, 129 (45), 13808-13809.
(19) De Bo, G., Polymer Mechanochemistry and the Emergence of the Mechanophore Concept, *Macromolecules* 2020, 53 (18), 7615-7617.
(20) Izak-Nau, E.; Campagna, D.; Baumann, C.; Göstl, R., Polymer Mechanochemistry-enabled Pericyclic Reactions, *Polym. Chem.* 2020, 11 (13), 2274-2299.
(21) Fleming, I., *Pericyclic Reactions*, Oxford University Press, Inc.: New York, 1998.
(22) Dinda, B., Sigmatropic Rearrangements, *Essentials of Pericyclic and Photochemical Reactions*, Dinda, B., Ed. Springer International Publishing: Cham, Switzerland, 2017; Vol. 93, pp 107-160.
(23) Claisen, L., Über Umlagerung Von Phenol-allyläthern in C-allyl-phenole, *Ber. Dtsch. Chem. Ges.* 1912, 45 (3), 3157-3166.
(24) Tantillo, D. J.; Hoffmann, R., Helicoid Shiftamers, *J. Am. Chem. Soc.* 2002, 124 (24), 6836-6837.
(25) Tantillo, D. J.; Hoffmann, R., Sigmatropic Shiftamers: Fluxionality in Broken Ladderane Polymers, *Angew. Chem. Int. Ed.* 2002, 41 (6), 1033-1036.
(26) Tantillo, D. J.; Hoffmann, R., Helicoid Shiftamers for the Transport of π-Clumps and Charges, *Helv. Chim. Acta* 2003, 86 (11), 3525-3532.
(27) Tantillo, D. J.; Hoffmann, R., Hydrogen Migration over Organic Tapes: [1,5] Sigmatropic Shiftamers, *Eur. J. Org. Chem.* 2004, 2004 (2), 273-280.
(28) Tantillo, D. J.; Hoffmann, R.; Houk, K. N.; Warner, P. M.; Brown, E. C.; Henze, D. K., Extended Barbaralanes: Sigmatropic Shiftamers σ-Polyacenes?, *J. Am. Chem. Soc.* 2004, 126 (13), 4256-4263.
(29) Tantillo, D. J.; Hoffmann, R., Snakes and Ladders. The Sigmatropic Shiftamer Concept, *Acc. Chem. Res.* 2006, 39 (7), 477-486.
(30) Sydlik, S. A.; Swager, T. M., Functional Graphenic Materials Via a Johnson-Claisen Rearrangement, *Adv. Funct. Mater.* 2013, 23 (15), 1873-1882.
(31) Tena, A.; Rangou, S.; Shishatskiy, S.; Filiz, V.; Abetz, V., Claisen Thermally Rearranged (CTR) Polymers, *Sci. Adv.* 2016, 2 (7), e1501859.
(32) Wang, W.; Qi, X.; Guan, Y.; Zhang, F.; Zhang, J.; Yan, C.; Zhu, Y.; Wan, X., Synthesis and Properties of Poly(p-phenylene terephthalamide) Bearing Both Polar and Unsaturated Substituents Introduced Via Claisen Rearrangement Reaction, *J. Polym. Sci., Part A: Polym. Chem.* 2016, 54 (13), 2050-2059.
(33) De la Viuda, M. R.; Tena, A.; Neumann, S.; Willruth, S.; Filiz, V.; Abetz, V., Novel Functionalized Polyamides Prone to Undergo Thermal Claisen Rearrangement in the Solid State, *Polym. Chem.* 2018, 9 (29), 4007-4016.
(34) Meis, D.; Tena, A.; Neumann, S.; Georgopanos, P.; Emmler, T.; Shishatskiy, S.; Rangou, S.; Filiz, V.; Abetz, V., Thermal Rearrangement of ortho-Allyloxypolyimide Membranes and the Effect of theDegree of Functionalization, *Polym. Chem.* 2018, 9 (29), 3987-3999.
(35) Hwang, S.-H.; Choi, T.-L., Tandem Diaza-Cope Rearrangement Polymerization: Turning Intramolecular Reaction into Powerful Polymerization to Give Enantiopure Materials for $Zn^{2+}$ Sensors, *Chem. Sci.* 2021, 12 (7), 2404-2409.
(36) Ireland, R. E.; Mueller, R. H.; Willard, A. K., The Ester Enolate Claisen Rearrangement. Stereochemical Control through Stereoselective Enolate Formation, *J. Am. Chem. Soc.* 1976, 98 (10), 2868-2877.
(37) McFarland, C. M.; McIntosh, M. C., The Ireland-Claisen Rearrangement (1972-2004), *The Claisen Rearrangement*, Hiersemann, M.; Nubbemeyer, U., Eds. Wiley-VCH Verlag GmbH & Co. KGaA: Weinheim, Germany, 2007; pp 117-210.
(38) Carlson, R. G.; Huber, J. H.-A.; Henton, D. E., Synthetic Organic Photochemistry: Macrolides from the Photolysis of βγ-Epoxy-Ketones, *J. Chem. Soc., Chem. Commun.* 1973, (6), 223-224.
(39) Danishefsky, S.; Funk, R. L.; Kerwin, J. F., Claisen Rearrangements of Lactonic (Silyl) Enolates: A New Route to Functionalized Cycloalkenes, *J. Am. Chem. Soc.* 1980, 102 (22), 6889-6891.
(40) Schneiderman, D. K.; Hillmyer, M. A., Aliphatic Polyester Block Polymer Design, *Macromolecules* 2016, 49 (7), 2419-2428.
(41) Parrish, B.; Quansah, J. K.; Emrick, T., Functional Polyesters Prepared by Polymerization of α-Allyl(valerolactone) and Its Copolymerization with ε-Caprolactone and δ-Valerolactone, *J. Polym. Sci., Part A: Polym. Chem.* 2002, 40 (12), 1983-1990.
(42) Pratt, R. C.; Lohmeijer, B. G. G.; Long, D. A.; Waymouth, R. M.; Hedrick, J. L., Triazabicyclodecene: A Simple Bifunctional Organocatalyst for Acyl Transfer and Ring-opening Polymerization of Cyclic Esters, *J. Am. Chem. Soc.* 2006, 128 (14), 4556-4557.
(43) Lohmeijer, B. G. G.; Pratt, R. C.; Leibfarth, F.; Logan, J. W.; Long, D. A.; Dove, A. P.; Nederberg, F.; Choi, J.; Wade, C.; Waymouth, R. M.; Hedrick, J. L., Guanidine and Amidine Organocatalysts for Ring-opening Polymerization of Cyclic Esters, *Macromolecules* 2006, 39 (25), 8574-8583.

(44) Makiguchi, K.; Satoh, T.; Kakuchi, T., Diphenyl Phosphate as an Efficient Cationic Organocatalyst for Controlled/Living Ring-opening Polymerization of δ-Valerolactone and ε-Caprolactone, *Macromolecules* 2011, 44 (7), 1999-2005.

(45) Odian, G., Ring-Opening Polymerization, *Principles of Polymerization,* 4th ed.; John Wiley & Sons: Hoboken, NJ, 2004; pp 544-618.

(46) Kobayashi, M.; Masumoto, K.; Nakai, E.-i.; Nakai, T., Stereochemical Control in the Silyl Triflate-mediated Claisen Rearrangement of Allylic Esters, *Tetrahedron Lett.* 1996, 37 (17), 3005-3008.

(47) Powers, D. C.; Benitez, D.; Tkatchouk, E.; Goddard, W. A.; Ritter, T., Bimetallic Reductive Elimination from Dinuclear Pd(III) Complexes, *J. Am. Chem. Soc.* 2010, 132 (40), 14092-14103.

(48) Emde, H.; Simchen, G., Reaktionen Der Trialkylsilyltrifluormethansulfonate, II. Synthese Von O-alkyl-O-(trialkylsilyl) ketenacetalen Und 2-(trialkylsilyl) carbonsäureestern, *Liebigs Ann. Chem.* 1983, 1983 (5), 816-834.

(49) Marvel, C. S.; Potts, R.; Economy, J.; Scott, G. P.; Taft, W. K.; Labbe, B. G., Butadiene-acrylic Acid Copolymers, *Ind. Eng. Chem.* 1955, 47 (10), 2221-2223.

(50) Furukawa, J.; Iseda, Y.; Kobayashi, E., Alternating Copolymerization of Butadiene with Acrylic Compounds; Monomer-catalyst Complexes, *Polym. J.* 1971, 2 (3), 337-344.

(51) Bamford, C. H.; Han, X.-Z., Alternating Copolymerization of Conjugated Dienes with Methyl Acrylate. Part 1.—Butadiene, *J. Chem. Soc., Faraday Trans.* 1 1982, 78 (3), 855-868.

(52) Garvey, B. S., Jr.; Juve, A. E.; Sauser, D. E., Hycar-OR. Properties of Typical Compounds, *Rubber Chemistry and Technology* 1941, 14 (3), 728-735.

(53) Baughman, T. W.; Chan, C. D.; Winey, K. I.; Wagener, K. B., Synthesis and Morphology of Well-defined Poly(ethylene-co-acrylic acid) Copolymers, *Macromolecules* 2007, 40 (18), 6564-6571.

(54) Cheung, Y. W.; Stein, R. S., Critical Analysis of the Phase Behavior of Poly(ε-caprolactone) (PCL)/Polycarbonate (PC) Blends, *Macromolecules* 1994, 27 (9), 2512-2519.

(55) Jung, J. H.; Ree, M.; Kim, H., Acid- and Base-catalyzed Hydrolyses of Aliphatic Polycarbonates and Polyesters, *Catal. Today* 2006, 115 (1), 283-287.

(56) Pangborn, A. B.; Giardello, M. A.; Grubbs, R. H.; Rosen, R. K.; Timmers, F. J., Safe and Convenient Procedure for Solvent Purification, *Organometallics* 1996, 15 (5), 1518-1520.

(57) Fulmer, G. R.; Miller, A. J.; Sherden, N. H.; Gottlieb, H. E.; Nudelman, A.; Stoltz, B. M.; Bercaw, J. E.; Goldberg, K. I., NMR Chemical Shifts of Trace Impurities: Common Laboratory Solvents, Organics, and Gases in Deuterated Solvents Relevant to the Organometallic Chemist, *Organometallics* 2010, 29 (9), 2176-2179.

(58) Still, W. C.; Kahn, M.; Mitra, A., Rapid Chromatographic Technique for Preparative Separations with Moderate Resolution, *J. Org. Chem.* 1978, 43 (14), 2923-2925.

(59) Trost, B. M.; Verhoeven, T. R. Cyclization Catalyzed by Palladium (0). Initial Studies and Macrolide Formation. *J. Am. Chem. Soc.* 1980, 102 (14), 4743-4763.

(60) Luo, J.; Zhang, Y.; Huang, S.-H.; Zhu, L.; Hong, R. Catalytic Aza-Wacker Annulation: Tuning Mechanism by the Activation Mode of Amide and Enantioselective Syntheses of Melinonine-E and Strychnoxanthine, *Org. Lett.* 2018, 20 (8), 2386-2390.

(61) Mac, D. H.; Samineni, R.; Petrignet, J.; Srihari, P.; Chandrasekhar, S.; Yadav, J. S.; Gree, R. From Vinylpyranoses to Carbasugars by an Iron-catalyzed Reaction Complementary to Classical Ferrier Carbocylization, *Chem. Commun.* 2009, 4717-4719.

What is claimed is:

1. A method of preparing a product polymer, the method comprising:
    (a) obtaining a polymer, wherein the backbone of the polymer comprises at least one (a) sigmatropomer repeat unit of Formula I, II, or III:

Formula I

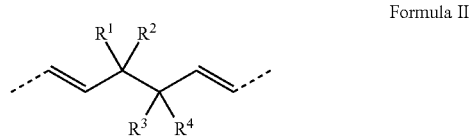

Formula II

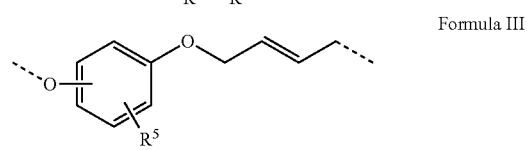

Formula III wherein $R^1$, $R^2$, and $R^3$, are, in each instance, independently selected from hydrogen and alkyl;

$R^4$ is, in each instance, selected from hydrogen, alkyl, and hydroxyl; and $R^5$ is, in each instance, selected from hydrogen, alkyl, and aryl; and (b) inducing a sigmatropic rearrangement of the sigmatropomer in the backbone of the polymer, thereby producing the product polymer.

2. The method of claim 1, wherein the sigmatropic rearrangement is selected from the group consisting of a Claisen rearrangement, a Ireland-Claisen rearrangement, a Cope rearrangement, a Carroll rearrangement, and an anionic oxy-Cope rearrangement.

3. The method of claim 1, wherein $R^1$, $R^2$, and $R^3$ are hydrogen and $R^4$ is hydroxyl.

4. The method of claim 1, wherein $R^1$ and $R^2$ are hydrogen, $R^3$ is methyl, and $R^4$ is hydroxyl.

5. The method of claim 1, wherein $R^5$ is hydrogen and the sigmatropomer of Formula III is represented by the sigmatropomer of Formula IIIa

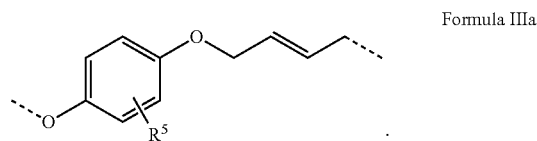

Formula IIIa

6. The method of claim 1, wherein the sigmatropic rearrangement is affected by subjecting the polymer to treatment with heat, acid, or base.

7. The method of claim 1, wherein the sigmatropic rearrangement is performed at a specified temperature, in a specified solvent, over a specified period of time.

8. The method of claim 1, wherein the product polymer comprises repeat units represented by the structure of Formulae V and VI:

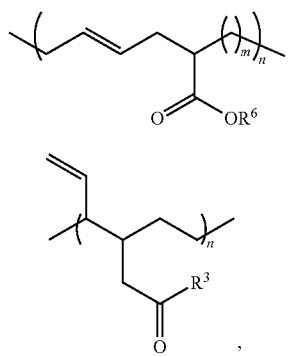

Formula V

Formula VI wherein, m is an integer from 1-3, n is an integer from 2-10,000, $R^3$ is hydrogen or alkyl, and $R^6$ is hydrogen or silyl.

9. The method of claim 8, wherein $R^3$ is methyl.

10. The method of claim 1, wherein the product polymer has a molecular weight from about 2,500 g/mol to about 5,000 g/mol.

11. The method of claim 1, wherein the sigmatropomer comprising polymer further comprises at least one additional repeat unit.

12. The method of claim 11, wherein the additional repeat unit is derived from caprolactone or cyclooctadiene.

13. The method of claim 12, wherein the sigmatropomer comprising polymer comprises the sigmatropomer repeat unit in a range from about 1% mole to about 20% mole cumulative content.

* * * * *